United States Patent
Tonar et al.

(10) Patent No.: US 7,612,929 B2
(45) Date of Patent: *Nov. 3, 2009

(54) ELECTROCHROMIC DEVICES WITH THIN BEZEL-COVERED EDGE

(75) Inventors: William L. Tonar, Holland, MI (US);
Frederick T. Bauer, Holland, MI (US);
John W. Arnold, Holland, MI (US);
David J. Cammenga, Zeeland, MI (US);
John W. Carter, Holland, MI (US);
Bradley L. Busscher, Grand Rapids, MI (US); Jeremy A. Fogg, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/928,336

(22) Filed: Oct. 30, 2007

(65) Prior Publication Data

US 2008/0049295 A1 Feb. 28, 2008

Related U.S. Application Data

(60) Division of application No. 10/430,885, filed on May 6, 2003, now Pat. No. 7,324,261, which is a continuation-in-part of application No. 10/260,741, filed on Sep. 30, 2002, now Pat. No. 7,064,882, and a continuation-in-part of application No. 09/884,717, filed on Jun. 19, 2001, now Pat. No. 6,560,004, which is a continuation of application No. 09/350,879, filed on Jul. 9, 1999, now Pat. No. 6,249,369.

(51) Int. Cl.
*G02F 1/15* (2006.01)
*G02F 1/153* (2006.01)

(52) U.S. Cl. ........................... 359/267; 359/265

(58) Field of Classification Search .......... 359/265–275
See application file for complete search history.

(56) References Cited

U.S. PATENT DOCUMENTS 3,280,701 A 10/1966 Donnelly et al.

(Continued)

FOREIGN PATENT DOCUMENTS

WO WO 9530495 11/1995

OTHER PUBLICATIONS

Martin R. Bryce, "Organic Metals: Synthesis and Properties of Bis-(1,3-benzodithiole-2-ylidene)ethane Bi-(benzo-1,3-dithiafulven-6-yl)", J. Chem. Soc., Chem. Commun. 1983, pp. 4-5.

(Continued)

*Primary Examiner*—William C Choi
*Assistant Examiner*—Jack Dinh
(74) *Attorney, Agent, or Firm*—Quarles & Brady LLP

(57) ABSTRACT

A mirror includes an electro-optic mirror subassembly, and a thin-profiled bezel attached around a perimeter of the electrochromic mirror subassembly. The electro-optic mirror subassembly is supported on a carrier by an adheringly bonded heater and foam tape in a laminar arrangement. The bezel may be bonded to an edge of the front surface of the front element of the electro-optic mirror subassembly, and/or may be bonded and/or interlockingly mechanically attached to an edge of the carrier. Alternatively, the bezel can be a strip of paint or thin coating material. The bezel can be molded in place, or can be pre-molded and elastically stretched to permit assembly. In one form, the bezel includes a laterally-extending fin that prevents seeing past the bezel into the inside of a mirror housing. In at least one embodiment, the assembly has no bezel or only a bezel on one edge.

17 Claims, 39 Drawing Sheets

U.S. PATENT DOCUMENTS

| | | |
|---|---|---|
| 3,837,129 A | 9/1974 | Losell |
| 4,902,108 A | 2/1990 | Byker |
| 5,052,163 A | 10/1991 | Czekala |
| 5,066,112 A | 11/1991 | Lynam et al. |
| 5,069,535 A | 12/1991 | Baucke et al. |
| 5,073,012 A | 12/1991 | Lynam |
| 5,076,673 A | 12/1991 | Lynam et al. |
| 5,115,346 A | 5/1992 | Lynam |
| 5,128,799 A | 7/1992 | Byker |
| 5,158,638 A | 10/1992 | Osanami et al. |
| 5,253,109 A | 10/1993 | O'Farrell et al. |
| 5,379,146 A | 1/1995 | Defendini |
| 5,421,940 A | 6/1995 | Cornils et al. |
| 5,649,756 A | 7/1997 | Adams et al. |
| 5,724,187 A | 3/1998 | Varaprasad et al. |
| 5,790,298 A | 8/1998 | Tonar |
| 5,818,625 A | 10/1998 | Forgette et al. |
| 5,923,457 A | 7/1999 | Byker et al. |
| 6,064,508 A | 5/2000 | Forgette et al. |
| 6,068,380 A | 5/2000 | Lynn et al. |
| 6,102,546 A | 8/2000 | Carter |
| 6,170,956 B1 | 1/2001 | Rumsey et al. |
| 6,195,194 B1 | 2/2001 | Roberts et al. |
| 6,239,899 B1 | 5/2001 | DeVries et al. |
| 6,249,369 B1 | 6/2001 | Theiste et al. |
| 6,317,248 B1 | 11/2001 | Agrawal et al. |
| 6,407,468 B1 | 6/2002 | LeVesque et al. |
| 6,407,847 B1 | 6/2002 | Poll et al. |
| 6,560,004 B2 | 5/2003 | Theiste et al. |
| 6,606,183 B2 | 8/2003 | Ikai et al. |
| 7,064,882 B2 | 6/2006 | Tonar et al. |
| 7,289,037 B2 | 8/2007 | Uken et al. |
| 7,324,261 B2 * | 1/2008 | Tonar et al. ............... 359/267 |
| 2002/0171906 A1 | 11/2002 | Busccher et al. |

OTHER PUBLICATIONS

J. Guay and A. Diaz, "Electrooxidation of Soluble α ' α⁻ Coupled Thiophene Oligomers", Chem. Mater. 1992, 4, 254-255.

William H. Morrison, Jr. et al., "Polarographic and Magnetic Susceptibility Study of Various Biferrocene Compounds", Inorganic Chemistry, vol. 12, No. 9, 1973, pp. 1998-2004.

D. Astruc et al., "Electronic Communication and Switching between two Iron Atoms across the Phenathrene-Dihydrophenanthrene Bridging Ligands", J. Chem. Soc., Chem. Commun., 1995.

Teng-Yuan Dong et al., "The Fundamental nature of Electron Transfer in Mixed-Valence Biferrocenium Salts", J. Chem. Soc., Chem. Commun., 1990, pp. 1332-1334.

Ulrich T. Mueller-Westerhoff, "[m.m]Metallocenophanes: Synthesis, Structure, and Properties", Angew Chem. Int. Ed. Engl., 25 (1986), pp. 702-717.

Mircea V. Diudea, "New Reactions of Phenothiazine Green Cations and Their Metal Complexes", Tetrahedron Letters, vol. 23, No. 13, 1982, Printed in Great Britain, pp. 1367-1370.

Yuan Yu et al., "Spectra and Reactivity of Methoxyoligothiophene Cation Radicals", J. Am. Chem. Soc. 1996, 118, pp. 1013-1018.

Shawn A. Sapp et al., "Rapid Switching in Electrochromic Devices Based On Complementary Conducting Polymer Films", ACS New Orleans, Spring 1996.

Buchanan et al., "Preparation of conducting and transparent thin films of tin-doped indium oxide by magnetron sputtering", Appl. Phys. Lett. 37(2), pp. 213-215, 1980.

* cited by examiner

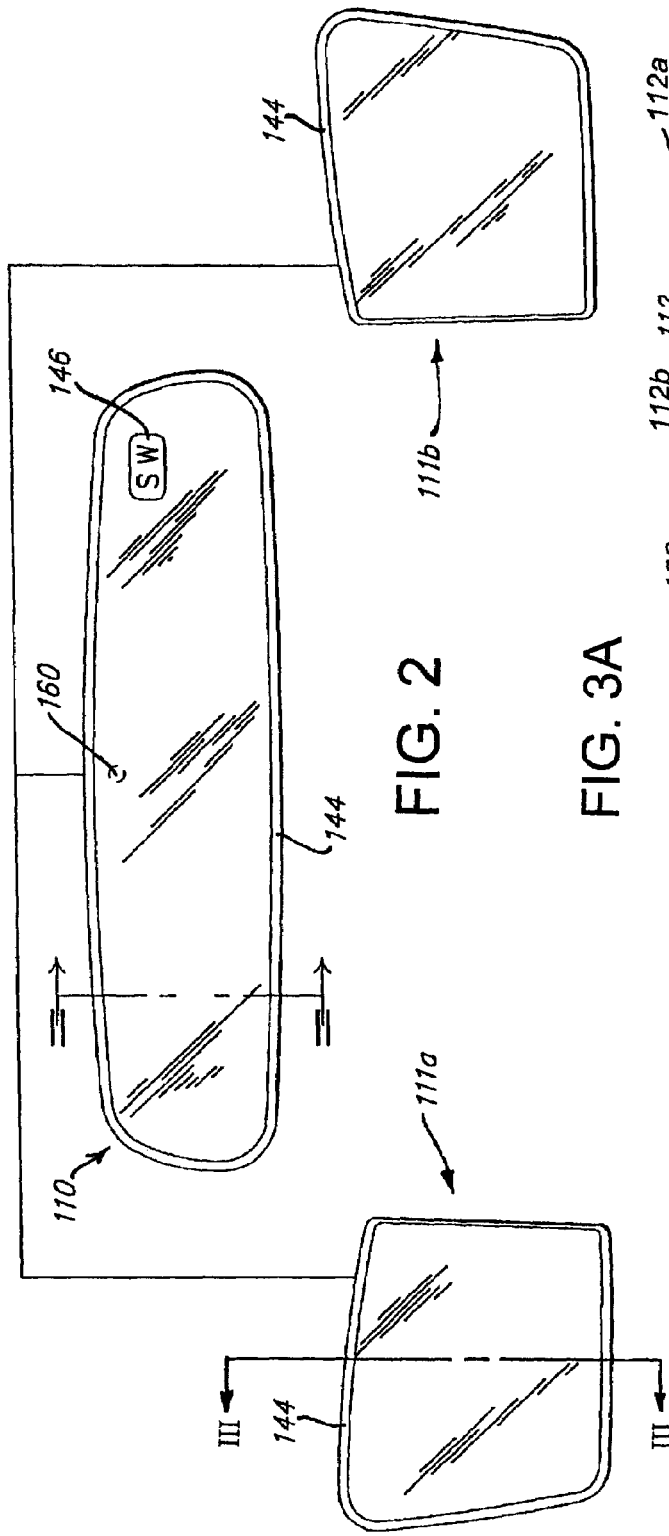
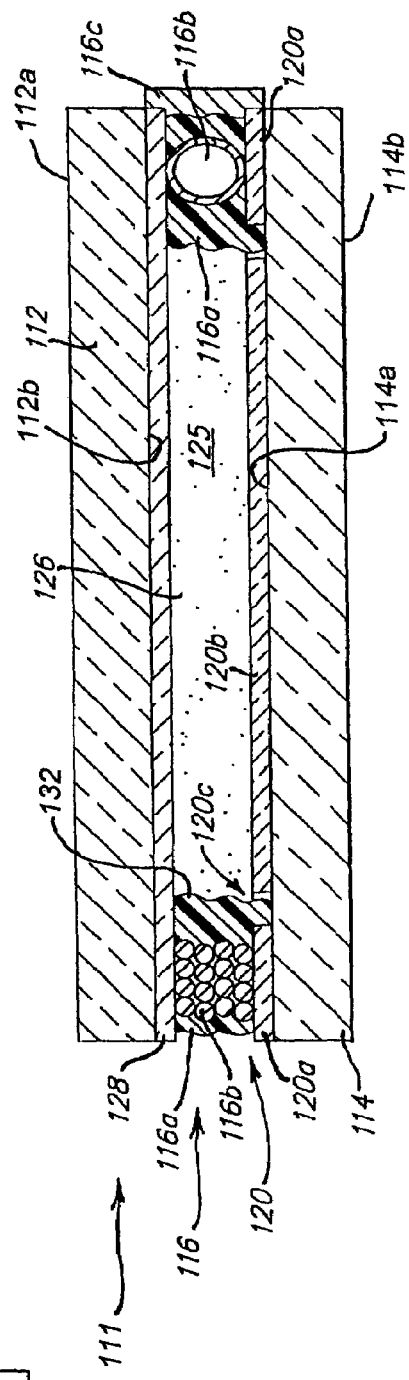
FIG. 2
FIG. 3A

FIG. 4A
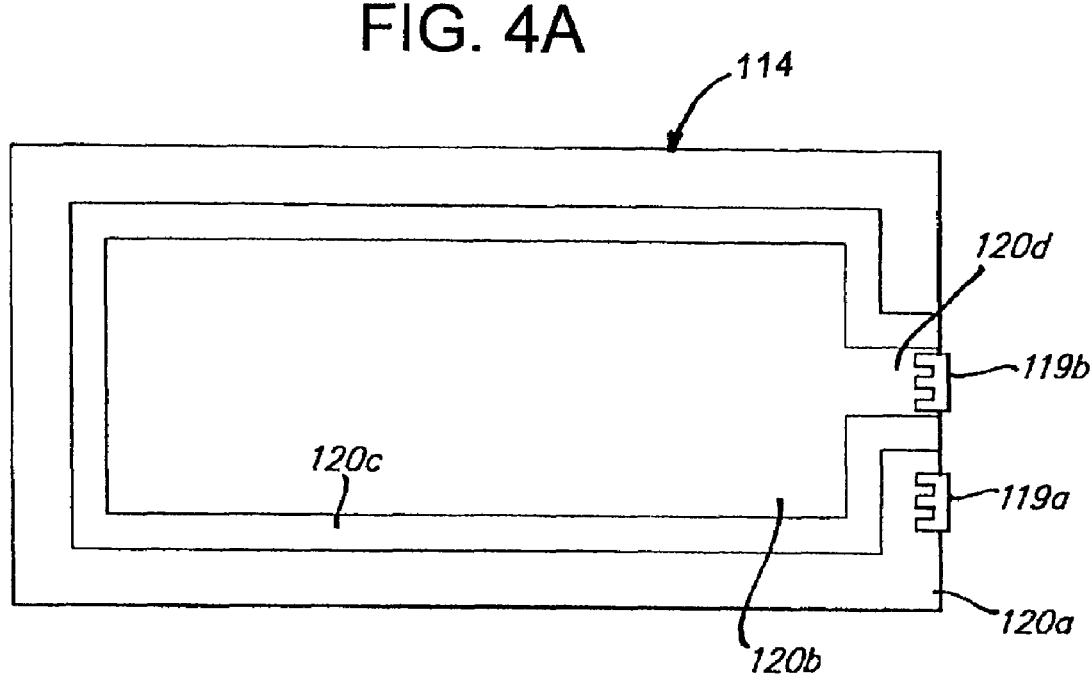
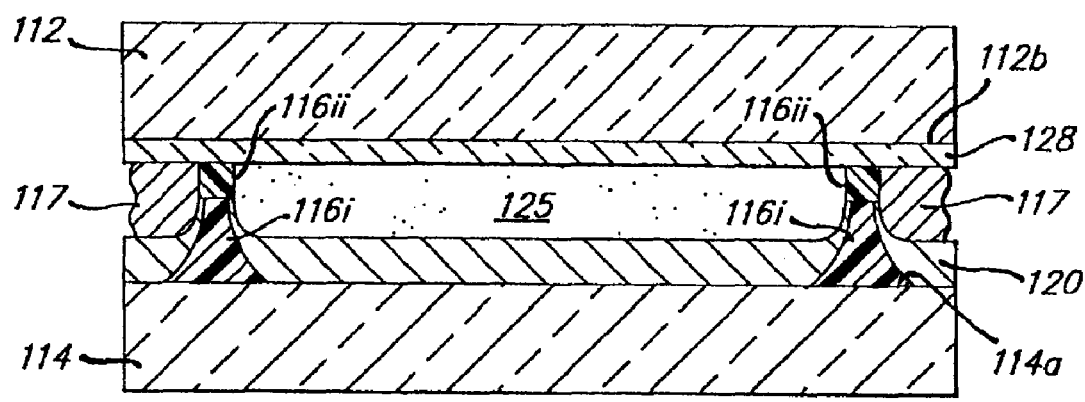
FIG. 5

ELECTROCHROMIC DEVICES WITH THIN BEZEL-COVERED EDGE

CROSS-REFERENCE TO RELATED APPLICATION

This is a divisional of U.S. patent application Ser. No. 10/430,885, filed May 6, 2003 now U.S. Pat. No. 7,324,261, entitled ELECTROCHROMIC DEVICES WITH THIN BEZEL-COVERED EDGE which is a continuation-in-part of U.S. patent application Ser. No. 10/260,741, filed Sep. 30, 2002 now U.S. Pat. No. 7,064,882, entitled ELECTROCHROMIC DEVICES HAVING NO POSITIONAL OFFSET BETWEEN SUBSTRATES, and U.S. patent application Ser. No. 09/884,717, filed Jun. 19, 2001, entitled COUPLED ELECTROCHROMIC COMPOUNDS WITH PHOTOSTABLE DICATION OXIDATION STATES, now U.S. Pat. No. 6,560,004, which is a continuation of U.S. patent application Ser. No. 09/350,879, filed on Jul. 9, 1999, which is now U.S. Pat. No. 6,249,369, the entire contents of which are incorporated herein by reference.

BACKGROUND OF THE INVENTION

The present invention generally relates to electro-optic devices and apparatus incorporating these devices. More particularly, the invention relates to electro-optic devices used in architectural windows or vehicle rearview mirrors.

Electro-optic elements are used in a variety of applications including light shutters, variable attenuating optical filters, and architectural and vehicle windows. The most common application of electro-optic elements is in rearview mirror assemblies used in vehicles. Such electro-optic rearview mirrors are automatically controlled to vary the reflectivity of the mirror in response to rearward and forward aimed light sensors so as to reduce the glare of headlamps in the image reflected to the driver's eyes.

FIG. 1A shows an exploded view of a portion of a rearview mirror subassembly 5 as used in a typical exterior rearview mirror assembly. Subassembly 5 includes an electrochromic mirror element 10, a bezel 50, and a carrier plate 70 (FIG. 1B). The subassembly may further include gaskets 60 and 62, which are placed on either side of electrochromic mirror element 10, which are provided to form a secondary seal around the periphery of the mirror element 10. As best shown in FIG. 1B, electrochromic element 10 includes a front substantially transparent element 12, typically formed of glass, and having a front surface 12a and a rear surface 12b. Electrochromic element 10 further includes a rear element 14, which is spaced slightly apart from element 12. A seal 16 is formed between elements 12 and 14 about their periphery so as to define a sealed chamber therebetween in which an electrochromic medium is provided. Elements 12 and 14 preferably have electrically conductive layers on the surfaces facing the chamber such that an electrical potential may be applied across the electrochromic medium. These electrodes are electrically isolated from one another and separately coupled to a power source by means of first and second bus connectors 34a and 34b. To facilitate connection of bus connectors 34a and 34b, elements 12 and 14 are typically vertically offset so that one bus connector may be secured along a bottom edge of one of the elements and another bus connector may be secured to the top edge of the other element. The bus connectors 34a and 34b are typically spring clips similar to those disclosed in commonly-assigned U.S. Pat. Nos. 6,064,509 and 6,062,920 so as to ensure that they remain physically and electrically coupled to the electrode layers on the inward-facing surfaces of elements 12 and 14. Once the electrochromic element 10 has been manufactured and bus clips 34a and 34b attached, the mirror subassembly 5 may then be assembled. As shown in FIGS. 1A and 1B, bezel 50 includes a front lip 51, which extends over a portion of the front surface 12a of front element 12. Typically, front lip 51 extends over a sufficient portion of front surface 12a to obscure a person's view of seal 16 and protect seal 16 from possible UV degradation. As apparent from FIG. 1B, the width $D_1$ of front lip 51 of bezel 50 is dependent upon a number of factors including the distance $D_2$ of offset of elements 12 and 14. Also, the extent to which bus connector clips 34a and 34b extend beyond the peripheral edges of elements 12 and 14 may require a wider bezel. Typical prior art bezels have a front lip with a width $D_1$ of 5 mm or more.

Prior to inserting electrochromic mirror element 10 in bezel 50, an optional front gasket 60 may be provided behind front lip 51 so as to be pressed between front surface 12a of front element 12 and the inner surface of front lip 51 of bezel 50. Mirror element 10 is then placed in bezel 50 and an optional rear gasket 62 may be provided along the periphery of the back surface of element 14. In lieu of, or in addition to, including front and, or, rear gaskets, the bezel/mirror interface area may be filled or potted with a sealing material like urethane, silicone, or epoxy. A carrier plate 70, which is typically formed of an engineering grade rigid plastic or a similar material as used for bezel 50, is then pressed against the rear surface of element 14 with gasket 62 compressed therebetween. A plurality of tabs 52 may be formed inside of the bezel such that carrier plate 70 is snapped in place so as to secure mirror element 10 within the bezel. Carrier plate 70 is typically used to mount the mirror subassembly within an exterior mirror housing. More specifically, a positioner (shown as element 1140 in FIG. 57) may also be mounted within the mirror housing and mechanically coupled to carrier plate 70 for enabling remote adjustment of the position of the mirror subassembly within the housing.

While the above-described structure is readily manufacturable, styling concerns have arisen with respect to the width of the front lip of the bezel of an electrochromic mirror subassembly. Specifically, due to the need to accommodate the bus clips, the positional offset of elements 12 and 14, and to obscure the view of the seal, the width of the front lip of the bezel is typically wider than that of any bezel used on non-dimming (non-electro-optic) mirrors. In fact, bezels are often not used on non-dimming mirrors. In some vehicles, only the exterior mirror on the driver's side is electro-optic, while the passenger side mirror is non-dimming. Thus, there exists the need for an improved electro-optic exterior mirror subassembly that has a reduced bezel front width or that does not include a front bezel at all.

SUMMARY OF THE INVENTION

In one aspect of the present invention, an electro-optic rearview mirror for a vehicle includes an electro-optic mirror subassembly including front and rear elements defining a chamber therebetween and having electro-optic material disposed in the chamber. A carrier supports the electro-optic mirror subassembly. A bezel is disposed around a periphery of the electro-optic mirror subassembly and has a front lip extending over part of a front surface of the front element, and has a rear lip extending onto an edge of the carrier, with the rear lip being secured to the edge of the carrier.

In another aspect of the present invention, a rearview mirror for a vehicle includes an electro-optic mirror subassembly including front and rear elements defining a chamber therebetween and having electro-optic material disposed in the chamber. A carrier supports the electro-optic mirror subassembly. A bezel is disposed around a periphery of the electro-optic mirror subassembly and has a front lip extending over and bonded to an edge section of a front surface of the front element and further has a side flange that extends from the front lip at least partially along a side of the electro-optic mirror subassembly.

In another aspect of the present invention, a rearview mirror assembly for a vehicle includes a mirror housing defining an interior and a front opening and having a positioning device mounted therein. A mirror element and a carrier supporting the mirror element are positioned in the front opening and are operably attached to the positioning device for angular adjustment. A bezel is disposed around a periphery of the mirror element. The bezel has a laterally extending fin that slidingly engages an inside surface of the mirror housing for closing the interior to prevent visibility into the interior of the mirror housing.

In another aspect of the present invention, a variable reflectance mirror for a vehicle includes a mirror subassembly. A bezel is disposed around and attached to a periphery of the mirror subassembly, the bezel having a laterally extending flexible fin that extends in an outboard lateral direction, the fin being adapted to flexibly engage an inside surface of a mirror housing for closing an interior space to prevent visibility into the interior of the mirror housing.

In yet another aspect of the present invention, an electro-optic variable reflectance mirror for a vehicle includes a front element having a front surface and a rear surface having a first layer of electrically conductive material disposed thereon. The mirror further includes a rear element having a front surface and a rear surface, the front surface of the rear element having a second layer of electrically conductive material disposed thereon. A seal is provided to sealably bond said elements together in a spaced-apart relationship to define a chamber. An electro-optic material is disposed in said chamber. A strip of substantially non-light-transmitting material is disposed on the rear surface of the front element along an edge thereof and extending around the periphery thereof.

In at least one embodiment, an electro-optic element is provided that comprises front and rear substrates that have substantially parallel perimeters aside from portions of the edges that are recessed or provided with tab portions for facilitating contact to associated electrically conductive coatings. In at least one related embodiment, the "second surface" of the front substrate is provided with a substantially transparent electrically conductive layer, or layers, of highly electrically conductive material. In at least one additional embodiment, the "third surface" of the rear substrate is provided with a highly electrically conductive layer, or layers; the second surface of the front substrate may also have a highly electrically conductive layer, or layers. In at least one additional related embodiment, the element is attached to a carrier plate having an integral bezel only proximate an edge associated with the contacts to the electrically conductive coatings. In yet at least one additional embodiment, an element is provided with an at least partially opaque coating around the perimeter of the front substrate, on either the first or second surface, such that the associated seal is not visible. In at least one related embodiment, the perimeter coating has a reflectivity that is substantially matched to the reflectivity of the remainder of the reflective element. In another related embodiment, the perimeter coating is a spectral filter that substantially blocks ultra-violate and, or, infrared light rays from impinging upon the associated seal; the spectral filter may be incorporated within the corresponding substrate as opposed to being a coating on the first or second surface thereof. If a coating such as a reflective material is applied around the perimeter of the mirror on the first or second surface to mask the seal and/or contact area, the reflected color of the coating becomes important. Typically it is desirable to produce a reflective color that is neutral or substantially uniform in the visible spectrum or a reflective color that matches the color of the remainder of the mirror element in the clear or bleached state. When this coating is applied to the second surface over the transparent conductor, the apparent color of the coating when viewed from the front is influenced by the optical properties of the transparent conductor. This color can be controlled by the selection of the materials and thicknesses of the materials used to produce the transparent conductor. If color neutrality is desired, a color suppression layer can be used when depositing the transparent conductor or a very thick layer of conductor that is inherently low in color (about 3 wave or above) can be used. Alternatively, the perimeter coating can be applied to the second surface of the first substrate prior to deposition of the transparent conductor. All of the above techniques for minimizing the contribution the transparent conductor has on hue, also apply if the second surface perimeter coating is black or colored in nature. As an example, the color measurements of a first surface chrome deposition are $a^*$ of $-0.99$ and $b^*$ of $+0.24$ the coating has a reflectance of approximately 65%. The color measurements of one sample electrochromic outside mirror are $a^*$ of $-2.1$ and $b^*$ of $+3.1$ with a reflectance of approximately 58%. In this example, the differences in reflectivity can be observed visually, but the reflectivity match is acceptable for most applications. Reflectivity differences between the perimeter reflector and the primary reflector of less than 10% are preferred while reflectivity differences between the perimeter reflector and the primary reflector of less than 5% are most preferred. Likewise, the color of these two coatings appears to be identical. Comparing this to a sample with a second surface coating of chrome deposited on half-wave ITO, the color and reflectivity measurements are $a^*$ of $-6.2$ and $b^*$ of $+9.1$ with a reflectivity of approximately 50%. In this case, the color difference is notable and objectionable. When comparing the color of the first surface chrome to the color of the electrochromic mirror, the color difference is measured to have a $C^*$ of 3.1, while the color difference between the electrochromic element and the chrome coating on half-wave ITO is 7.3. These examples also show that it is preferable to have a color difference measured by $C^*$ of less than approximately 5 and most preferably around 3 or less. If a perimeter coating is substantially opaque and is applied to either the first or second surface of the first substrate prior to assembling the first substrate to the second substrate and if the reflector on the second substrate is substantially opaque, it is very difficult to visually inspect the primary seal and end plug for defects. If an UV curing plug material is used, it is also very difficult to cure the plug material properly because the plug area is shielded from front and back by substantially opaque coatings. For these reasons, it is very desirable to mask or remove a perimeter portion of the substantially opaque reflective material on surface three or four of the second substrate. If a highly conductive reflector/electrode material is used on surface three, it is possible to mask or remove the majority of the reflector electrode in the seal/plug area and still maintain uniform coloration of the EC mirror. The reflector/electrode can also be applied over a substantially transparent conductor like ITO. The reflector/electrode can be masked during deposition or a portion of the reflector/electrode can be removed in the area of the seal and/or plug to allow inspection and/or curing.

In yet further embodiments, a substantially transparent seal material is used. In at least one related embodiment, the substantially transparent seal material is capable of withstanding without losing adhesive strength ultra-violet and, or, infrared light rays being directly impinged thereon.

In yet at least one additional embodiment, a front substrate is provided that is larger than the rear substrate such that contact to the associate electrically conductive substrates is hidden from view.

These and other features, advantages, and objects of the present invention will be further understood and appreciated by those skilled in the art by reference to the following specification, claims, and appended drawings.

BRIEF DESCRIPTION OF THE DRAWINGS

FIG. 2 is a front elevational view schematically illustrating an inside/outside electro-optic rearview mirror system for motor vehicles, where the outside mirrors incorporate the exterior mirror assembly of the present invention;

FIG. 3A is an enlarged cross-sectional view of an electro-optic mirror element incorporating aspects of a first embodiment of the present invention as taken on the line III-III of FIG. 2;

FIG. 4A is a top plan view of a rear substrate having an electrode formed thereon, as may be used in the electro-optic mirror element shown in FIG. 3A;

FIG. 5 is an enlarged cross-sectional view of an electro-optic mirror element incorporating aspects of a second embodiment of the present invention;

DETAILED DESCRIPTION OF THE PREFERRED EMBODIMENTS

Figure 1A:
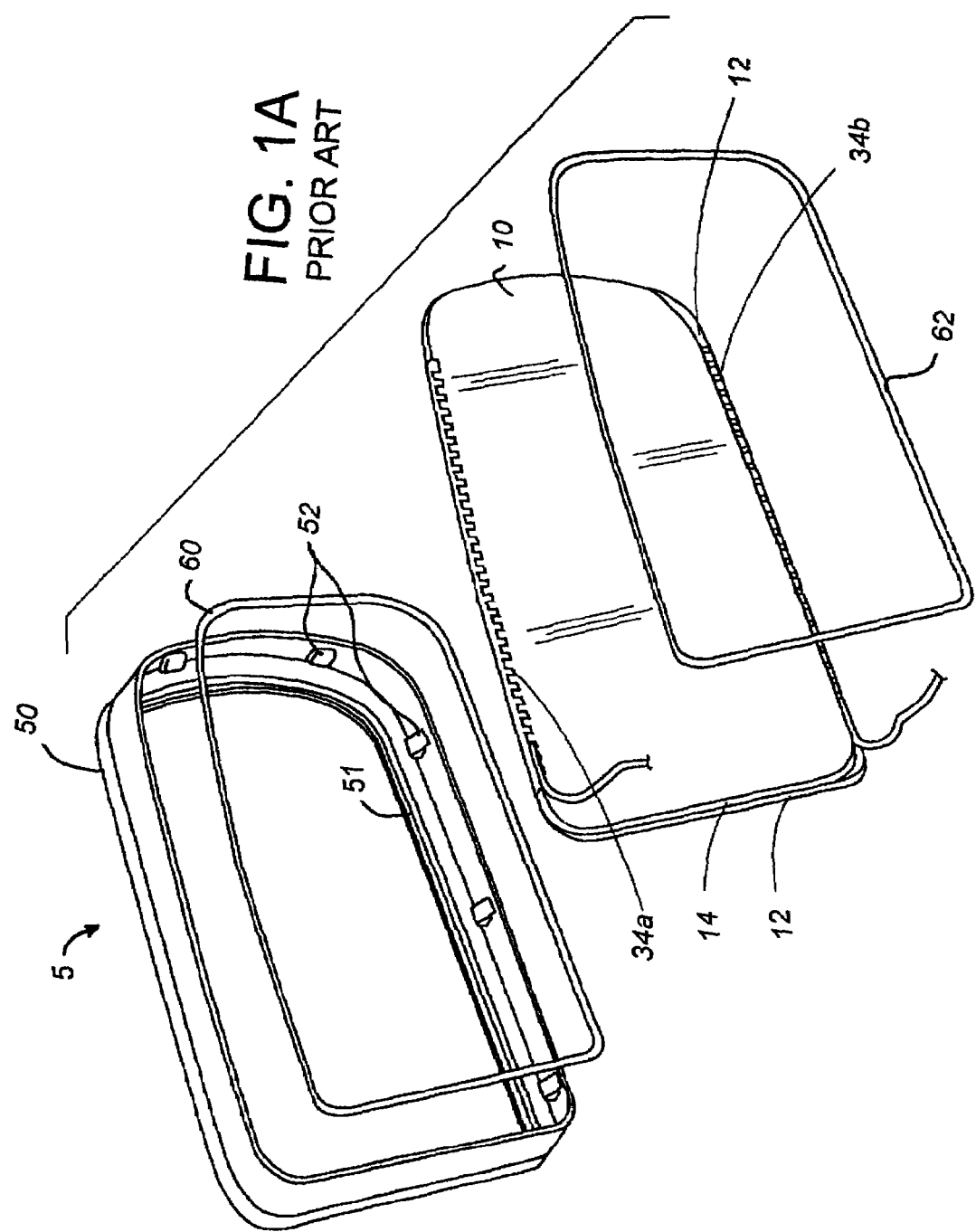
FIG. 1A is an exploded perspective view of a portion of a conventional exterior electro-optic mirror subassembly.
Figure 1B:
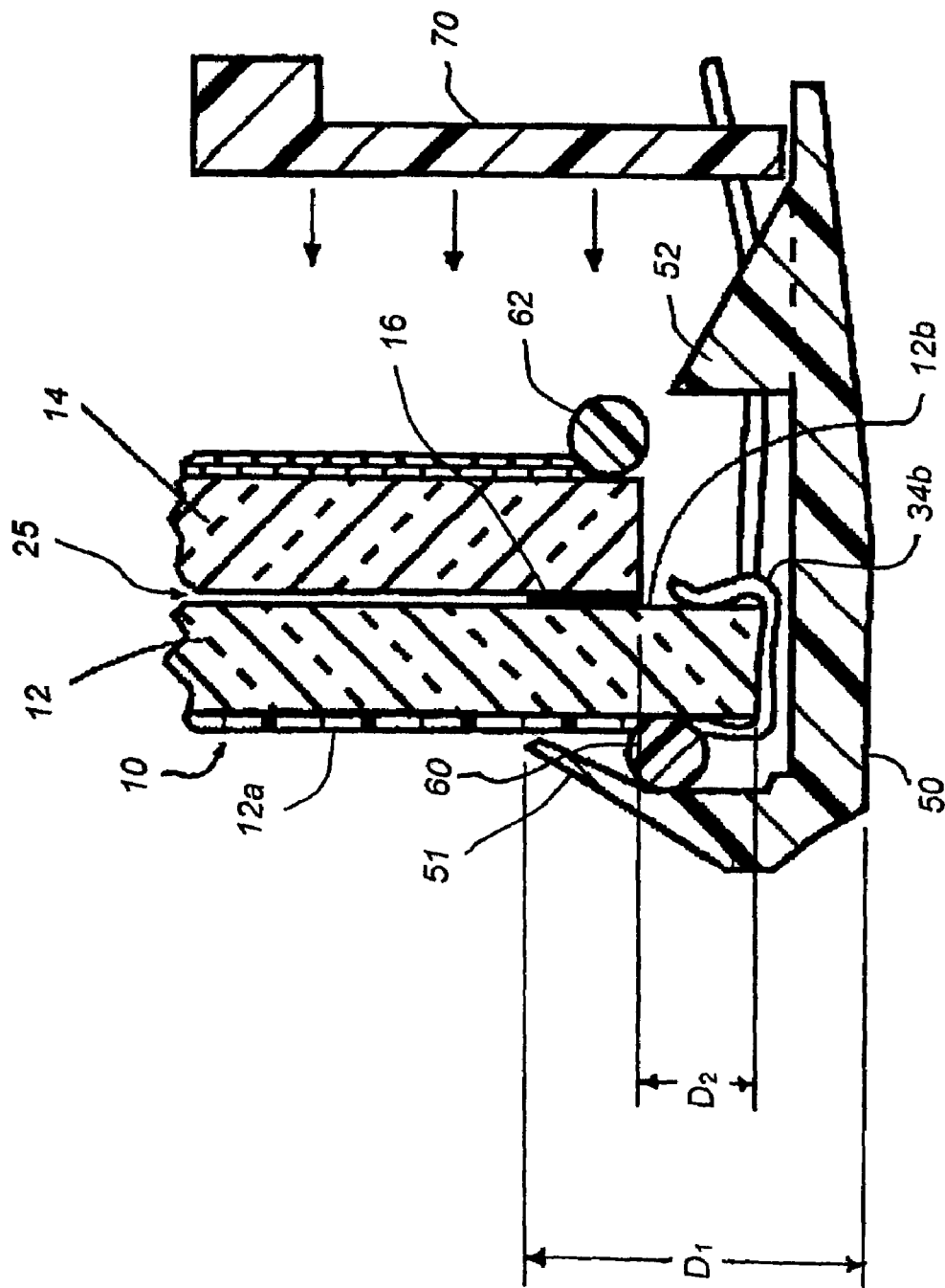
FIG. 1B is an enlarged cross-sectional view of the conventional exterior electro-optic mirror assembly shown in FIG. 1A.

Reference will now be made in detail to the present preferred embodiments of the invention, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As described above, the electro-optic mirror subassemblies provide the advantage of a reduced bezel front lip width of preferably about 4 mm or less, and more preferably less than about 3.6 mm, while still extending over all of the seal width, and preferably extending about 0.5 mm beyond an innermost edge of the seal so as to sufficiently obscure the view of the seal. According to some aspects of the present invention, a bezel may not even be utilized due to other inventive techniques for obscuring the view of the seal through the first transparent element. According to other aspects of the invention, inventive bezels are provided that are made of materials that were not previously used to construct bezels. If an elastomeric bezel material is used with a Shore A durometer of less than 60 for outside mirrors and less than 50 for inside mirrors, a flat bezel profile design can be utilized that has sharp corners which meets the European Standard on edges in a moving vehicle. If the durometer of the bezel material is greater than Shore A of 60 for outside mirrors and less than 50 for inside mirrors, a radius greater than 2.5 mm must be kept on all corners and, or, edges. Thus, there is more design flexibility when the bezel is made of elastomeric materials. In at least one embodiment, a bezel is provided that is constructed of material having a Shore A durometer of less than 60; in a related embodiment, the material has a Shore A durometer of less than 50. In at least one embodiment, a bezel is provide with corners and edges having radii greater than 2.5 mm.

One of the inventive techniques that is common to most of the embodiments described below is to reduce or eliminate the positional offset of the transparent elements of the electro-optic element so as to enable the bezel width to be correspondingly reduced. Various embodiments are thus described below that accomplish this task through varying novel means of electrical coupling to the electrodes of the electro-optic device. The various embodiments are described in detail below, following a general overview of the structural elements that may be common to each of the embodiments.

FIG. 2 shows a front elevational view schematically illustrating an interior mirror assembly 110 and two exterior rearview mirror assemblies 111a and 111b for the driver side and passenger side, respectively, all of which are adapted to be installed on a motor vehicle in a conventional manner and where the mirrors face the rear of the vehicle and can be viewed by the driver of the vehicle to provide a rearward view. Interior mirror assembly 110 and exterior rearview mirror assemblies 111a and 111b may incorporate light-sensing electronic circuitry of the type illustrated and described in the above-referenced Canadian Patent No. 1,300,945, U.S. Pat. No. 5,204,778, U.S. Pat. No. 5,451,822, U.S. Pat. No. 6,402,328, or U.S. Pat. No. 6,386,713 and other circuits capable of sensing glare and ambient light and supplying a drive voltage to the electro-optic element, the disclosures of which are incorporated in their entireties herein by reference.

Mirror assemblies 110, 111a, and 111b are essentially identical in that like numbers identify components of the inside and outside mirrors. These components may be slightly different in configuration, but function in substantially the same manner and obtain substantially the same results as similarly numbered components. For example, the shape of the front glass element of inside mirror 110 is generally longer and narrower than outside mirrors 111a and 111b. There are also some different performance standards placed on inside mirror 110 compared with outside mirrors 111a and 111b. For example, inside mirror 110 generally, when fully cleared, should have a reflectance value of about 70 percent to about 85 percent or higher, whereas the outside mirrors often have a reflectance of about 50 percent to about 65 percent. Also, in the United States (as supplied by the automobile manufacturers), the passenger-side mirror 111b typically has a spherically bent or convex shape, whereas the driver-side mirror 111a and inside mirror 110 presently must be flat. In Europe, the driver-side mirror 111a is commonly flat or aspheric, whereas the passenger-side mirror 111b has a convex shape. In Japan, both outside mirrors have a convex shape. While the focus of the invention is generally towards exterior mirrors, the following description is generally applicable to all mirror assemblies of the present invention including inside mirror assemblies. Moreover, certain aspects of the present invention may be implemented in electro-optic elements used in other applications such as architectural windows, or the like, or even in other forms of electro-optic devices.

FIG. 3A shows a cross-sectional view of an exterior mirror assembly 111 constructed in accordance with at least one embodiment of the present invention, which includes a front substantially transparent element 112 having a front surface 112a and a rear surface 112b, and a rear element 114 having a front surface 114a and a rear surface 114b. For clarity of description of such a structure, the following designations will be used hereinafter. The front surface 112a of the front glass element will be referred to as the first surface, and the back surface 112b of the front glass element as the second surface. The front surface 114a of the rear glass element will be referred to as the third surface, and the back surface 114b of the rear glass element as the fourth surface. A chamber 125 is defined by a layer of substantially transparent conductor electrode 128 (carried on second surface 112b), an electrode 120 (disposed on third surface 114a), and an inner circumferential wall 132 of sealing member 116. An electrochromic medium 126 is contained within chamber 125. The edges of the elements 112 and 114 preferably have a "zero offset", which as used herein means they are on average less than about 1 mm from being in perfect alignment, or more preferably are within about 0.5 mm from being in perfect alignment. The zero offset can extend completely around the elements 112 and 114, or may extend along portions thereof, such as along edge portions having a bus connector or electrical conductor for the electrochromic material circuit. This small or zero offset results in further reducing a total width or size of the edge bezel (see, for example, items 144 (FIG. 18), 144a (FIG. 19), 182 (FIG. 21B), 182b (FIG. 21E), 166 (FIG. 22), or 344-344P (FIGS. 34-51).

As broadly used and described herein, the reference to an electrode or layer as being "carried" on a surface of an element refers to both electrodes or layers that are disposed directly on the surface of an element or disposed on another coating, layer or layers that are disposed directly on the surface of the element.

Front transparent element 112 may be any material which is substantially transparent and has sufficient strength to be able to operate in the conditions, e.g., varying temperatures and pressures, commonly found in the automotive environment. Front element 112 may comprise any type of borosilicate glass, soda lime glass, float glass, or any other material, such as, for example, a polymer or plastic, that is transparent in the visible region of the electromagnetic spectrum. Front element 112 is preferably a sheet of glass. The rear element must meet the operational conditions outlined above, except that it does not need to be transparent in all applications, and therefore may comprise polymers, metals, glass, ceramics, and preferably is a sheet of glass.

The electrode 120 on the third surface 114a is sealably bonded to the electrode 128 on the second surface 112b in a spaced-apart and parallel relationship by a seal member 116 disposed near the outer perimeter of both second surface 112b and third surface 114a. Seal member 116 may be any material that is capable of adhesively bonding the coatings on the second surface 112b to the coatings on the third surface 114a to seal the perimeter such that electrochromic material 126 does not leak from chamber 125. As described below, the layer of transparent conductive coating 128 and/or the layer of electrode 120 may be removed over a portion where the seal member is disposed. In such a case, seal member 116 should bond well to glass.

The performance requirements for a perimeter seal member 116 used in an electrochromic device are similar to those for a perimeter seal used in a liquid crystal device (LCD), which are well known in the art. The seal must have good adhesion to glass, metals and metal oxides; must have low permeabilities for oxygen, moisture vapor, and other detrimental vapors and gases; and must not interact with or poison the electrochromic or liquid crystal material it is meant to contain and protect. The perimeter seal can be applied by means commonly used in the LCD industry, such as by silk-screening or dispensing. Because of their lower processing temperatures, thermoplastic, thermosetting or UV curing organic sealing resins are preferred. Such organic resin sealing systems for LCDs are described in U.S. Pat. Nos. 4,297,401, 4,418,102, 4,695,490, 5,596,023, and 5,596,024. Because of their excellent adhesion to glass, low oxygen permeability and good solvent resistance, epoxy-based organic sealing resins are preferred. These epoxy resin seals may be UV curing, such as described in U.S. Pat. No. 4,297,401, or thermally curing, such as with mixtures of liquid epoxy resin with liquid polyamide resin or dicyandiamide, or they can be homopolymerized. The epoxy resin may contain fillers or thickeners to reduce flow and shrinkage such as fumed silica, silica, mica, clay, calcium carbonate, alumina, etc., and/or pigments to add color. Fillers pretreated with hydrophobic or silane surface treatments are preferred. Cured resin crosslink density can be controlled by use of mixtures of mono-functional, di-functional, and multi-functional epoxy resins and curing agents. Additives such as silanes, titanates, or sulfur or phosphorous compounds can be used to improve the seal's hydrolytic stability and adhesion, and spacers such as glass or plastic beads or rods can be used to control final seal thickness and substrate spacing. Suitable epoxy resins for use in a perimeter seal member 116 include, but are not limited to: "EPON RESIN" 813, 825, 826, 828, 830, 834, 862, 1001F, 1002F, 2012, DPS-155, 164, 1031, 1074, 58005, 58006, 58034, 58901, 871, 872, and DPL-862 available from Shell Chemical Co., Houston, Tex.; "ARALITE" GY 6010, GY 6020, CY 9579, GT 7071, XU 248, EPN 1139, EPN 1138, PY 307, ECN 1235, ECN 1273, ECN 1280, MT 0163, MY 720, MY 0500, MY 0510, and PT 810 available from Ciba Geigy, Hawthorne, N.Y.; and "D.E.R." 331, 317, 361, 383, 661, 662, 667, 732, 736, "D.E.N." 354, 354LV, 431, 438, 439 and 444 available from Dow Chemical Co., Midland, Mich. Suitable epoxy curing agents include V-15, V-25, and V-40 polyamides from Shell Chemical Co.; "AJICURE" PN-23, PN-34, and VDH available from Ajinomoto Co., Tokyo, Japan; "CUREZOL" AMZ, 2MZ, 2E4MZ, C11Z, C17Z, 2PZ, 2IZ, and 2P4MZ available from Shikoku Fine Chemicals, Tokyo, Japan; "ERISYS" DDA or DDA accelerated with U-405, 24EMI, U-410, and U-415 available from CVC Specialty Chemicals, Maple Shade, N.J.; and "AMICURE" PACM, 2049, 352, CG, CG-325, and CG-1200 available from Air Products, Allentown, Pa. Suitable fillers include fumed silica such as "CAB-O-SIL" L-90, LM-130, LM-5, PTG, M-5, MS-7, MS-55, TS-720, HS-5, and EH-5 available from Cabot Corporation, Tuscola, Ill.; "AEROSIL" R972, R974, R805, R812, R812 S, R202, US204, and US206 available from Degussa, Akron, Ohio. Suitable clay fillers include BUCA, CATALPO, ASP NC, SATINTONE 5, SATINTONE SP-33, TRANSLINK 37, TRANSLINK 77, TRANSLINK 445, and TRANSLINK 555 available from Engelhard Corporation, Edison, N.J. Suitable silica fillers are SILCRON G-130, G-300, G-100-T, and G-100 available from SCM Chemicals, Baltimore, Md. Suitable silane coupling agents to improve the seal's hydrolytic stability are Z-6020, Z-6030, Z-6032, Z-6040, Z-6075, and Z-6076 available from Dow Corning Corporation, Midland, Mich. Suitable precision glass microbead spacers are available in an assortment of sizes from Duke Scientific, Palo Alto, Calif. The seal may be constructed in accordance with the teachings in U.S. Pat. Nos. 5,790,298 and 6,157,480, the entire disclosures of which are incorporated herein by reference.

Another suitable way to maintain precision spacing between the two pieces of glass is by adding plastic fibers to the seal material. These fibers if cut from monofilament in an aspect ratio of about 2.5 to 3 to 1 (length to diameter) are particularly effective in keeping the two substrates from sliding during the seal cure process. The glass spheres act as ball bearings that can enable movement between the substrates during seal cure. Plastic fibers made of high temperature polyester (PEN) or polyetherimide (Ultem) when added to the seal material at around a 1% by weight loading help prevent substrate movement because they are randomly orientated and some will not be positioned to roll. These plastic spacers have another benefit in that they more closely match the thermal expansion of cured organic seal material and consequently will generate less seal stress during thermal cycling.

The layer of a substantially transparent electrically conductive material 128 is deposited on the second surface 112$b$ to act as an electrode. Substantially transparent conductive material 128 may be any material which bonds well to front element 112, is resistant to corrosion to any materials within the electrochromic device, is resistant to corrosion by the atmosphere or road salts, has minimal diffuse or specular reflectance, high light transmission, near neutral coloration, and good electrical conductance. Transparent conductive material 128 may be fluorine-doped tin oxide, doped zinc oxide, indium zinc oxide ($Zn_3In_2O_6$), indium tin oxide (ITO), ITO/metal/ITO (IMI) as disclosed in "Transparent Conductive Multilayer-Systems for FPD Applications," by J. Stollenwerk, B. Ocker, K. H. Kretschmer of LEYBOLD AG, Alzenau, Germany, the materials described in above-referenced U.S. Pat. No. 5,202,787, such as TEC 20 or TEC 15, available from Libbey Owens-Ford Co. of Toledo, Ohio, other transparent conductive metal oxides, or other transparent conductors. Generally, the conductance of transparent conductive material 128 will depend on its thickness and composition. IMI generally has superior conductivity compared with the other materials. IMI, however, is known to undergo more rapid environmental degradation and suffer from interlayer delamination. The thicknesses of the various layers in the IMI structure may vary, but generally the thickness of the first ITO layer ranges from about 10 Å to about 200 Å, the metal ranges from about 10 Å to about 200 Å, and the second layer of ITO ranges from about 10 Å to about 200 Å. If desired, an optional layer or layers of a color suppression material (not shown) may be deposited between transparent conductive material 128 and the second surface 112$b$ to suppress the reflection of any unwanted portions of the electromagnetic spectrum.

A combination reflector/electrode 120 is preferably disposed on third surface 114$a$. Reflector/electrode 120 comprises at least one layer of a reflective material, which serves as a mirror reflectance layer and also forms an integral electrode in contact with and in a chemically and electrochemically stable relationship with any constituents in an electrochromic medium. Reflector/electrode may be mostly reflective or may be partially transmissive/partially reflective (or "transflective") as disclosed in commonly-assigned U.S. patent application Ser. No. 10/115,860, filed on Apr. 3, 2002, entitled "ELECTROCHROMIC REARVIEW MIRROR ASSEMBLY INCORPORATING A DISPLAY/SIGNAL LIGHT," by William L. Tonar et al., the entire disclosure of which is incorporated herein by reference. As an alternative, the electrochromic device could incorporate a transparent conductive material on the third surface, which acts as an electrode, and incorporate a reflector on the fourth surface. However, combining the "reflector" and "electrode" and placing both on the third surface is preferred because it makes the device manufacture less complex and allows the device to operate with higher performance. The combined reflector/electrode 120 on the third surface generally has higher conductance than a conventional transparent electrode as used on the third surface. One can either change the composition of the transparent conductive electrode on the second surface to one that has lower conductance (being cheaper and easier to produce and manufacture) while maintaining coloration speeds similar to that obtainable with a fourth surface reflector device, while at the same time decreasing substantially the overall cost and time to produce the electrochromic device. If, however, performance of a particular design is of utmost importance, a moderate to high conductance transparent electrode can be used on the second surface, such as, for example, ITO, IMI, etc. The combination of a high conductance (i.e., less than 250 $\Omega/\square$, preferably less than 15 $\Omega/\square$, and most preferably between approximately 15 $\Omega/\square$ and approximately 0.01 $\Omega/\square$) reflector/electrode on the third surface and a high conductance substantially transparent electrode on the second surface will not only produce an electrochromic device with more even overall coloration, but will also allow for increased speed of coloration. Furthermore, in fourth surface reflector mirror assemblies, there are two substantially transparent electrodes with relatively low conductance, and in previously used third surface reflector mirrors, there is a substantially transparent electrode and a reflector/electrode with relatively low conductance and, as such, a long bus bar on the front and rear element to bring current in and out is necessary to ensure adequate coloring speed and coloring uniformity. The third surface electrode of at least some embodiments of the present invention is metallic and may have a higher conductance and therefore has a very even voltage or potential distribution across the conductive surface, even with a small or irregular contact area. Thus, the present invention provides greater design flexibility by allowing the electrical contact for the third surface electrode to be very small (if desired) while still maintaining adequate coloring speed and coloring uniformity.

It is desirable in the construction of outside rearview mirrors to incorporate thinner glass in order to decrease the overall weight of the mirror so that the mechanisms used to manipulate the orientation of the mirror are not overloaded. Decreasing the weight of the device also improves the dynamic stability of the mirror assembly when exposed to vibrations. Alternatively, decreasing the weight of the mirror element may permit more electronic circuitry to be provided in the mirror housing without increasing the weight of the mirror housing. Thin glass may be prone to warpage or breakage, especially when exposed to extreme environments. This problem is substantially improved by using an improved electrochromic device incorporating two thin glass elements having an improved gel material. This improved device is disclosed in commonly assigned U.S. Pat. No. 5,940,201 entitled "ELECTROCHROMIC MIRROR WITH TWO THIN GLASS ELEMENTS AND A GELLED ELECTROCHROMIC MEDIUM," filed on Apr. 2, 1997. The entire disclosure of this patent is incorporated herein by reference. The addition of the combined reflector/electrode onto the third surface of the device further helps remove any residual double imaging resulting from the two glass elements being out of parallel. Thus, chamber 125 preferably contains a free-standing gel that cooperatively interacts with thin glass elements 112 and 114 to produce a mirror that acts as one thick unitary member rather than two thin glass elements held together only by a seal member. In free-standing gels, which contain a solution and a cross-linked polymer matrix, the solution is interspersed in a polymer matrix and continues to function as a solution. Also, at least one solution-phase electrochromic material is in solution in the solvent and therefore as part of the solution is interspersed in the polymer matrix (this generally being referred to as "gelled electrochromic medium" 126). This allows one to construct a rearview mirror with thinner glass in order to decrease the overall weight of the mirror while maintaining sufficient structural integrity so that the mirror will survive the extreme conditions common to the automobile environment. This also helps maintain uniform spacing between the thin glass elements, which improves uniformity in the appearance (e.g., coloration) of the mirror. This structural integrity results because the free-standing gel, the first glass element 112, and the second glass element 114, which individually have insufficient strength characteristics to work effectively in an electrochromic mirror, couple in such a manner that they no longer move independently but act as one thick unitary member. This stability includes, but is not limited to, resistance to flexing, warping, bowing and breaking, as well as improved image quality of the reflected image, e.g., less distortion, double image, color uniformity, and independent vibration of each glass element. However, while it is important to couple the front and rear glass elements, it is equally important (if not more so) to ensure that the electrochromic mirror functions properly. The free-standing gel must bond to the electrode layers (including the reflector/electrode if the mirror has a third surface reflector) on the walls of such a device, but not interfere with the electron transfer between the electrode layers and the electrochromic material(s) disposed in the chamber 116. Further, the gel must not shrink, craze, or weep over time such that the gel itself causes poor image quality. Ensuring that the free-standing gel bonds well enough to the electrode layers to couple the front and rear glass elements and does not deteriorate over time while allowing the electrochromic reactions to take place as though they were in solution, is an important aspect of the present invention. When using a first surface reflector around the perimeter of an electro-optic mirror where the primary reflector is on one of the other surfaces, the distance between the two reflective surfaces causes a dark shadow area to be formed when viewing the mirror from an angle. The shadow increases in size with thicker substrates and decreases in size for thinner substrates. The shadow creates a region of discontinuous reflection and is undesirable when viewing an object in the mirror. To minimize this shadow a first substrate with a thickness of less than 2.0 mm is preferred. It is more preferred to use a first substrate of approximately 1.8 mm or less, and most preferred to use a first substrate of approximately 1.1 mm or less.

To perform adequately, a mirror must accurately represent the reflected image, and this cannot be accomplished when the glass elements (to which the reflector is attached) tend to bend or bow while the driver is viewing the reflected image. The bending or bowing occurs mainly due to pressure points exerted by the mirror mounting and adjusting mechanisms and by differences in the coefficients of thermal expansion of the various components that are used to house the exterior mirror element. These components include a carrier plate used to attach the mirror element to the mechanism used to manipulate or adjust the position of the mirror (bonded to the mirror by an adhesive), a bezel, and a housing. Many mirrors also typically have a potting material as a secondary seal. Each of these components, materials, and adhesives has varying coefficients of thermal expansion that will expand and shrink to varying degrees during heating and cooling and will exert stress on the glass elements 112 and 114. On very large mirrors, hydrostatic pressure becomes a concern and may lead to double imaging problems when the front and rear glass elements bow out at the bottom and bow in at the top of the mirror. By coupling the front and rear glass elements, the thin glass/free-standing gel/thin glass combination acts as one thick unitary member (while still allowing proper operation of the electrochromic mirror) and thereby reduces or eliminates the bending, bowing, flexing, double image, and distortion problems and non-uniform coloring of the electrochromic medium.

The cooperative interaction between the freestanding gel and the thin glass elements of the present invention also improves the safety aspects of the electrochromic mirror 110 having thin glass elements. In addition to being more flexible, thin glass is more prone to breakage than thick glass. By coupling the free-standing gel with the thin glass, the overall strength is improved (as discussed above) and further restricts shattering and scattering and eases clean-up in the case of breakage of the device.

An improved cross-linked polymer matrix used in at least one embodiment of the present invention is disclosed in commonly assigned U.S. Pat. No. 5,928,572 entitled "ELECTROCHROMIC LAYER AND DEVICES COMPRISING SAME" filed on Mar. 15, 1996. The entire disclosure of this patent is incorporated herein by reference.

Typically, electrochromic mirrors are made with glass elements having a thickness of about 2.3 mm. The preferred thin glass elements according to at least one embodiment of the present invention have thicknesses of about 1.1 mm, which results in a substrate weight savings of more than 50 percent.

This decreased weight ensures that the mechanisms used to manipulate the orientation of the mirror, commonly referred to as carrier plates, are not overloaded and further provides significant improvement in the vibrational stability of the mirror.

In at least one embodiment, front transparent element 112 is thus preferably a sheet of glass with a thickness ranging from 0.5 mm to about 1.8 mm, preferably from about 0.5 mm to 1.6 mm, more preferably from about 0.5 mm to 1.5 mm, even more preferably from about 0.8 mm to about 1.2 mm, with the presently most preferred thickness about 1.1 mm. Rear element 114 preferably is a sheet of glass with a thickness in the same ranges as element 112.

When both glass elements are made thin, the vibrational properties of an interior or exterior mirror improve—although the effects are more significant for exterior mirrors. These vibrations that result from the engine running and/or the vehicle moving affect the rearview mirror, such that the mirror essentially acts as a weight on the end of a vibrating cantilever beam. This vibrating mirror causes blurring of the reflected image that is a safety concern as well as a phenomenon that is displeasing to the driver. As the weight on the end of the cantilever beam (i.e., the mirror element attached to the carrier plate on the outside mirror or the mirror mount on the inside mirror) is decreased, the frequency at which the mirror vibrates increases. If the frequency of the mirror vibration increases to around 60 Hertz or greater, the blurring of the reflected image is not visually displeasing to the vehicle occupants. Moreover, as the frequency at which the mirror vibrates increases, the distance the mirror travels while vibrating decreases significantly. Thus, by decreasing the weight of the mirror element, the complete mirror becomes more vibrationally stable and improves the ability of the driver to view what is behind the vehicle. For example, an interior mirror with two glass elements having a thickness of 1.1 mm has a first mode horizontal frequency of about 55 Hertz whereas a mirror with two glass elements of 2.3 mm has a first mode horizontal frequency of about 45 Hertz. This 10 Hertz difference produces a significant improvement in how a driver views a reflected image.

A resistive heater (not shown) may be disposed on the fourth glass surface 114b to heat the mirror and thereby clear the mirror of ice, snow, fog, or mist. The resistive heater may optionally be a layer of ITO, fluorine-doped tin oxide applied to the first and, or, fourth surface, or may be other heater layers or structures well known in the art.

Referring again to FIG. 2, rearview mirrors embodying aspects of the present invention may include a housing or bezel 144, which extends around the entire periphery of each individual assembly 110, 111a, and/or 111b. The bezel 144 conceals and protects the bus connector (if present) and the seal. A wide variety of bezel designs are well known in the art, such as, for example, the bezel taught and claimed in above-referenced U.S. Pat. No. 5,448,397.

An electrical circuit such as those taught in the above-referenced Canadian Patent No. 1,300,945 and U.S. Pat. Nos. 5,204,778, 5,434,407, 5,451,822, 6,402,328, and 6,386,713, is connected to and allows control of the potential to be applied across electrode 120 and transparent electrode 128, such that electrochromic medium 126 will darken and thereby attenuate various amounts of light traveling therethrough and thus vary the reflectance of the mirror containing electrochromic medium 126. The electrical circuit used to control the reflectivity of the electrochromic mirrors preferably incorporates an ambient light sensor (not shown) and a glare light sensor 160, the glare light sensor being positioned either behind the mirror glass and looking through a section of the mirror with the reflective material completely or partially removed, or the glare light sensor can be positioned outside the reflective surfaces, e.g., in the bezel 144 or as described below, the sensor can be positioned behind a uniformly deposited transflective coating. Additionally, an area or areas of the electrode and reflector, such as 146, may be completely removed or partially removed as described below to permit a vacuum fluorescent display, such as a compass, clock, or other indicia, to show through to the driver of the vehicle or as also described below, this light emitting display assembly can be shown through a uniformly deposited transflective coating. The present invention is also applicable to a mirror which uses only one video chip light sensor to measure both glare and ambient light and which is further capable of determining the direction of glare. An automatic mirror on the inside of a vehicle, constructed according to this invention, can also control one or both outside mirrors as slaves in an automatic mirror system wherein the individual mirror elements are independently controllable.

Features of at least one embodiment of the invention are described below with respect to FIGS. 3A and 4A. FIG. 4A shows a top plan view of the second transparent element 114 with electrode 120 deposited thereon, as may be used with the structure shown in FIG. 3A. As shown in FIG. 4A, the electrode 120 is separated into two distinct electrode areas—a first portion 120a and a second portion 120b electrically isolated and physically separated by an area 120c devoid of electrode material or any other electrically conductive material. The electrode material should not be present in area 120c, so that there is no chance of current flow directly from first portion 120a to second portion 120b. There are many methods of removing the electrode material 120 from area 120c, such as, for example, chemical etching, laser ablating, physical removal by scraping, etc. Deposition in area 120c can also be avoided by use of a mask during deposition of electrode.

As shown in FIG. 3A, second portion 120b of electrode 120 is in electrical contact with the electrochromic medium 126 at the third surface 114a of the electrochromic device, while first portion 120a is physically isolated from electrochromic medium 126 by either area 120c, seal 116, or both. First portion 120a, however, is electrically coupled to a portion of the transparent electrode 128 on the second surface 112b of the electrochromic device by means of an electrical conductor, which may extend around some or most of the periphery of the seal. Thus, a short circuit is effectively provided between portions of electrode layers 120 and 128. This short circuit allows the bus clip normally attached to the peripheral edge of the first transparent element 112 to instead be attached to the second element 114. More specifically, electrical connection between the power supply and transparent electrode 128 on the second surface may be made by connecting the bus bars (or clips 119a) to the first portion 120a of electrode layer 120. Electrical connection to second portion 120b may be made using a clip 119b that is attached to an extension 120d of portion 120b that extends to the peripheral edge of element 114. This configuration is advantageous in that it allows connection to the transparent conductive material 128 nearly all the way around the circumference, and therefore improves the speed of dimming and clearing of the electrochromic media 126. As will be described further below with respect to other embodiments, clips 119a and 119b may be replaced with other forms of electrical connectors.

FIG. 3A shows two different forms of electrical conductors for coupling the first portion 120a of electrode 120 to a portion of electrode 128. As shown on the left side of the device, conductive particles 116b may be distributed through part of the seal material 116 such that a portion of seal 116 is electrically conductive. Seal 116 is preferably not electrically conductive across its entire width, but rather electrically insulates the conductive portion of the seal from the electrochromic medium 126 and does not provide a short circuit between electrode 128 and second portion 120b of electrode 120. In this manner, the drive potential from the power supply travels through the first portion 120a of electrode 120 and conductive particles 116b in seal 116 before reaching transparent conductor 128.

In such a configuration, seal 116 comprises a typical sealing material, e.g., epoxy 116a, with the conductive particles 116b contained therein. The conductive particles may be small, such as, for example, gold, silver, copper, etc. coated plastic with a diameter ranging from about 5 microns to about 80 microns, in which case there must be a sufficient number of particles to ensure sufficient conductivity between the first portion 120a of electrode 120 and the transparent electrode 128. Alternatively, the conductive particles may be large enough to act as spacers, such as, for example, gold, silver, copper, etc., coated glass or plastic beads. The conductive particles may further be in the form of flakes or other suitable shapes or combination of different shapes.

A variety of methods can be used to ensure that no conductive particles 116b enter into area 120b such as, for example, disposing a nonconductive material into the area 120c of electrode 120 that is devoid of conductive material. A dual dispenser could be used to deposit the seal 116 with conductive particles 116b onto first portion 120a and simultaneously deposit the nonconductive material into electrode area 120c. A general method of ensuring that no conductive particles reach electrode area 120b is to make sure seal 116 has proper flow characteristics, such that the conductive portion 116b tends to stay behind as the sealant is squeezed out during assembly, and only the non-conductive portion of 116 flows into area 120b. Another method would be to dispense the non-conductive seal material(s) between the substrates, separately cure, or partially cure, the dispensed non-conductive seal, and then inject the conductive epoxy between the two substrates.

In an alternative implementation shown in the right side of the device of FIG. 3A, a larger electrical conductor 116b is provided, which may also serve as a spacer. Such a larger electrical conductor may be a single wire, a braided wire, a conductive strip, or simply large particles or beads that are either electrically conductive throughout or coated with an electrically conductive material.

Seal 116 need not contain conductive particles or other electrical conductor 116b and, instead, a conductive member or material 116c may be placed on or in the outer edge of seal 116 to interconnect transparent conductive material 128 to first portion 120a of electrode 120. Such a conductive member 116c may be used in combination with conductors in the seal or otherwise between elements 112 and 114.

Figure 3B:
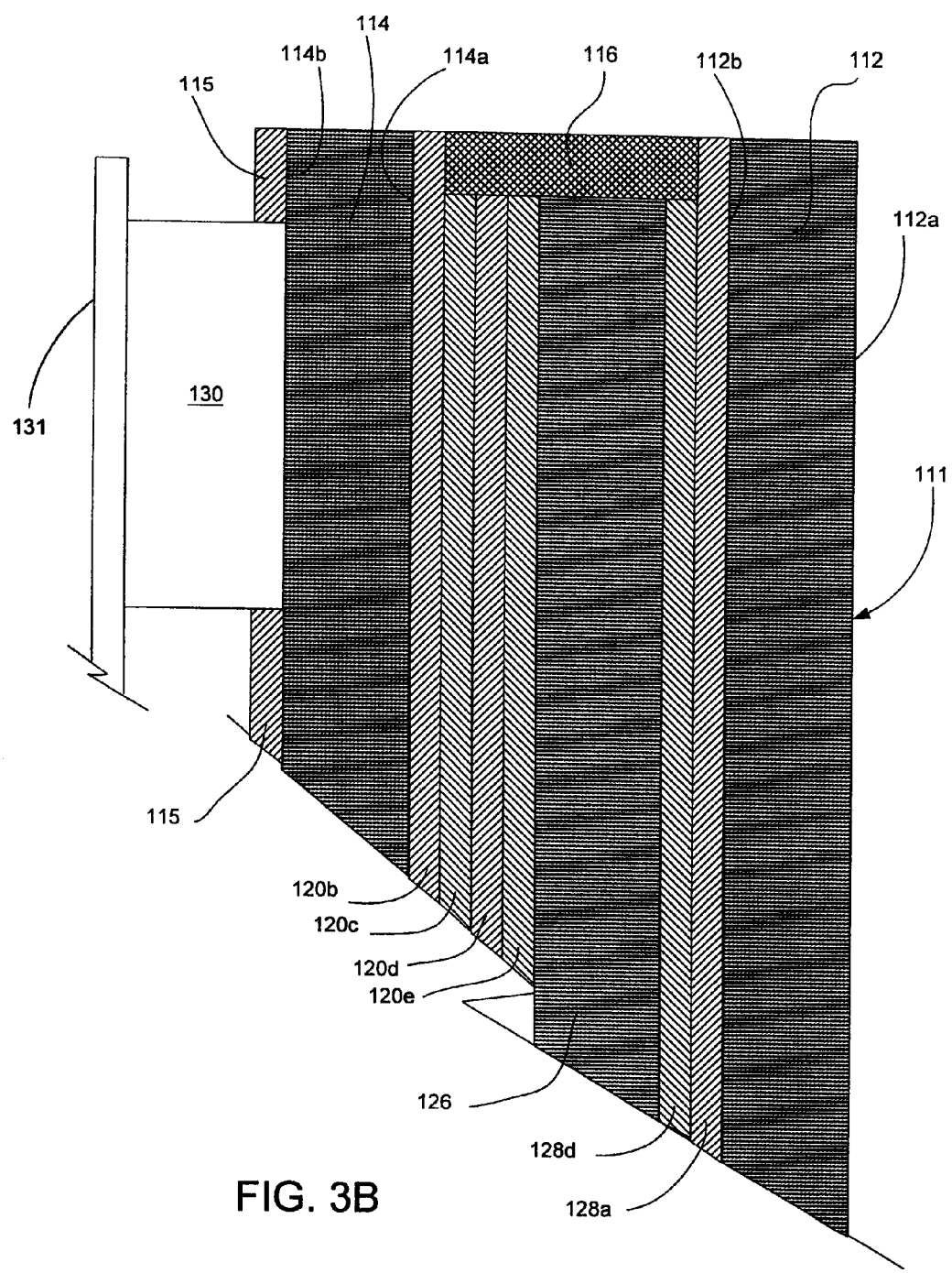
FIG. 3B depicts a cross-sectional view of an electro-optic mirror element incorporating a light source.

Turning now to FIG. 3B, a cross-sectional view of an electro-optic mirror element 111 is depicted to include a light source 130 mounted to a circuit board 131 positioned such that light rays emitted by the light source 130 are transmitted through the element 111 to a viewer. In a preferred embodiment, mirror element 111 comprises a first substantially transparent substrate 112 spaced apart from a second substrate 114 with seal member 116 therebetween. The first substantially transparent substrate has a first surface 112a and a second surface 112b. Preferably, the second surface comprises a highly conductive substantially transparent layer 128a, or layers 128a and 128b, thereon having a sheet resistance between approximately 1 $\Omega/\square$ and approximately 10 $\Omega/\square$, preferably between approximately 2 $\Omega/\square$ and approximately 6 $\Omega/\square$ and most preferably approximately 3 $\Omega/\square$. In embodiments wherein fast dimming speeds and, or, short contact is desired, a highly conductive second surface substantially transparent electrically conductive layer is desirable. Typically half wave ITO or full wave SnO(F) with a sheet resistance of 10 to 15 $\Omega/\square$ is used on the second surface in electro-optic mirrors made today. To increase the dimming speed of the device and, or, provide fairly uniform electro-optic coloring while reducing the length of the electrical contact to the corresponding electrically conductive layer(s), it is desirable to have a relatively low sheet resistance. This low sheet resistance can be achieved by providing thicker layers of conventional materials such as ITO, tin-oxide, zinc-oxide, or combinations thereof. If the optical thickness of the coatings is two wave, or above, there are also benefits in the color intensity and color variation that is contributed to the low end reflectance of the associated mirror element when compared to thinner coatings that are not color suppressed thicker layers, approximately two wave or above, provide benefits with regard to manufacturing variances. Other suitable low sheet resistance substantially transparent conductors can be made by combining layers of conductive metal oxides with metals or metal alloys. These stacks may be ITO/silver/ITO or ITO/silver alloy/ITO or may be stacks such as those used as low E coatings in the IG industries such as ZnO/Ag/ZnO/Ag/ZnO. Unlike low E coatings for windows, to be useful in an electrochromic device, the conductivity interlayer should be continuous and the conductivity must reach the surface. To improve interlayer conductivity, dopants may be added such as aluminum or gallium. These dopants enhance the conductivity of the ZnO layers. To prevent oxidation of the metal or metal alloy, thin layers of a protective metal such as titanium or zinc can be applied during the deposition process. The element shown in FIG. 3B comprises a four layer stack coating 120b, 120c, 120d, 120e applied to the third surface 114a of the second substrate 114. An opaque material 115 is applied to the fourth surface 114b with a cut-out for the light source 130 to project through. Many alternate coatings and reflective, transflective, and substantially transparent layers are disclosed in various U.S. Patents and U.S. Patent Applications incorporated herein by reference. It should be understood that a lower sheet resistance coating may be provided in an area proximate the associated electrical contact or around a perimeter area and allow the sheet resistance to increase as the distance from the electrical contact increases; this is particularly applicable when point contacts are utilized.

Figure 3C:
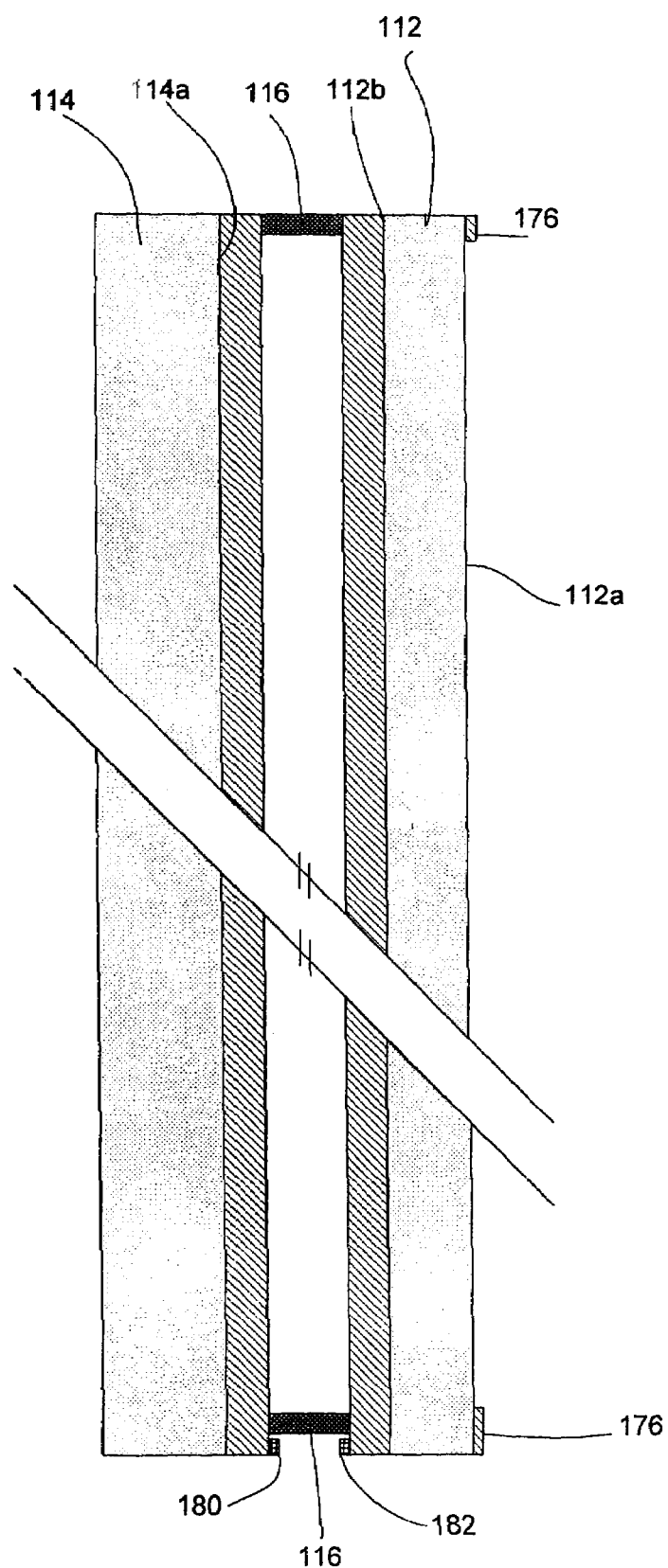
FIG. 3C depicts a cross-sectional view of an electro-optic mirror element incorporating tab portions for making contact to the associated electrical conductive layers.

Turning now to FIG. 3C, a cross-sectional view of a mirror element is shown to include a first substantially transparent substrate 112 in a spaced apart relationship to a second substrate 114 with a seal member 116 therebetween. A substantially transparent electrically conductive layer is applied to the second surface 112b and a reflective electrode layer is applied to the third surface 114a. Preferably, a substantially opaque material 176 is applied to the first surface 112a such that light rays are prevented from impinging upon seal member 116. Contacts 180, 182 are provided to facilitate electrical connection to the third and second surface electrically conductive layers, respectively. In a preferred embodiment, the substantially opaque material has a reflectivity substantially equivalent to that of the third surface reflective electrode layer. In an alternate embodiment, the substantially opaque material is transmissive to all wavelengths of light except those wavelengths in the ultra-violet and, or, infrared spectrums and the seal material is substantially transparent. The substantially opaque material may be provided on the second surface 112b in lieu of the first surface 112a or it may be embedded in the first substrate. A reflective material such as, for instance, chrome, molybdenum, stainless steel, nickel or titanium applied to the perimeter of a mirror on the first surface or second surface of a front substrate with proper edge treatment can produce an EC mirror assembly that requires no bezel or a minimal edge lip and/or bezel. The reflective material needs to exhibit good adhesion to glass or to coatings on the glass, and if used on surface one, good abrasion resistance and good environmental stability (water, salt, etc.). It is also desirable to have this ring closely match the color and reflectivity of the interior EC mirror system. If the EC mirror proper has a reflectivity between around 50% to 70% a front surface chrome perimeter coating matches well. If the EC mirror system has a reflectivity greater than 70% it may be necessary to increase the reflection of the perimeter ring. This can be done without compromising the abrasion resistance and chemical durability by making the ring out of highly reflective hard metals (hardness of 5 mhos or above) such as metals from the platinum metals group which include rhodium, platinum and ruthenium. Because these metals do not adhere well to glass or glass-like metal oxide coatings, it is preferred that these highly reflective metals are put over a layer such as chrome that has good glass adhesion. Therefore a combination such as a base layer of chrome, molybdenum or nickel over coated with a hard high reflectance material such as rhodium, ruthenium or platinum will adhere well to glass like materials, resist abrasion and have good environmental durability. If a ring with low reflectivity that is dark or black is desired a coating of materials such as "black chrome" or oxides of Cr, Cu, Mn, Mo, and Fe or their combinations can be used. A ring that is a particular color can be made in a similar fashion.

Figure 4B:
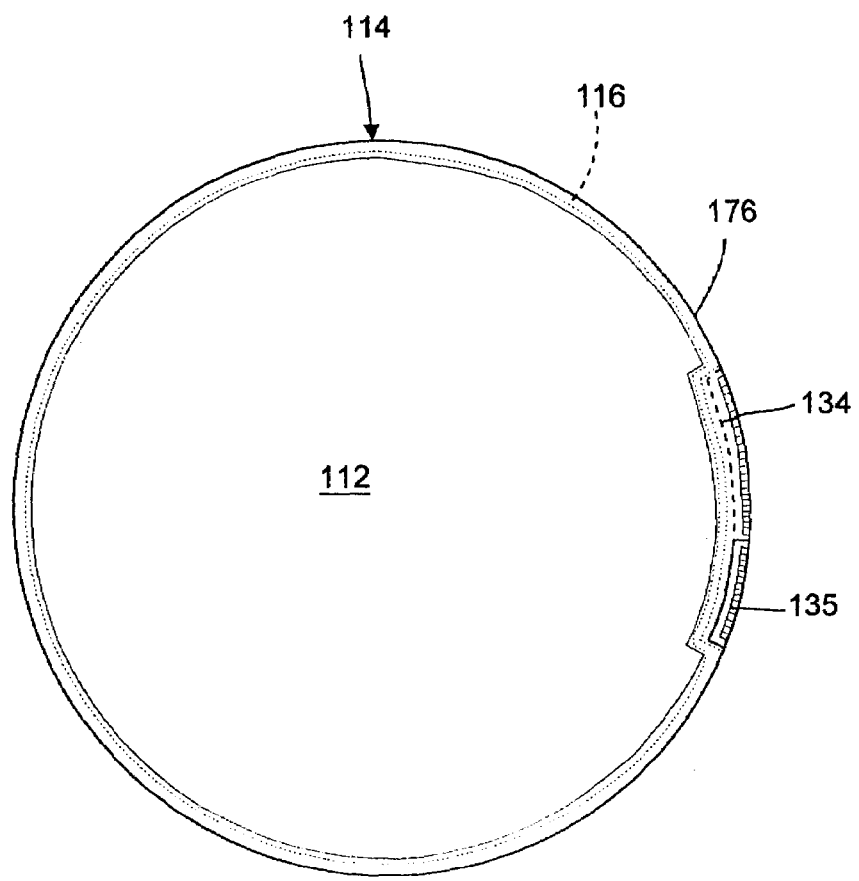
FIG. 4B is a frontal plan view of an electro-optic mirror element incorporating a substantially continuous perimeter edge and having a tab/recess portion for contact areas for connection to the associated electrically conductive layers.
Figure 4C:
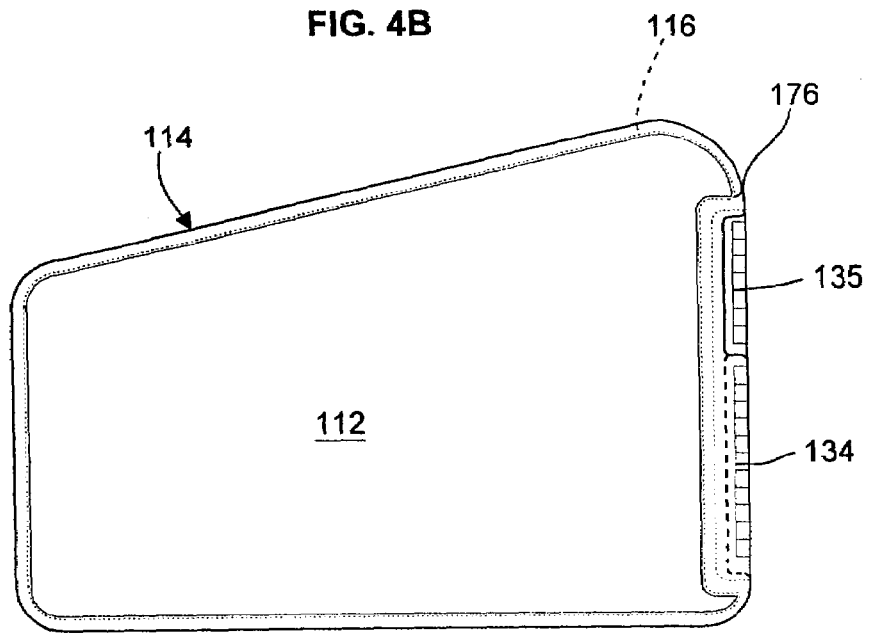
FIG. 4C is a frontal plan view of an electro-optic mirror element similar to that of FIG. 4B except for having a more rectangular shaped perimeter and having the tab/recess portions on an inboard edge thereof.

FIGS. 4B and 4C depict plan views of mirror elements having substantially zero positional offset between the front substrate 112 and the rear substrate 114 except for in the tab/recess areas 134 and 135 where contact is made to corresponding second and third surface conductive layers (not shown). The first and second substrates are secured in spaced apart relationship with one another via seal member 116. A substantially opaque material 176 is provided as described with reference to FIG. 3C. In a preferred embodiment, a low sheet resistance stack, as described herein, is provided on both the second and third surface such that relatively short electrical contacts are sufficient. In at least one preferred embodiment, the length of the contacts to the second and third surfaces combined are less than approximately 50 percent, and preferably less than approximately 25 percent, of the length of the perimeter of the associated mirror element. In at least one alternate embodiment, a point contact is provided to either the second surface conductive layer, the third surface conductive layer or both the second and third surface conductive layers. In at least one embodiment, the contact to the second electrically conductive layer is approximately 60 percent to approximately 75 percent of the total length of both contacts combined. In at least one embodiment anyone of these "short electrical contact" systems may be combined with a carrier with integrated bezel as described herein with regard to FIGS. 52 and 53. Optionally, a substantially transparent seal member and, or, a substantially opaque material may be provided, as described herein, in combination with the short electrical contact(s). U.S. Pat. No. 5,923,457, the entire disclosure of which is incorporated herein by reference, discloses optional structures for mirror elements in accordance with various embodiments of the present invention.

If a coating and, or, a reflective material is applied around the perimeter of the mirror on the first or second surface to mask the seal and/or contact area as with regard to FIGS. 3B, 3C, 4B, 4C and other embodiments described herein, the aesthetics of this ring and edge of the ring become very important. If the edges of the mirror are chipped, particularly if the chip extends onto the perimeter of the first or second surface, and a reflective metal like chrome is applied to the perimeter and, or, edge and overcoats the chip becomes very visible and stands out like a beacon reflecting light in all different directions. Likewise, if the perimeter and, or, edge is chipped after the chrome coating is applied the chip stands out as a dark void on a smooth bright surface. For this reason it is very important to create a very durable, uniform and aesthetically pleasing edge in order to produce a high quality mirror. The chip associated imperfections are most problematic in conjunction with embodiments having narrow or no bezel. This durable edge can be created after coating with the reflective material but it is preferably created right after the mirror substrates are cut to shape. The durable edges can be created on glass by seaming, grinding or blasting the edges with an abrasive material. Generally very hard abrasive particles of materials like aluminum oxide, silicon carbide or diamond are used to shape or bevel the glass edge. The size of the particles used influences the roughness of the finished glass edge. The larger the abrasive particle the rougher the surface that is created. Generally 80 to 120 mesh size abrasive particles produce a very rough surface, 300 to 500 mesh size particles produce a smooth surface and 600 mesh and above produce a near polished finish. If a mirror back is used that captures the mirror by means of a slim bezel that extends from the rear around the mirror edge to cover a small portion of the mirror edge face, a light edge treatment that removes as little as 0.005" of the substrate front corner may be all that is necessary. If a mirror back is used that has a lip that encases the edge of the mirror edge but not the mirror face, a more substantial front edge treatment that may remove 0.010" to 0.075" of the front substrate corner may be required. If a mirror back is used that does not cover any of the mirror face or edge, treating the entire edge and the first surface perimeter/edge may be necessary. In at least one embodiment, the edge of the first and, or, second substrate is provided with an opaque material, or material that is index matched to the substrate, such that an aesthetically appealing periphery is obtained.

Figure 4D:
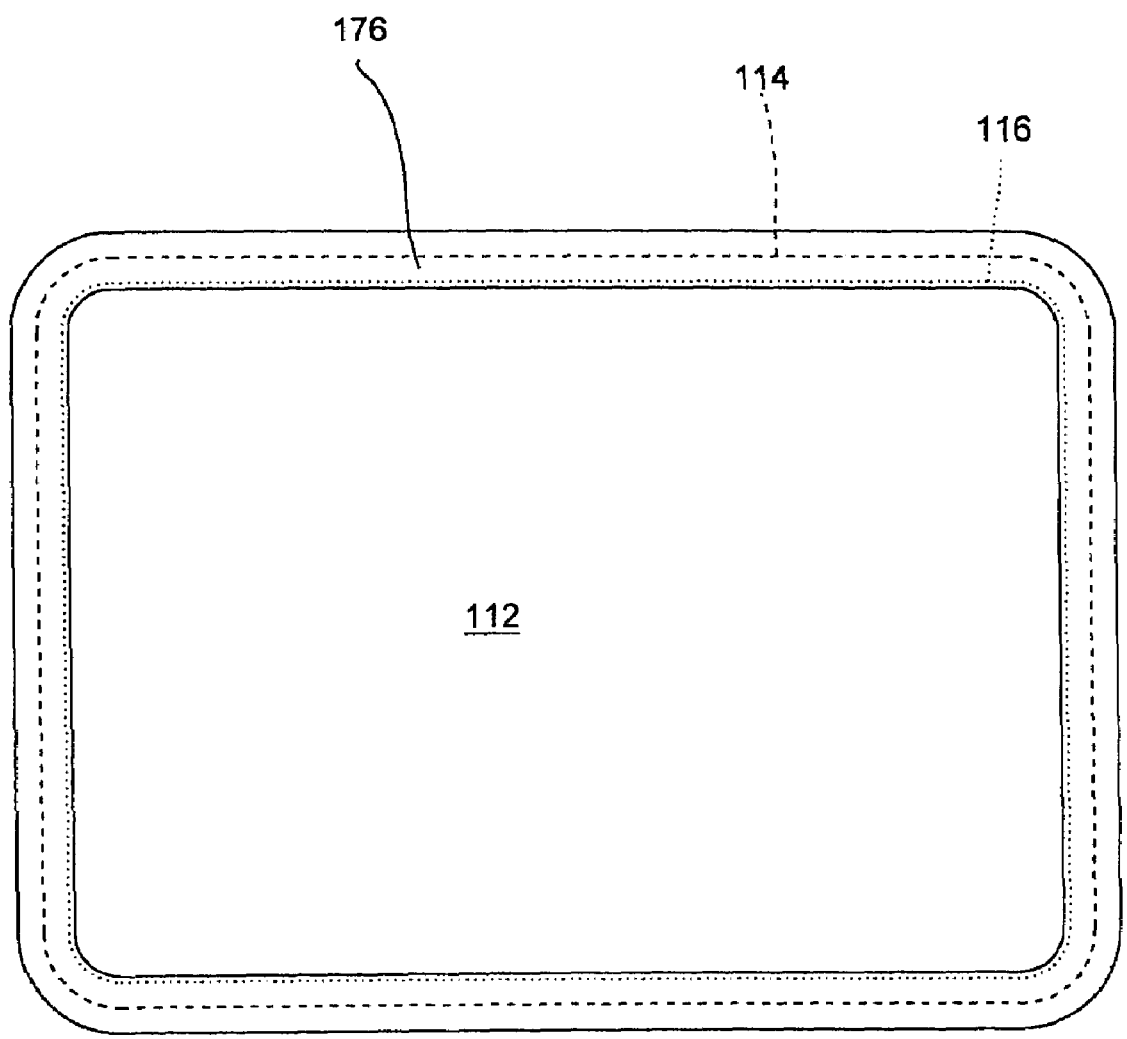
FIG. 4D depicts an electro-optic mirror element having a front substrate that is larger than the associated rear substrate.

Turning now to FIG. 4D, a mirror element is shown to have a front substrate 112 that is larger than the rear substrate 114 such that contact to the second and third surface electrically conductive layers (not shown in FIG. 4D) is made within the perimeter of the front substrate such that the contacts are not visible when the element is viewed from the front substrate looking toward the rear substrate. A seal member 116, and optionally, a substantially opaque material 176 is provided as described with regard to other embodiments. It should be understood that alternate embodiments may be provided with a front substrate that is in positional alignment with the rear substrate on all but one edge and that contact to the second and third surface electrically conductive layer(s) is made on the edge having the extended front substrate. In addition to the "J" and "C" type electrical contact clips described and depicted herein, it should be understood that, especially with regard to an element having a larger front plate, a "Z" type contact clip may be provided. The Z type clip has a portion of one end secured to the second surface of the front substrate where the front substrate extends beyond the rear substrate. The Z clip then steps up along the edge of the rear substrate and the opposing end of the Z clip then extends along the fourth surface. In at least one embodiment, a Z clip is provided to make contact to the second surface and a J or C clip is employed to make contact to the third surface. For embodiments with larger, wide, clips that are bonded to the substrate, the thermal coefficient of expansion of the clip(s) and the thermal coefficient of the substrate are substantially matched, for example, if the substrate is glass, a Kovar, stainless steel or a laminate of Mo/Cu/Mo clip may be employed.

Yet another embodiment of an improved electrical interconnection technique is illustrated in FIG. 5, where a first portion of seal member 116 is applied directly onto the third surface 114a and cured prior to the application of electrode 120. After the electrode 120 is deposited onto the third surface 114a over the first portion of seal member 116, a portion of the cured seal member 116 is machined off to leave 116i as shown with a predetermined thickness (which will vary depending on the desired cell spacing between the second surface 112b and the third surface 114a). The cell spacing ranges from about 20 microns to about 1500 microns, and preferably ranges from about 90 microns to about 750 microns. By curing the first portion of seal member and machining it to a predetermined thickness (116i), the need for glass beads to ensure a constant cell spacing is eliminated. Glass beads are useful to provide cell spacing, however, they provide stress points where they contact electrode 120 and transparent conductor 128. By removing the glass beads, these stress points are also removed. During the machining, the electrode 120 that is coated on first portion of seal member 116 is removed to leave an area devoid of electrode 120. A second portion of seal member 116ii is then deposited onto the machined area of the first portion of seal member 116i or on the coatings on second surface 112b in the area corresponding to 116i, and seal member 116ii is cured after assembly in a conventional manner. Finally, an outer electrically conductive seal member 117 may optionally be deposited on the outer peripheral portion of seal member 116 to make electrical contact between the outer edge of electrode 120 and the outer peripheral edge of the layer of transparent conductive material 128. This configuration is advantageous in that it allows connection to the transparent conductive material 128 nearly all the way around the circumference, and therefore improves the speed of dimming the electrochromic media 126.

Figure 6:
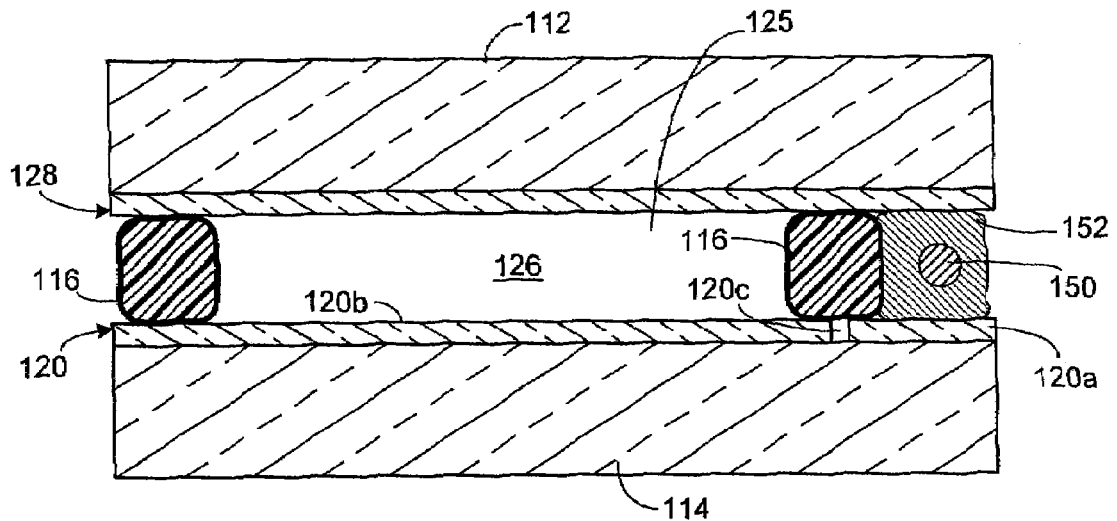
FIG. 6 is an enlarged cross-sectional view of an electro-optic mirror element incorporating aspects of a second embodiment of the present invention.
Figure 7A:
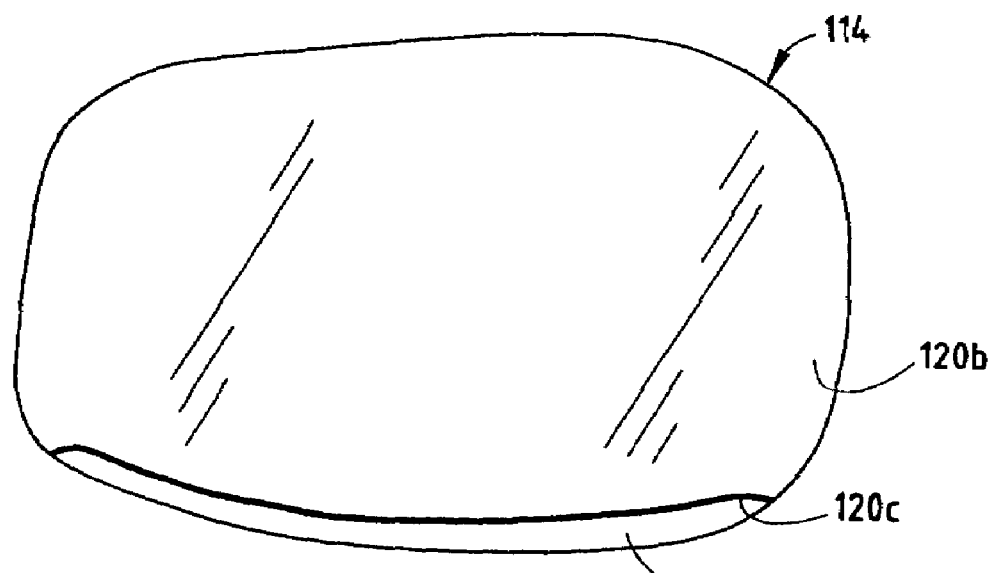
FIG. 7A is a top plan view of a rear substrate having an electrode formed thereon, as may be used in the electro-optic mirror element shown in FIG. 6.
Figure 7B:
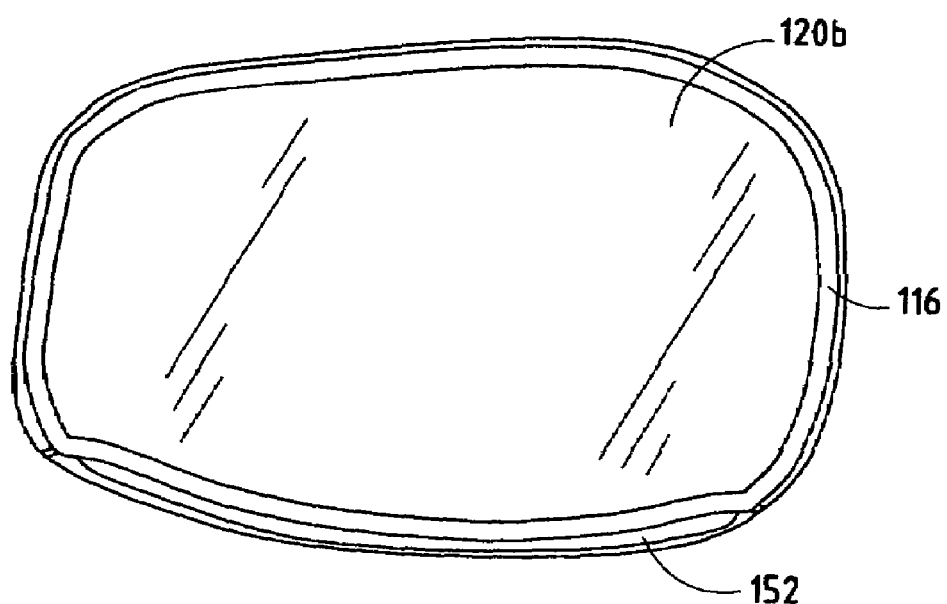
FIG. 7B is a top plan view of the rear substrate shown in FIG. 7A and additionally having a seal formed thereon, as may be used in the electro-optic mirror element shown in FIG. 6.

Another embodiment of the present invention is shown in FIG. 6. This embodiment differs from the prior two embodiments in that the electrical conductor that connects a first portion 120a of electrode 120 to the portion of transparent electrode 128 is a wire 150 or strip, which may be coated with a conductive material 152 to improve contact to the electrode layers and to thereby ensure contact stability. The conductive material 152 may be conductive pressure sensitive adhesive (PSA), conductive ink, or an epoxy that is loaded with conductive particles, flakes, or fibers made of materials such as silver, gold, copper, nickel, or carbon. If conductive material 152 has sufficient conductivity, wire 150 would not be needed. For coloring uniformity it is desirable to keep the measured resistance along the long edge of a mirror element below 5 Ohms, more preferably below 1 Ohm and most preferably below 0.5 Ohm. Many conductive inks or adhesives that are formulated for the electronics industry are suitable for this application. The ink or adhesive is preferable filled with a conductive flake, fiber or particle or a combination of flake, fiber or particle and it has a sufficient filler loading and is deposited in a sufficient width and thickness to achieve the desired level of conductivity. An epoxy adhesive formulation with suitable conductivity is (by weight) between approximately 10% and approximately 20%, most preferably approximately 13.5%, epoxy resin D.E.R. 354 or 354 LV (Dow Chemical Company), between approximately 3% and approximately 7%, and most preferably approximately 4.5%, Ancamine 2049 (Air Products and Chemicals Inc.) and between approximately 70% and approximately 85%, and most preferably approximately 82%, sliver flake LCP 1-19 (Ames-Goldsmith). It is preferable to keep the bulk conductivity of the filler material below approximately 20 microohm-cm, more preferably below approximately 10 microohm-cm and most preferably below approximately 5 microohm-cm. Like the first two embodiments, electrode 120 is separated into a first portion 120a and a second portion 120b by an area 120c that is devoid of electrically conductive material. FIG. 7A shows a top plan view of rear element 114 having electrode coating 120 deposited thereon. To create the first and second portions, laser ablation, chemical etching, physical removal by scraping, or similar methods may be used to remove a portion of the electrode material to form a thin line defining area 120c. As shown in FIG. 7A, this would define a first portion 120a along one side of element 114. As shown in FIG. 7B, the electrically non-conductive seal 116 is formed about the entire periphery to define the outer bounds of the chamber 125 in which the electrochromic medium 126 is deposited. The conductive material 152, which may also function as a seal, is then disposed with or without a wire 150 along the peripheral edge on which first portion 120a of electrode 120 is defined. Conductive material 152 may be deposited prior to or after substrates 112 and 114 are assembled together.

Figure 8A:
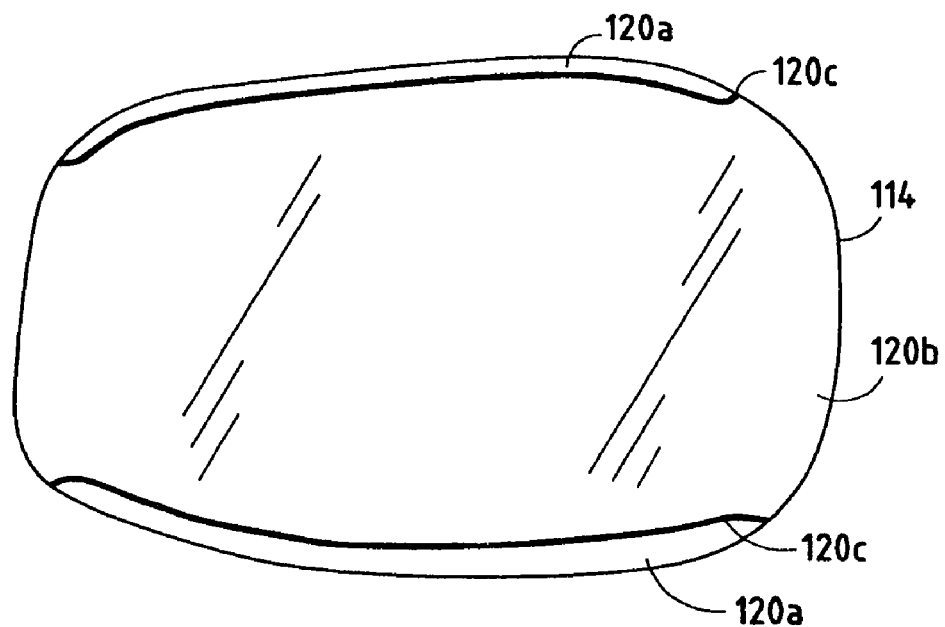
FIG. 8A is a top plan view of a rear substrate having an electrode formed thereon, as may be used in the electro-optic mirror element shown in FIG. 6.
Figure 8B:
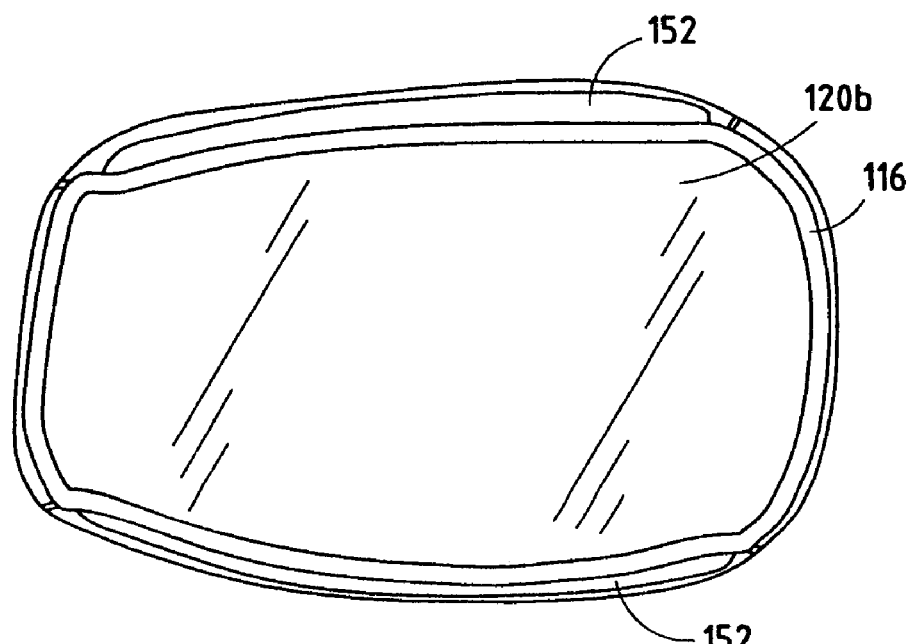
FIG. 8B is a top plan view of the rear substrate shown in FIG. 8A and additionally having a seal formed thereon, as may be used in the electro-optic mirror element shown in FIG. 6.

An alternative construction is shown in FIGS. 8A and 8B in which two first portions 120a are defined at opposite sides of element 114 and separated by corresponding nonconductive lines 120c. Such an arrangement would allow for electrical connection to electrode 128 at two opposite sides of element 114. The seals 116 and 152 would be disposed in a similar manner, but with the conductive seal 152 dispensed over all or part of both portions 120a. The wire(s) may extend from conductive seal material 152 and be soldered to electrical clips or directly to a circuit board through which power is supplied to the electrochromic mirror. To coat the wire and deposit it between substrates 112 and 114, wire 150 may be fed through the middle of a dispensing nozzle that is used to dispense seal material 152 directly onto the required portion of coated element 114.

Figure 8C:
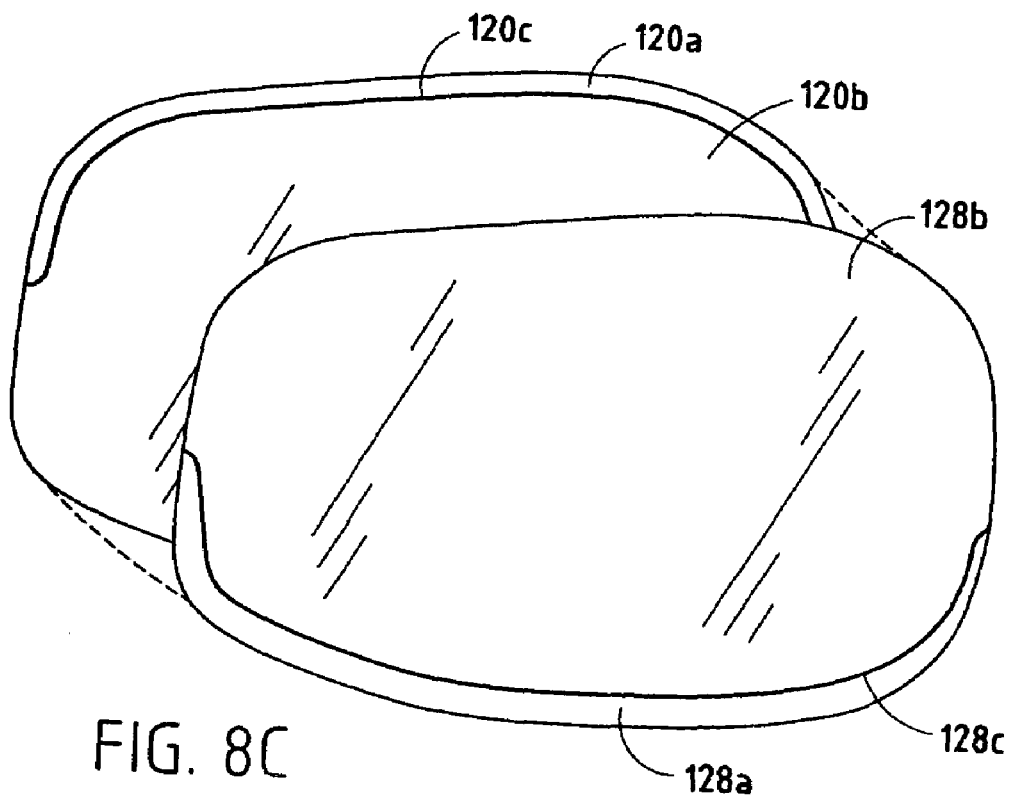
FIG. 8C is an exploded view showing the front and rear substrates having electrodes formed thereon, as may be used in the electro-optic mirror elements of the present invention.
Figure 8D:
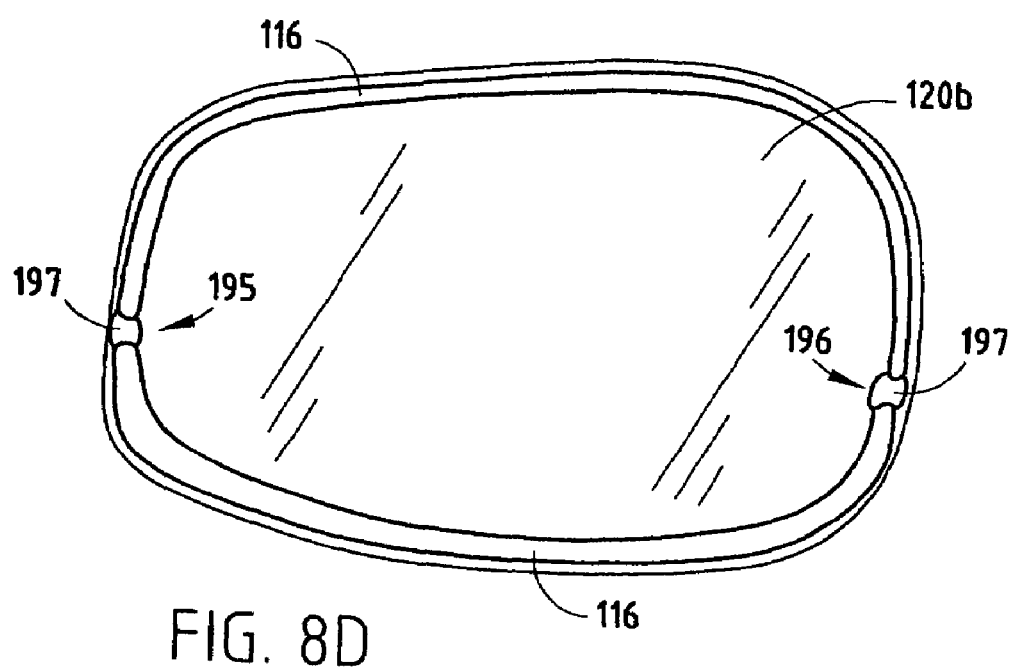
FIG. 8D is a top plan view of the rear substrate shown in FIG. 8A and additionally having a seal formed thereon.

FIGS. 8C and 8D illustrate another implementation of the first embodiment of the present invention. Specifically, FIG. 8C illustrates the electrode etching of both electrodes 120 and 128, while FIG. 8D shows the provision of the seal 116 where an outer portion of its width is conductive and the inner portion is nonconductive similar to the seal shown in FIG. 3A. The entire seal 116 could be conductive and the electrochromic device would function, however, this construction is not preferred with solution phase devices because the segregation of the electrochromic species is enhanced when coloration of the electrochromic media occurs on the inside edge of the conductive seal and exposed portion of electrodes 128a and 120a. As shown in FIG. 8D, there are two fill ports 195 and 196 provided at opposite ends of the electrochromic device, which provide for electrical isolation of the conductive portions 116b of seals 116. The plug material 197 used to plug fill ports 195 and 196 would also be made of an electrically nonconductive material to provide for the necessary electrical isolation. The fill port is typically plugged with a UV curable adhesive. This adhesive is preferably a UV curable adhesive but may also be a hot melt or thermal cure or combination UV and thermal cure adhesive. The UV cure adhesive generally is an acrylate base, epoxy base or vinyl ether base or a combination thereof and is generally cured by free radical or cationic polymerization.

Figure 9:
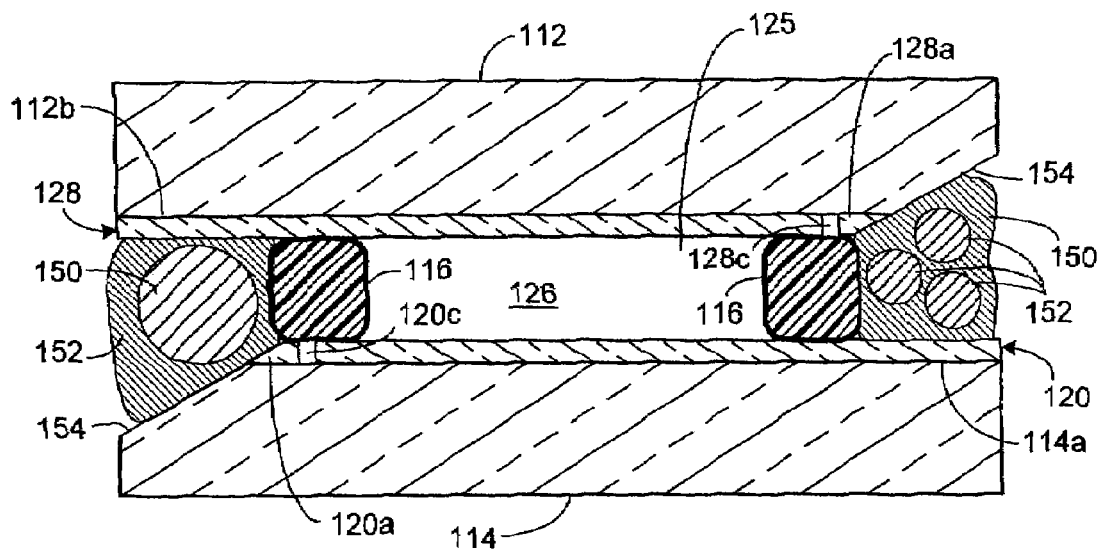
FIG. 9 is an enlarged cross-sectional view of an electro-optic mirror element incorporating aspects of a third embodiment of the present invention.

FIG. 9 shows two variations of the embodiment shown in FIG. 6. With reference to the left side of the device shown in FIG. 9, it may be seen that at least one portion of the peripheral edge of the front surface 114a of element 114 may be beveled to provide a heavy seam 154 between elements 112 and 114. By providing this larger seam 154, a larger diameter wire 150 may be inserted between elements 112 and 114, without otherwise having to increase the spacing between elements 112 and 114, particularly within the chamber 125. Such a seam 154 may be provided by beveling either the front surface 114a of element 114 or the rear surface 112b of front element 112. As an alternative, rather than providing a single large diameter wire 150, a plurality of wires 150 or wire strands of a braided wire may be provided as the electrical conductor between portions of the electrodes 120 and 128. By providing wires twisted together, adhesive 152 is easier to apply and the wires need not be made of the same material. For instance a copper wire could be twisted with a stainless steel, nylon, KEVLAR, or carbon fiber or wire to impart strength or other desirable properties. The seam 154 could extend, for example, 0.020 inch in from the side edges of elements 112 and 114. Although the seam could extend far enough into the device such that nonconductive seal 116 would cover the beveled portion of electrode 120b it still would be beneficial to laser etch region 120c to ensure there is no electrical shorting. It should be noted that if conductive adhesive 152 were of sufficient conductivity, wire 150 would not be necessary. In this case, seam or bezel 154 would enable more conductive material 152 to be used which would improve the overall conductivity of the contact area.

Figure 10:
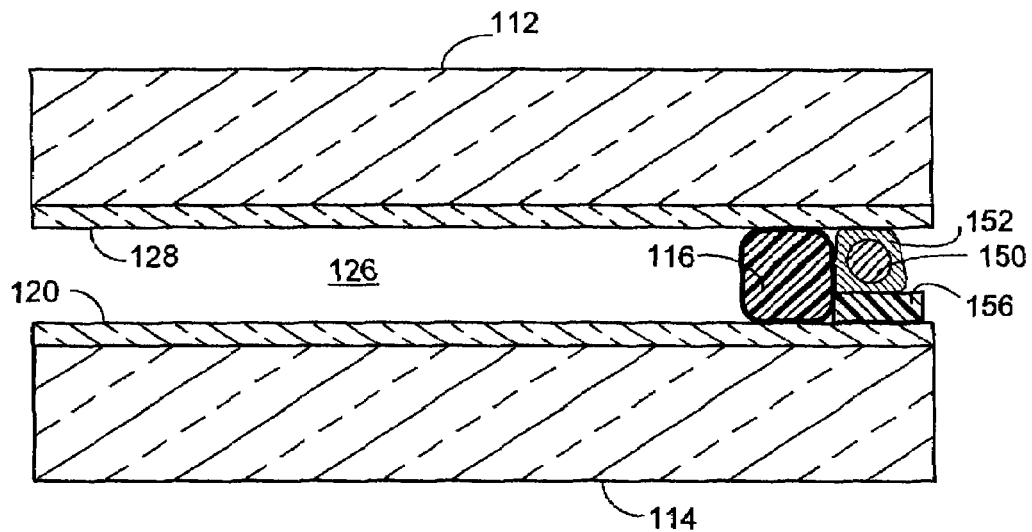
FIG. 10 is an enlarged cross-sectional view of an electro-optic mirror element incorporating aspects of a fourth embodiment of the present invention.

FIG. 10 illustrates yet another embodiment of the present invention. This embodiment is also similar to that shown in FIG. 6, except that, rather than etching a portion of electrode 120 to provide separate regions, an electrically nonconductive coating or material 156 is provided between electrode 120 and the coated wire 150. Coating or material 156 could be formed of a thin layer of organic resin such as epoxy, polyester, polyamide, or acrylic, or of inorganic material such as $SiO_2$, $Ta_2O_5$, etc. Such a nonconductive material may also help to hold the wire in place.

Figure 11:
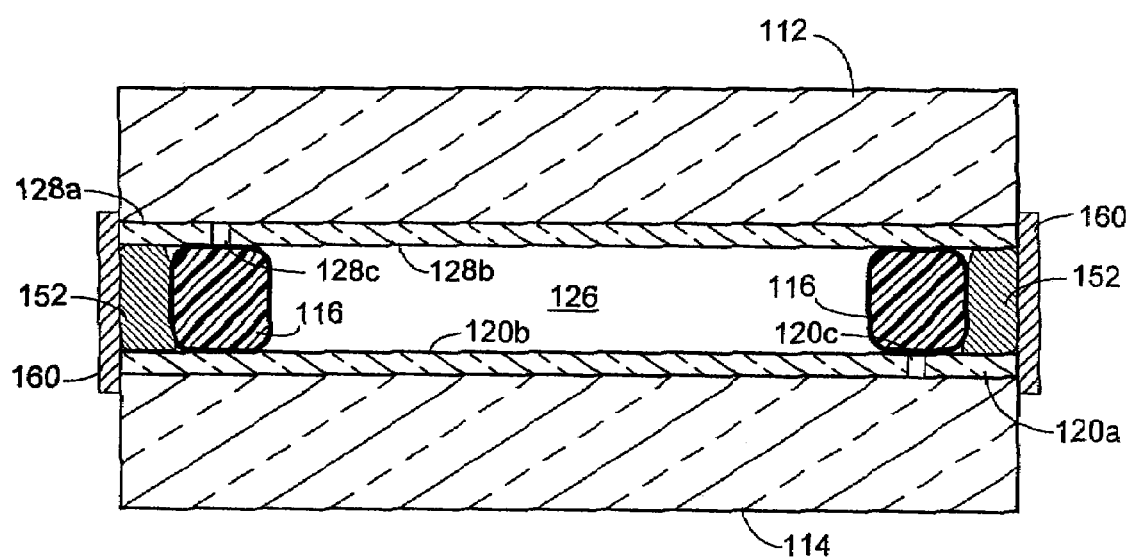
FIG. 11 is an enlarged cross-sectional view of an electro-optic mirror element incorporating aspects of a fifth embodiment of the present invention.

FIG. 11 shows another embodiment of the present invention. As shown, not only is the rear electrode 120 etched in one region along a perimeter portion on the third surface, but also the transparent front electrode 128 is etched to form a first portion 128a and a second portion 128b separated by an area 128c devoid of conductive material (see, for example, FIG. 8C). The front transparent electrode 128 may be etched along any perimeter portion of the second surface which does not coincide with the etching of electrode 120 over its entire length. The front transparent electrode 128 may be etched along any side other than that on which electrode 120 is etched. An electrically nonconductive seal 120 would thus be formed about the periphery and over the etched portions 128c and 120c of the two electrodes. The edges of elements 112 and 114 would be even with one another. The epoxy seal 116 would preferably be dispensed in from the edges of elements 112 and 114 approximately 0.010 to 0.015 inch on the top and bottom and even with the glass edges on the sides. Conductive material 152 could then be dispensed into the 0.010-0.015 inch channel at the top and bottom of the device. A foil, copper webbing material, or other highly conductive material 160 could then be adhered to the conductive epoxy/adhesive for each of the top and bottom regions to provide electrical contact to electrodes 120 and 128. The webbing with its high surface area or a foil or thin conductive material with holes in, or roughened up exterior, enhances the adhesion of such a material to the conductive material 152 and to the edges of the device.

Figure 12:
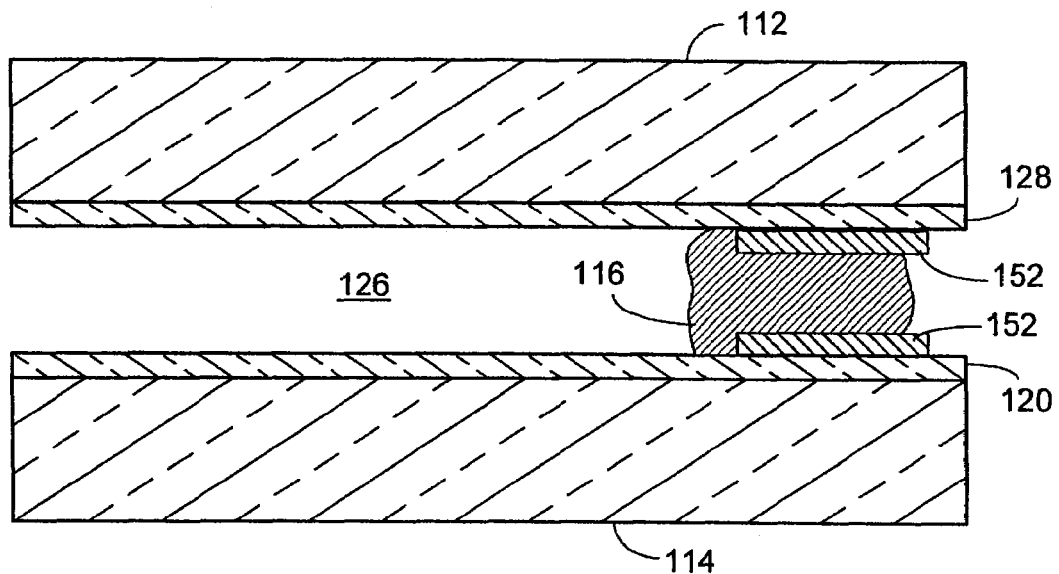
FIG. 12 is an enlarged cross-sectional view of an electro-optic mirror element incorporating aspects of a sixth embodiment of the present invention.

FIG. 12 shows another embodiment of the present invention. This embodiment, which would apply to both electrochromic mirror and window applications, includes a conductive seal material 152, which is deposited and cured on each of electrodes 120 and 128. An electrically nonconductive seal 116 is then dispensed between conductive seals 152 and would be dispensed inward so as to provide electrical isolation, if desired, from electrochromic medium 126. Alternatively a dual dispense could be used for simultaneously dispensing the conductive and non-conductive seal materials. Thus, a portion of the seal height is used as both the seal and the electrically conductive bus. An advantage of this construction is that the seal/conductive bus 152 may extend about the entire periphery of the electrochromic device for each of the two electrodes 120 and 128. Preferably, conductive seal material 152 would be formed of epoxy loaded with silver.

Figure 13:
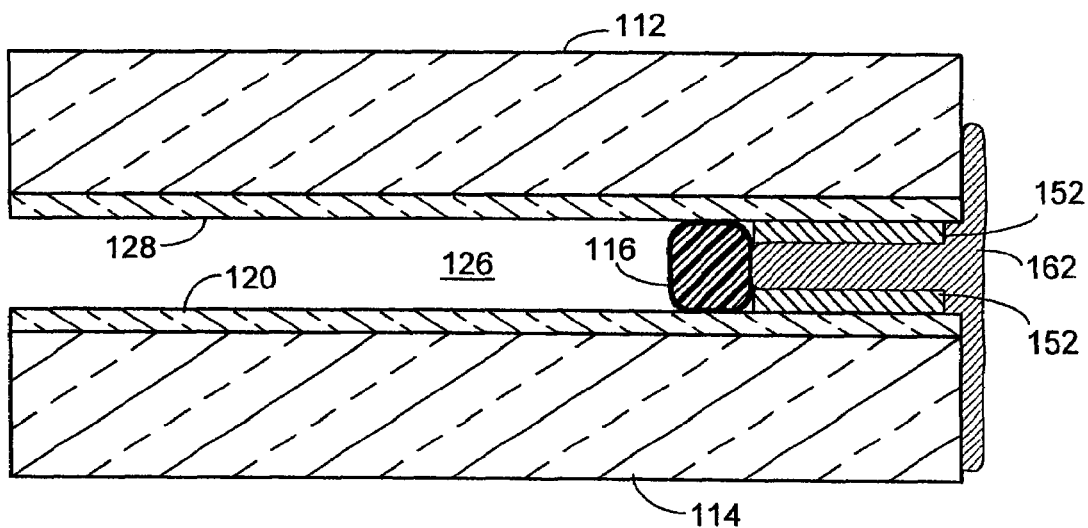
FIG. 13 is an enlarged cross-sectional view of an electro-optic mirror element incorporating aspects of a seventh embodiment of the present invention.

FIG. 13 shows a slight variant to the embodiment depicted in FIG. 12. Specifically, if the conductive material added to the epoxy seal portions 152 is less environmentally friendly than silver, the nonconductive seal could be formed either in two stages or using two separate nonconductive seal materials. For example, the nonconductive epoxy seal 116 could be provided in the conventional manner between the electrochromic medium 126 and conductive seals 152. Subsequently, a nonconductive material 162 could be used to fill the gap between conductive seal portions 152 and could extend along the edge of glass elements 112 and 114. A benefit of using this process is that seal material 116 may be selected from those materials that are least susceptible to degradation from the electrochromic medium while seal material 162 could be selected from materials that are perhaps more moisture and oxygen impermeable.

Figure 14:
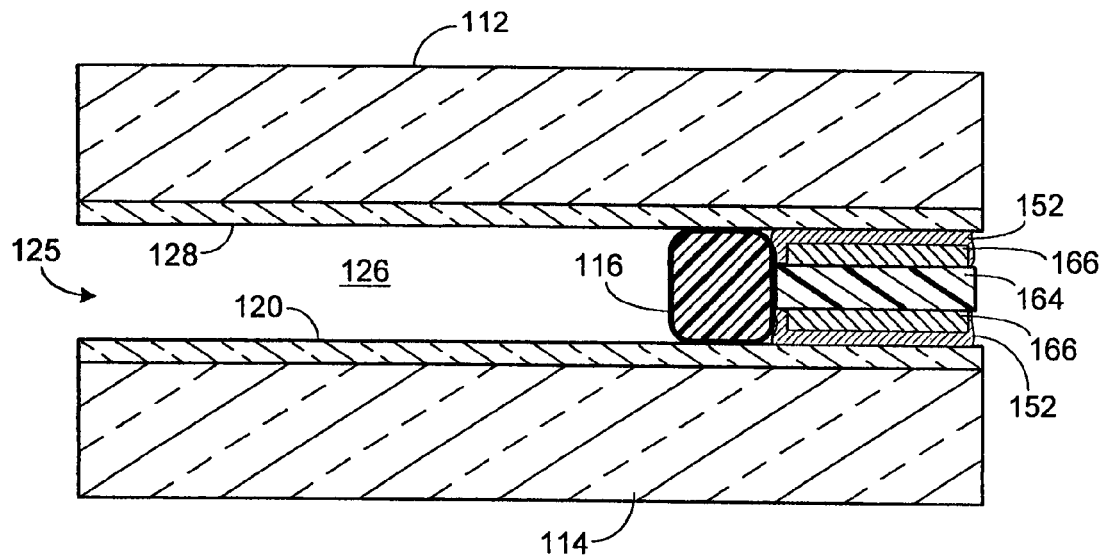
FIG. 14 is an enlarged cross-sectional view of an electro-optic mirror element incorporating aspects of an eighth embodiment of the present invention.

FIG. 14 shows yet another embodiment of the present invention. This embodiment, which would be equally suitable for mirrors or windows, provides for a nonconductive seal 116 between electrodes 128 and 120 while defining the outer bounds of the chamber 125 in which electrochromic medium 126 is disposed. Between seal 116 and the edge of elements 112 and 114 is provided an electrically insulative material 164 made of ethylene-propylene-diene monomer (EPDM), polyester, polyamide, or other insulating material, and having conductive materials 166 such as a foil or copper web or other highly conductive material attached to opposite sides thereof. Conductors 166 may be secured to opposite sides of insulator 164 using a PSA. A conductive ink or epoxy 152 could be used to increase the contact stability between conductors 166 and electrodes 128 and 120. Seal 116 is not necessary if materials 152, 166, 164 provide adequate environmental protection and do not interfere with the electrochromic medium.

Figure 15:
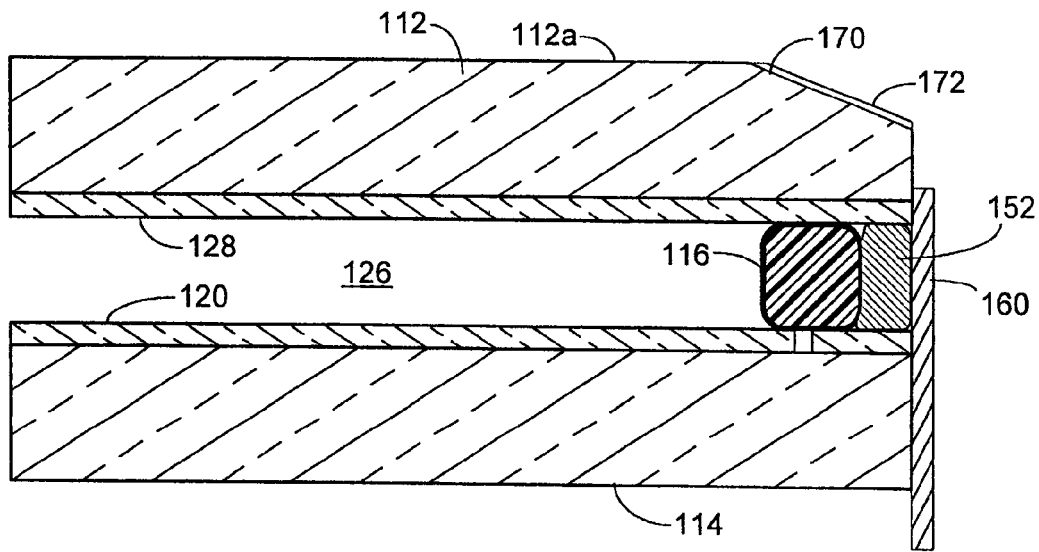
FIG. 15 is an enlarged cross-sectional view of an electro-optic mirror element incorporating aspects of a ninth embodiment of the present invention.

FIG. 15 shows an enhancement to the embodiment described above with respect to FIG. 11. It will be appreciated, however, that this enhancement may be used with any of the other embodiments described above or below. Specifically, the structure is modified such that the front surface 112a of front element 112 is beveled around its peripheral surface to provide beveled peripheral edge surface 170 that is of sufficient width to obscure the view of seal 116/152. With such a design, it may be possible to eliminate the bezel in its entirety. As will be appreciated by those skilled in the art, conductive foil or web 160 may extend rearward and wrap around for electrical contact to a printed circuit board or the heater circuit through which power may be supplied to selectively vary the reflectivity of the mirror element. To further mask the view of the seal, a reflective coating 172 may be applied to beveled surface 170.

Figure 16:
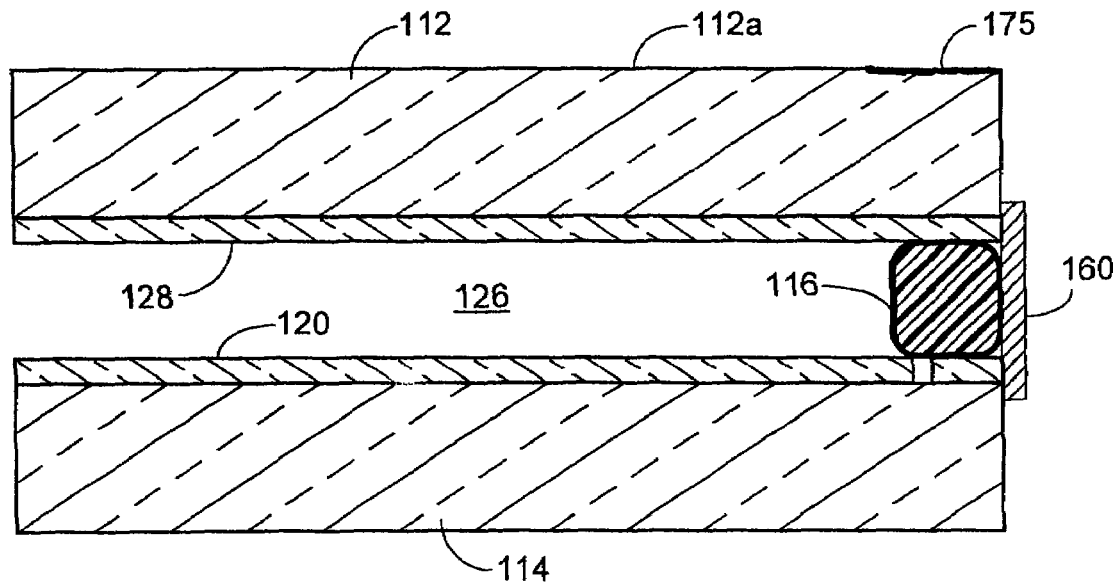
FIG. 16 is an enlarged cross-sectional view of an electro-optic mirror element incorporating aspects of a tenth embodiment of the present invention.
Figure 17A:
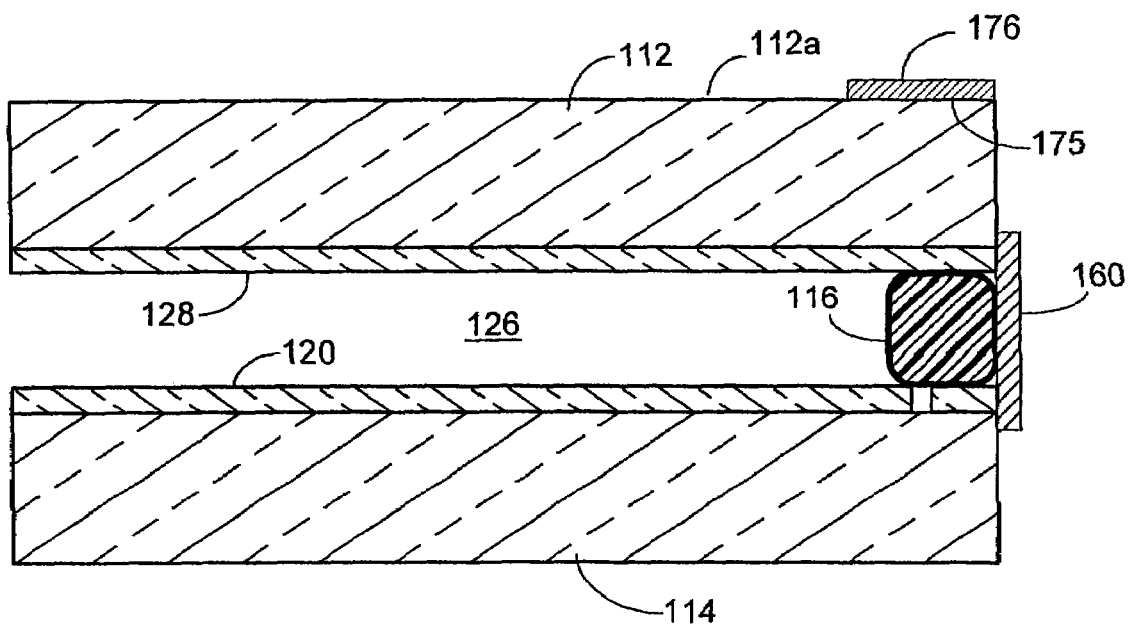
FIG. 17A is an enlarged cross-sectional view of an electro-optic mirror element incorporating aspects of an eleventh embodiment of the present invention.
Figure 17B:
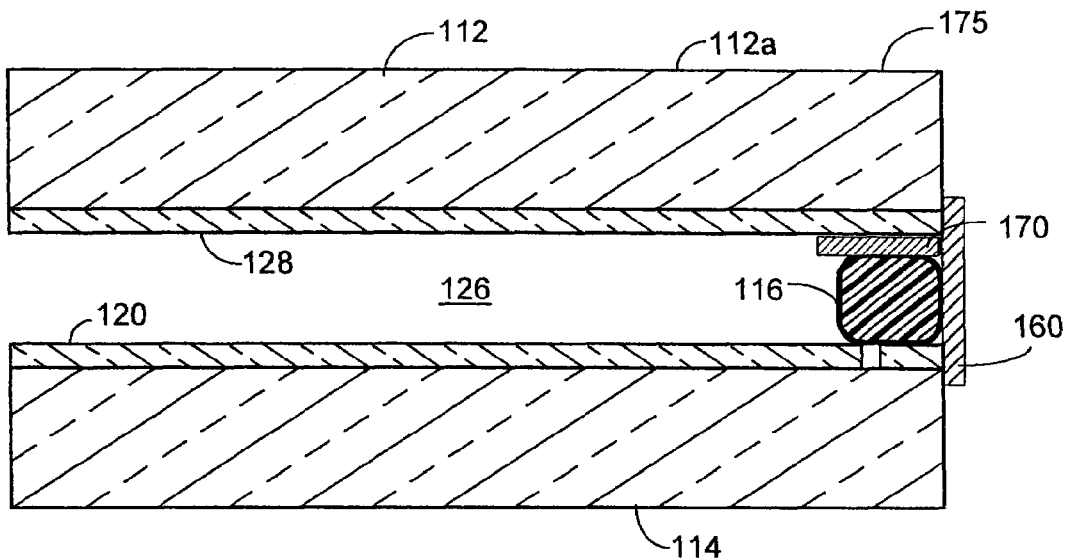
FIG. 17B is an enlarged cross-sectional view of an electro-optic mirror element incorporating aspects of a twelfth embodiment of the present invention.

FIG. 16 shows a slightly different approach for obscuring the view of seal 116. Specifically, the peripheral portion 175 of front surface 112a of front element 112 is sandblasted, roughened, or modified to obscure the view of the portion of the device where the seal could otherwise be seen. Yet another approach is shown in FIG. 17A where a reflective or opaque paint/coating 176 is provided on the peripheral region 175 of the front surface 112a of front element 112. As shown in FIG. 17B, such a reflective or opaque coating, paint, or film could be provided on the rear surface 112b of front element 112.

Yet another way to conceal the seal is to use a seal material that is transparent as disclosed in commonly assigned U.S. Pat. No. 5,790,298, the entire disclosure of which is incorporated herein by reference.

Each of the different methods for obscuring the view of the seal described above in connection with FIGS. 15-17B may be combined or used separately, and may be used with any of the other embodiments described herein. For example, the beveled surface 170 shown in FIG. 15 could be sandblasted. Likewise, the sandblasted portion 175 of surface 112a could be painted or coated with a reflective or high refractive index material. Paint or other material could be applied by silk-screening or other suitable methods. The reflective material in combination with the roughened surface provides a diffuse reflector.

Figure 18:
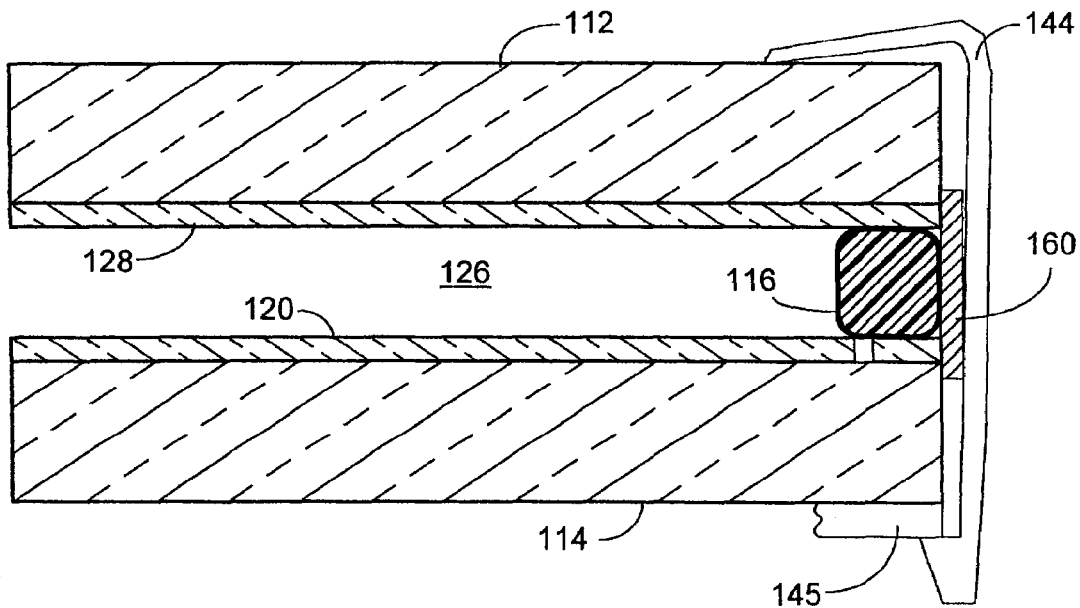
FIG. 18 is an enlarged cross-sectional view of an electro-optic mirror element incorporating aspects of a thirteenth embodiment of the present invention.

As mentioned above, other techniques may be used for improving the styling and appearance of the bezel. FIG. 18, for example, illustrates the use of a bezel 144, which has at least a surface thereof made of a metal, such as chrome or chrome-plated plastic or other material. Thus, at least a portion of the front surface of the bezel 144 would not have a black color, but rather would be reflective similar to the appearance of the mirror itself and thus be difficult to distinguish from the remainder of the mirror subassembly. Bezel 144 may engage a carrier plate 145 in any conventional manner.

Figure 19:
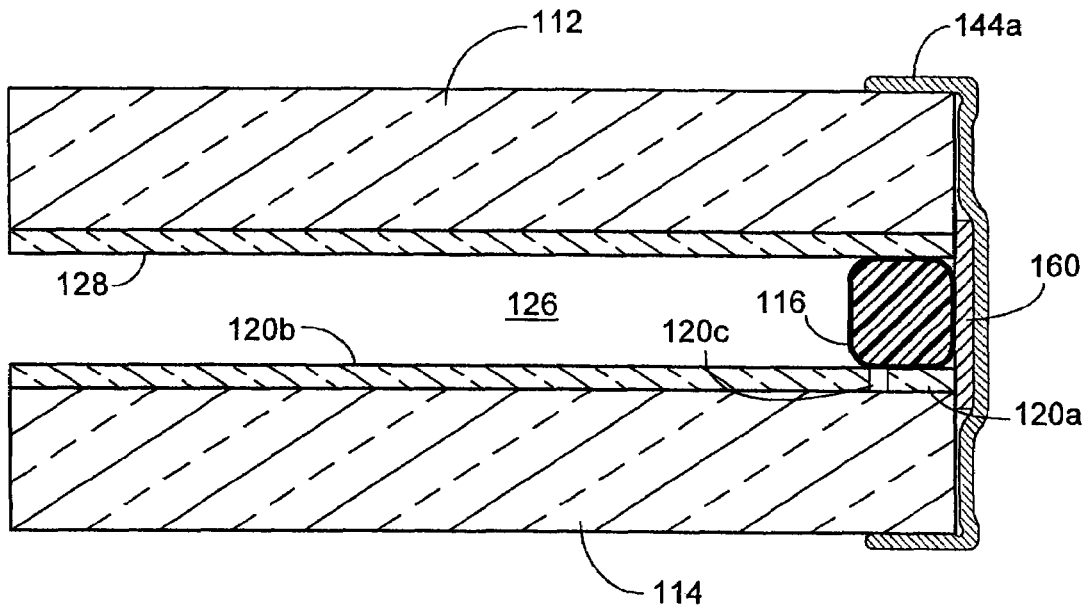
FIG. 19 is an enlarged cross-sectional view of an electro-optic mirror element incorporating aspects of a fourteenth embodiment of the present invention.

Another reason why the bezels typically are fairly wide is to accommodate the difference in the coefficient of thermal expansion of the material from which the bezel is made relative to the materials used to form the electrochromic element. Conventional bezels are made out of strong and fairly rigid engineering plastics such as polypropylene, ABS/PC, ASA, and have thermal expansion coefficients that are much larger than glass mirrors. This expansion difference can create tremendous hoop stress as the strong rigid bezel shrinks around the mirror at cold temperatures. As a result, conventional bezels may have ribs or defined voids for accommodating the thermal expansion difference between the element and rigid bezel. A solution in this regard is illustrated in FIG. 19 in which the bezel 144a is formed of an elastomeric material which stretches and contracts with the thermal expansion/contraction of the electrochromic element.

The elastomeric material could be injected or resin transfer molded directly around the mirror element such as with injection molded PVC or polyurethane Reactive Injection Molding (RIM). The elastomeric bezel could be injection molded separately out of elastomeric materials known as Thermoplastic Elastomers (TPE) such as thermoplastic polyurethane (TPU), thermal plastic polyolefin (TPO, TPV), Styrenic Thermoplastic Elastomer (TPS), Polyester Thermoplastic Elastomer (TPC), Nylon or Polyamide Thermoplastic Elastomer (TPA) or a vulcanized or polymerized rubber, polyurethane, silicone or fluoroelastomer and then applied to the mirror element. One approach would be to injection mold the elastomeric bezel in a "C" or "U" shape that is the mirror shape and size or preferably that is slightly smaller than the mirror shape and size and then stretch and "snap" the bezel onto the mirror. Bezels made in such a fashion fit snugly on the mirror and survive thermal shock and thermal cycling very well. One benefit of "C" or "U" shaped bezels is if they are made symmetrical from front to back, a bezel that is made for the drivers side of the vehicle, if rotated 180 degrees, will generally also fit the passenger side of the vehicle because the two mirrors are usually mirror images of one another. Since the bezels are flexible, another benefit is that a bezel made for a flat mirror will also conform to a convex or aspheric mirror shape. Only one bezel needs to be tooled to fit the left and right side flat, convex and aspheric mirrors resulting in major cost, time and inventory savings. It may be desirable to fix or fasten the bezel to the mirror or mirror back with adhesive or mechanically to avoid the bezel dislodging from the mirror if the mirror is scraped with an ice scraper. The adhesive could be a single component system such as a moisture cure silicone or urethane that is applied either around the edge on the glass or inside the "C" or "U" shaped bezel or both. The bezel could then be applied and the adhesive would cure with time. A two component or solvent-based adhesive could also be used in this manner. A hot melt adhesive could also be applied to the perimeter of the mirror or inside the "C" or "U" of the bezel or both. The bezel could then be applied to the mirror while the adhesive was still hot or the bezel/mirror assembly could be re-heated to melt the hot melt and bond the bezel to the mirror. A mechanical means to trap or engage the elastomeric bezel in place could also be used. The bezel could be made with holes or grooves in the back or side to engage with a more rigid back member. The elastomeric bezel could also be co-injected with a more rigid material that would form an elastomeric portion around the perimeter and a more rigid section around the back of the mirror to hold the elastomeric section in place. This rigid section could cover most of the back of the mirror and engage with the power pack or adjustable mirror support that holds the mirror in place in the mirror housing shell. The mirror in this arrangement could be attached to the rigid back portion with adhesive or double sided adhesive tape. The rigid portion could also only cover the perimeter of the mirror back and attach to a carrier that engages with the power pack or adjustable mirror support. In any case, the rigid portion of the mirror back would mechanically hold the elastomeric portion of the mirror back and bezel in place. An adhesive could also be used to bond the elastomeric portion of the bezel or mirror back to the more rigid portion of the mirror back to hold it in place.

Figure 20:
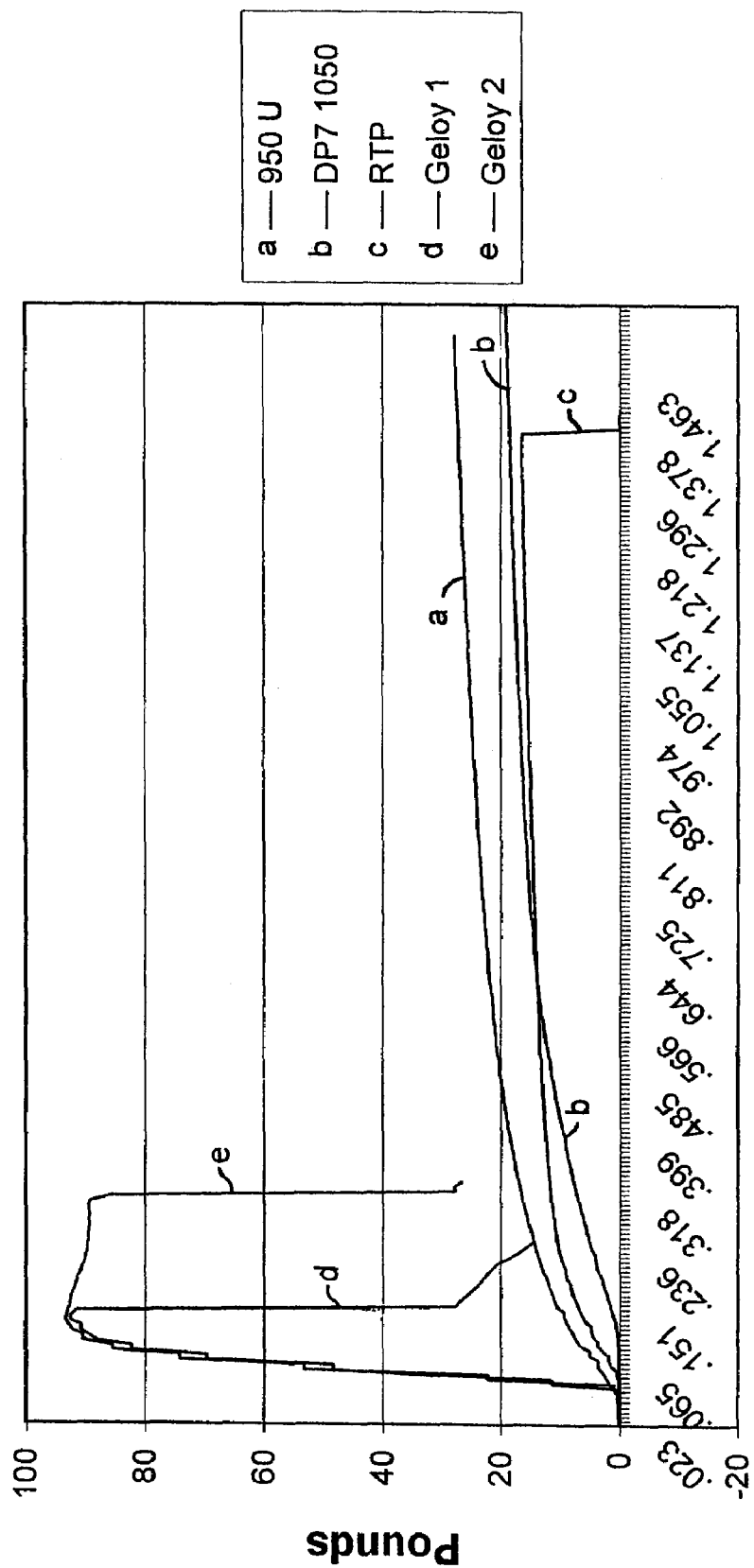
FIG. 20 is a plot of bezel force vs. deflection for various materials that may be used to construct the bezel according to the fourteenth embodiment of the present invention.

The plots of Force vs. Displacement shown in FIG. 20 are for short sections cut from a typical bezel made from different materials. The short sections were fixtured in a Chatillon (Greensboro, N.C.) device and pulled. The Force vs. Displacement plots show that with rigid materials typically used to make prior art bezels (Geloy, ASA/PC) the force increases rapidly with a small change in displacement when compared to bezels made from elastomers or rubbers (950 U, DP7 1050, RPT). Consequently, bezels made of these elastomeric materials that snugly fit the glass mirror at room temperature do not generate high values of hoop stress as the bezel contracts around the glass at low temperatures. By contrast, a bezel made of a rigid material like ASA/PC that fits snugly at room temperature would generate high values of hoop stress as the bezel contracts around the glass at low temperatures. The elastomeric bezel 144a is preferably disposed around the periphery of at least the front element 112. Due to its elastic nature, the elastomeric bezel has a smaller perimeter than that of at least the front element so that the elastomeric bezel fits snugly around the mirror element.

Some of the physical properties of rigid and elastomeric bezel materials are shown below in Table 1. The tensile modulus of some prior art rigid plastic material range from a low of 72,000 psi to a high of just over 350,000 psi. By contrast, the preferred elastomeric bezel materials have a tensile modulus of from about 100 psi to 3,000 psi. Thus, the inventive elastomeric bezel materials have a tensile modulus of less than about 72,000 psi, and may have a tensile modulus less than about 3,000 psi. The lower the tensile modulus of the bezel material, the lower the hoop stress value will be in the thermal coefficient mismatched system of a glass mirror surrounded by a plastic bezel.

Figure 22:
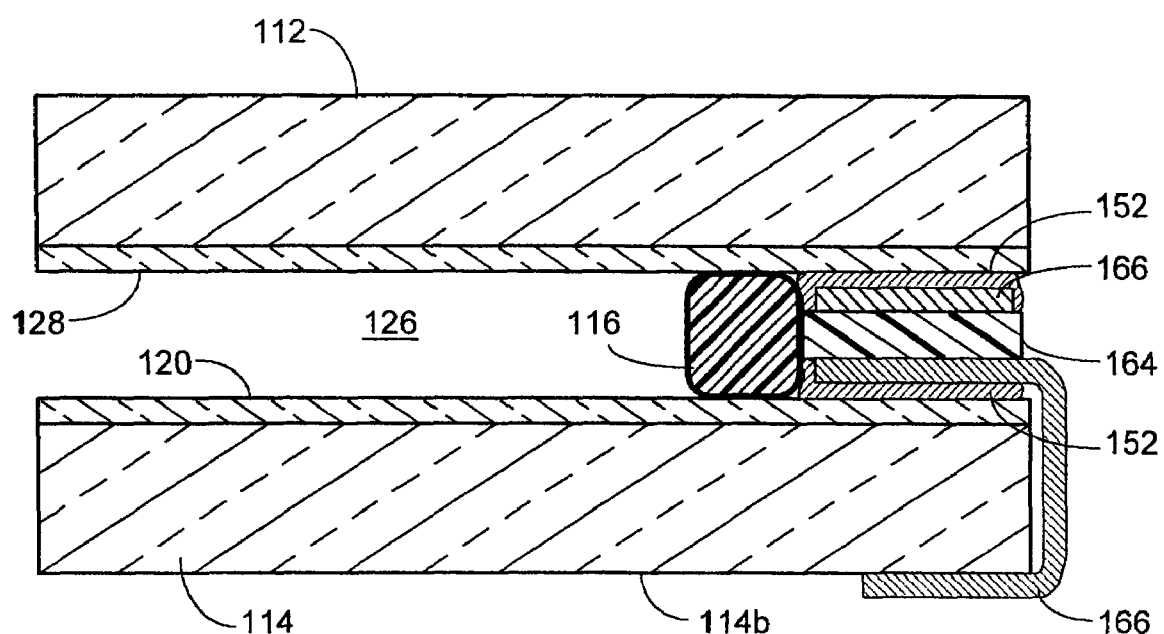
FIG. 22 is an enlarged cross-sectional view of an electro-optic mirror element incorporating aspects of a nineteenth embodiment of the present invention.

FIG. 22 shows a variation of the embodiment shown in FIG. 14 and described above. The structure shown in FIG. 22 differs in that one of the layers of conductive foil or web 166 extends outward beyond the edges of elements 112 and 114 and wraps around element 114 for connection to either a printed circuit board or a heater circuit. Additionally, the rear surface 114b of rear element 114 may be patterned with conductive electrodes for supplying power to foil 166. The foil 166 on the opposite side of insulator 164 may likewise extend outward for connection to the other of electrodes 128 and 120. Foil 166 may be cut using pinking shears and effec-

TABLE 1

| polymer | Tensile Modulus (100% Secant) psi | Tensile Elongation, break (%) | Tensile Elongation, yield (%) | Tensile Strength, yield (psi) | Glass Transition Temperature (° F.) | Shore Hardness (R = Rockwell R) |
|---|---|---|---|---|---|---|
| Bayer T84 PC/ABS | 336000 | 75 | 4 | 8000 | N/A | 119R |
| GE LG9000 PC/ABS | 352000 | 75 | N/A | 7900 | N/A | 118R |
| GE Geloy PC/ASA | 324000 | 25 | 4-5** | 8600 | N/A | 114R |
| Huntsman AP 6112-HS PP | 72500-1100000 | 120* | 6 | 3550 | N/A | 98R |
| Bayer Makrolon 3258 PC | 348000 | 125 | 6 | 9100 | N/A | ~115R*** |
| Texin DP7-1050 polyether | 1100 (100%) | 450 | N/A | 5000 | −47 | 90A |
| Texin 950 U polyether | 2000 (100%) | 400 | N/A | 6000 | −17 | 50D (~93A) |
| Multibase Inc. Multi-Flex A 3810 TPE | 170 (100%) | N/A | 700 | 725 | N/A | 45A |
| Multibase Inc. Multi-Flex A 4001 LC TPE | 120 (100%) | 600 | N/A | 800 | N/A | 33A |
| Multibase Inc. Multi-Flex A 4710 S TPE | 175 (100%) | 700 | N/A | 750 | N/A | 49A |
| DSM Sarlink 4139D TPE | 1550 (100%) | 588 | N/A | 2340 | N/A | 39D (~88A) |

Figure 21A:
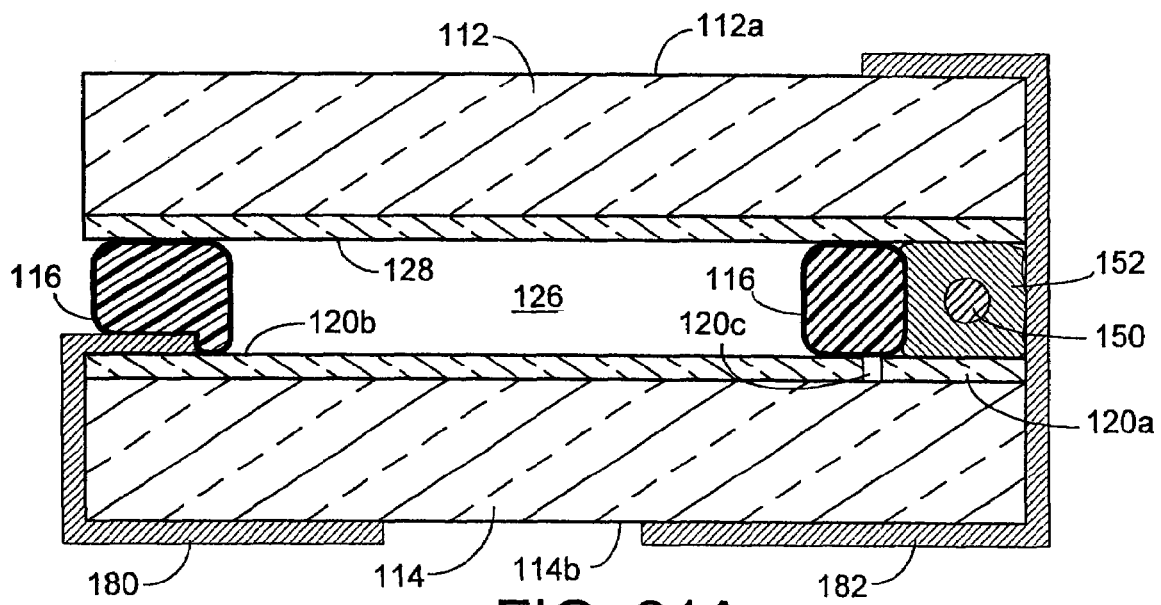
FIG. 21A is an enlarged cross-sectional view of an electro-optic mirror element incorporating aspects of a fifteenth embodiment of the present invention.
Figure 21B:
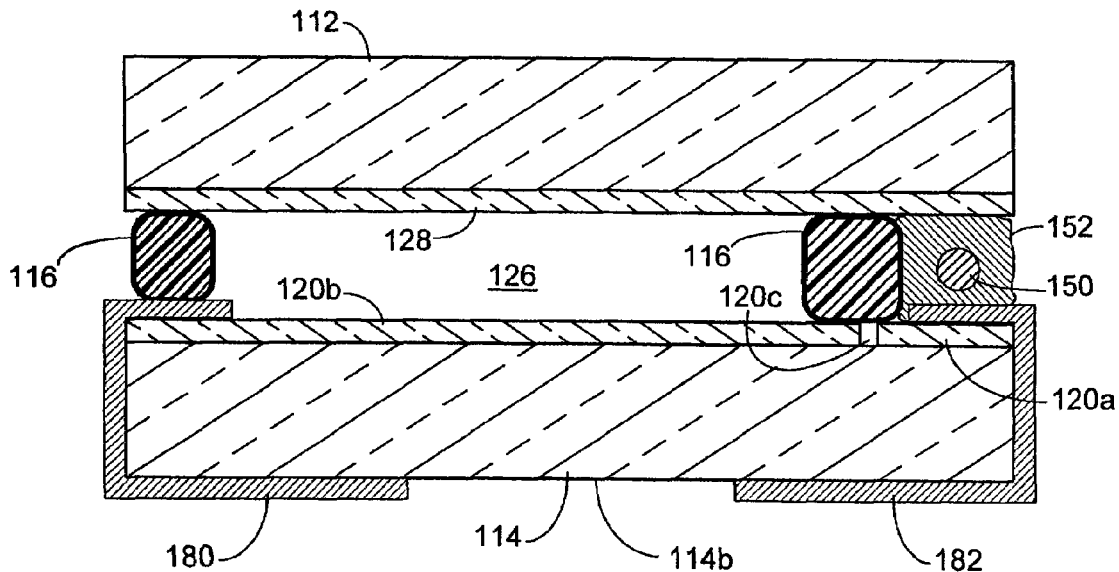
FIG. 21B is an enlarged cross-sectional view of an electro-optic mirror element incorporating aspects of a sixteenth embodiment of the present invention.
Figure 21C:
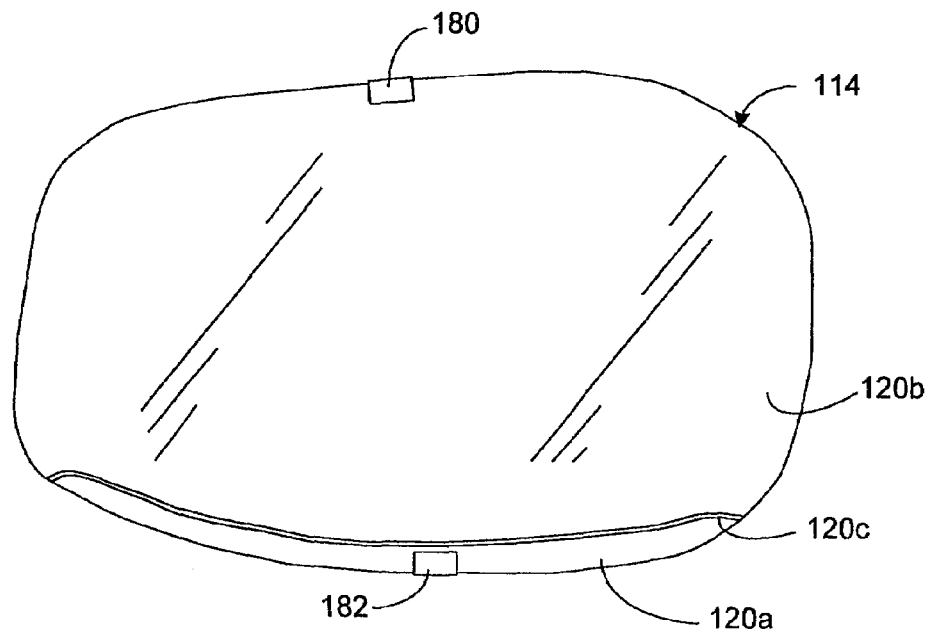
FIG. 21C is a top plan view of a rear substrate having an electrode formed thereon, as may be used in the electro-optic mirror element shown in FIG. 21B.
Figure 21D:
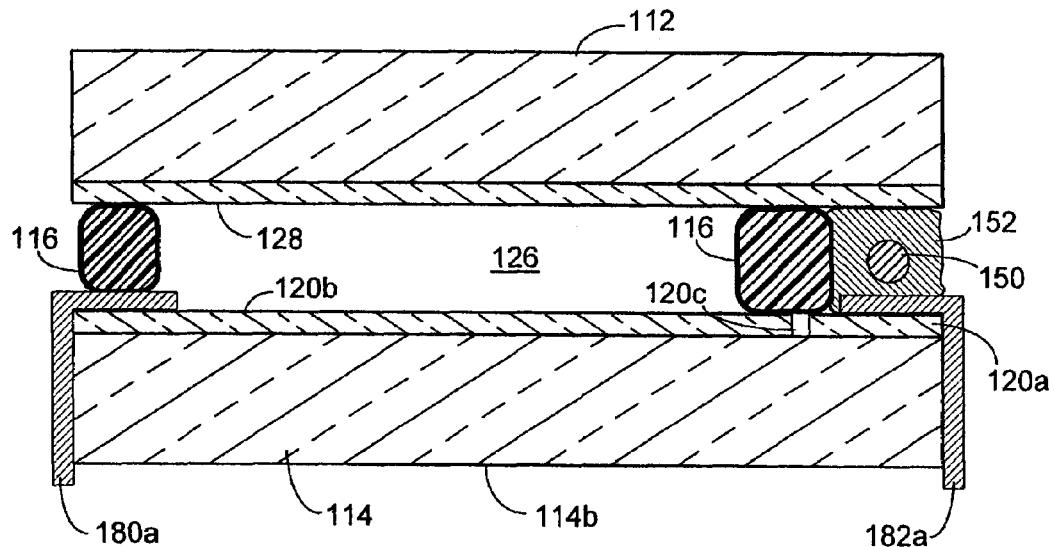
FIG. 21D is an enlarged cross-sectional view of an electro-optic mirror element incorporating an edge seal in accordance with a seventeenth embodiment of the present invention.
Figure 21E:
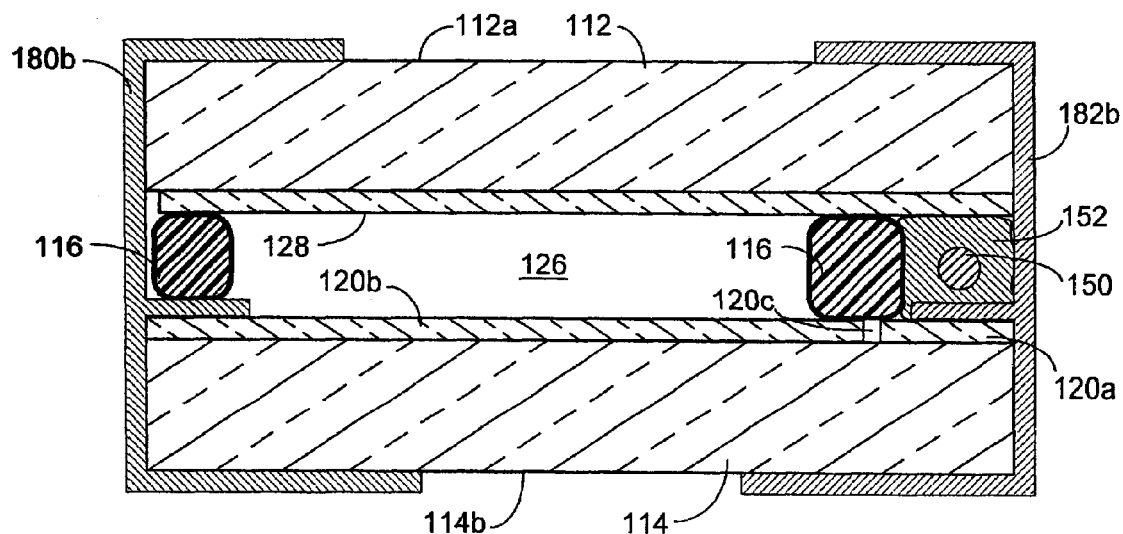
FIG. 21E is an enlarged cross-sectional view of an electro-optic mirror element incorporating an edge seal in accordance with an eighteenth embodiment of the present invention.

*Value taken from "Machinery's Handbook 25"
**Data taken from www.matweb.com
***Data taken from Hardness Comparison Chart FIG. 21A illustrates one technique for providing for electrical coupling to an electrochromic device such as that of the first embodiment. As shown, a first electrically conductive clip 180 is clipped to element 114 so as to be in electrical contact with second portion 120b of electrode 120. A second electrically conductive clip 182 is provided that clips around the entire device and thus contacts front surface 112a of front element 112 and rear surface 114b of rear element 114. Electrical contact is made to electrode 128 via first portion 120a of electrode 120, and via electrically conductive material 152. A variation of this construction is shown in FIG. 21B in which 182 is made of an identical construction as that of clip 180 so as to clip only to rear element 114. Again, electrical coupling between clip 182 and electrode 128 is through electrically conductive seal 152 and any wire 150 that may be disposed therein. As shown in FIG. 21C, one or a plurality of such clips may be provided for electrical connection to each electrode 120 or 128. Clips 180 and 182 may be directly soldered or otherwise connected to a circuit board or wires extending therebetween may be soldered to clips 180 and 182. FIGS. 21D and 21E show two additional variants of the clips 180 and 182 discussed above. In FIG. 21D, clips 180a and 182a are modified such that they do not extend around rear surface 114b of rear element 114. In FIG. 21E, clips 180b and 182b are modified so as to extend over and around front surface 112a of front element 112 while also extending around rear surface 114b of rear element 114. As will be apparent to those skilled in the art, various modifications can be made to the disclosed clip designs without departing from the scope of the present invention.

tively bent to form one or more connector clips. Foil 166 may be configured as an electrical bus with tabs extending into the seal.

Figure 23:
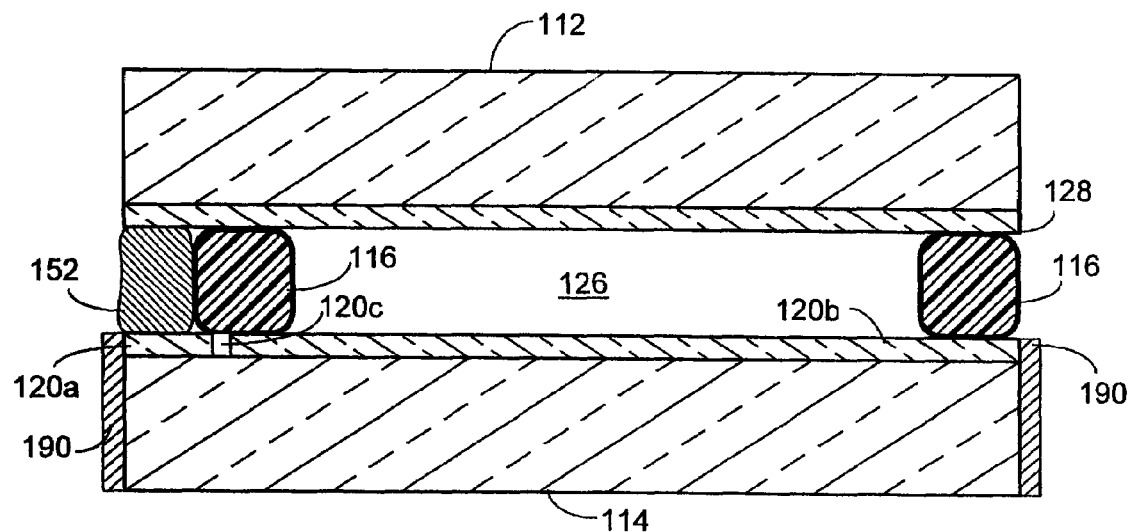
FIG. 23 is an enlarged cross-sectional view of an electro-optic mirror element incorporating aspects of a twentieth embodiment of the present invention.

FIG. 23 shows yet another embodiment in which a conductive coating 190 is deposited on the peripheral edge of rear element 114. Such a coating may be made of metal and applied with solder. Alternatively, the material may be rolled onto the edge of element 114. Such a construction allows contact merely to the edges of element 114 to provide electrical coupling to one or both of electrodes 120 and 128.

Figure 24:
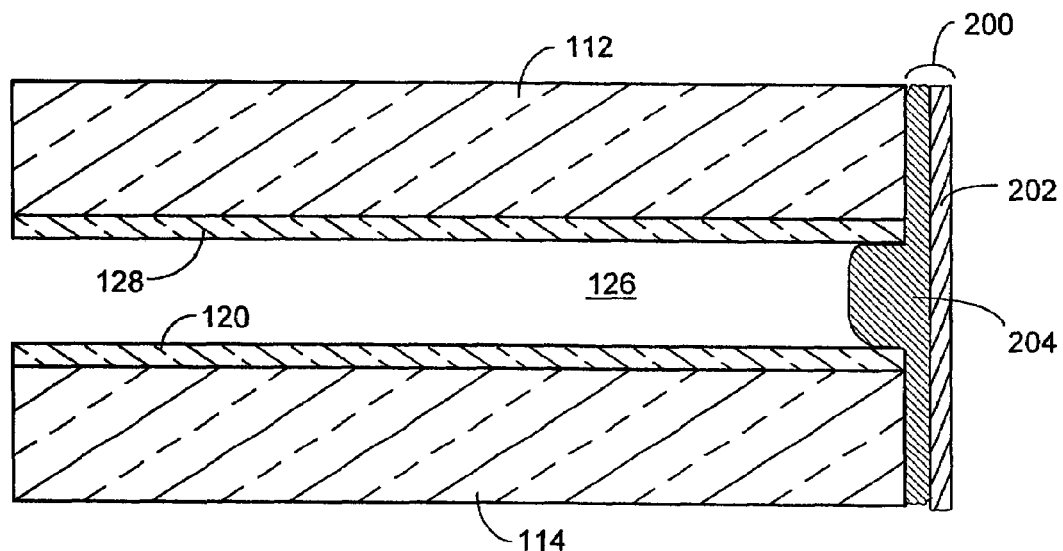
FIG. 24 is an enlarged cross-sectional view of an electro-optic mirror element incorporating an edge seal in accordance with a twenty-first embodiment of the present invention.

Yet another embodiment is shown in FIG. 24. In this embodiment, the majority of the sealing member is moved from between the front and rear elements 112 and 114 to the edge of the front and rear elements. Thus, the seal is provided predominately on the peripheral edges of the front and rear elements. As shown in FIG. 24, the seal 200 contacts the front element 112 both on the peripheral edge and the rear surface of the front element. Likewise, the seal 200 contacts the rear element 114 both on the peripheral edge and the front surface of the rear element. A first contact area in which seal 200 contacts the peripheral edge of front element 112 is larger than a second contact area in which seal 200 contacts the rear surface of front element 112. Likewise, a third contact area in which seal 200 contacts the peripheral edge of rear element 114 is larger than a fourth contact area in which seal 200 contacts the front surface of rear element 114. As a result, an interface between seal 200 and front element 112 defines an oxygen penetration path length through which oxygen would have to travel to enter chamber 126, wherein the portion of the path length extending along the peripheral edge of front element 112 is longer than the portion of the path length extending along the rear surface of front element 112. Similarly, an interface between seal 200 and rear element 114 defines another oxygen penetration path length through which oxygen would have to travel to enter chamber 126 wherein the portion of this path length extending along the peripheral edge of rear element 114 is longer than the portion of the path length extending along the front surface of rear element 114. By forming seal 200 of a thin member 202 of a first material having an oxygen permeability of less than 2.0 $cm^3 \cdot mm/m^2 \cdot day \cdot atm$ and/or by increasing the oxygen penetration path length as compared to other electrochromic cells, the amount of oxygen penetration into chamber 126 may be significantly reduced. Typical prior art seals are made of epoxy resins, which have oxygen permeabilities of 2.0-3.9 $cm^3 \cdot mm/m^2 \cdot day \cdot atm$ and water permeabilities of 0.7-0.94 $gm \cdot mm/m^2 \cdot day$, and are predominately positioned between the front and rear elements thereby having a shorter oxygen penetration path length.

First material forming thin member 202 may be made of a material selected from the group of: metal, metal alloy, plastic, glass, and combinations thereof. First material 2002 is adhered to the peripheral edges of the front and rear elements with a second material 204. The second material may have a higher oxygen permeability than said first material, and may be an electrically conductive adhesive or an electrically conductive epoxy that makes electrical contact with at least one of first and second electrically conductive layers 120 and 128.

In the preferred embodiment of the invention, the sealing member 200 includes a thin member 202 with low gas permeability that is adhered to the edge of the front and rear elements. An adhesive 204 such as an epoxy adhesive, PSA or hot melt can be applied in a thin film to a thin member 202 with low gas permeability such as a metal foil or plastic film. Examples of materials that may be used as thin member 202 include polycarbonate (oxygen permeability of 90.6-124 $cm^3 \cdot mm/m^2 \cdot day \cdot atm$ and water permeability of 3.82-4.33 $gm \cdot mm/m^2 \cdot day$), polyvinylidene chloride (oxygen permeability of 0.0152-0.2533 $cm^3 \cdot mm/m^2 \cdot day \cdot atm$ and water permeability of 0.01-0.08 $gm \cdot mm/m^2 \cdot day$), and a multilayer film of plastic and/or metal. Such a film may include inorganic layers or a coating such as $SiO_2$, $Al_2O_3$, $Ta_2O_5$, Al, chrome, etc. that is bonded to the edges of the front and rear glass elements with an adhesive or glass frit. An example of a suitable multilayer film is the SARANEX brand PE/PVC-PVDC film, which has an oxygen permeability of 0.2-0.79 $cm^3 \cdot mm/m^2 \cdot day \cdot atm$ and water permeability of 0.06-0.16 $gm \cdot mm/m^2 \cdot day$.

Figure 25:
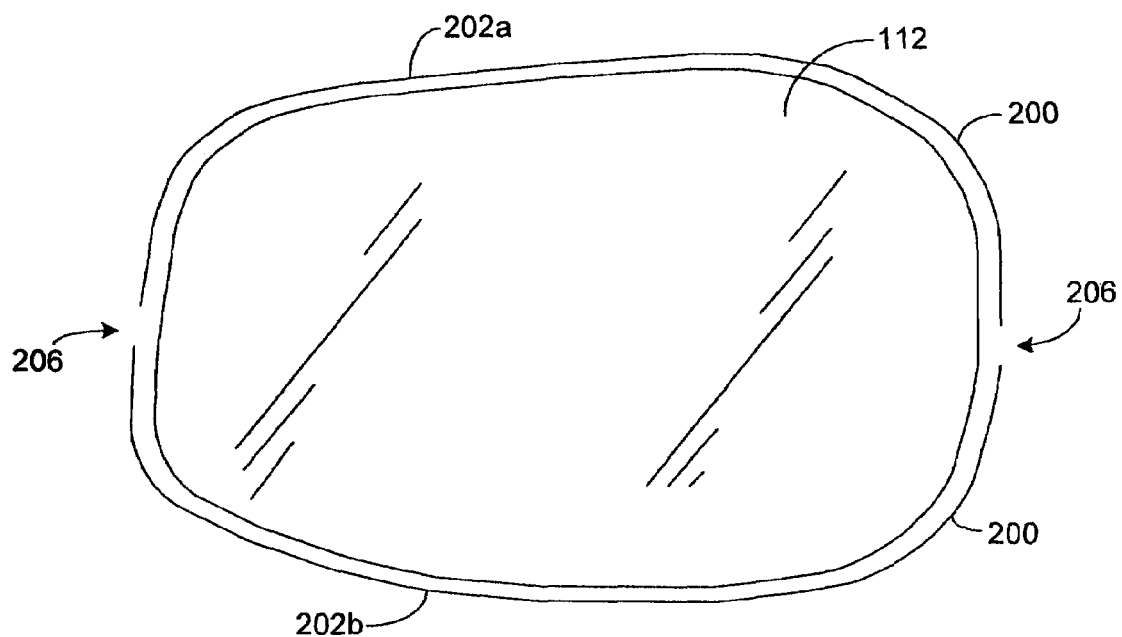
FIG. 25 is a top plan view of an electro-optic mirror element showing the provision of an edge seal as utilized in various embodiments of the present invention.

This foil or film 202 is then wrapped around the front and rear substrates that are held in the proper spaced apart relationship. The adhesive 204 bonds the foil or film 202 primarily to the substrate edges to form a gas and liquid tight seal around the perimeter of the electrochromic device. A fill port 206 (FIG. 25) could be added by leaving a gap in the foil or film edge sealing member or punching a hole through it. The fill hole could be soldered shut if a metal foil is used for the edge-sealing member. Alternatively, the fill hole could be plugged with an UV or visible light curing adhesive or hot melt or an additional thin sealing member such as a foil or film could be glued over the fill hole. If a light transparent film is used, a UV or visible light curing adhesive could be used to adhere the film. If a non-transparent metal foil is used a hot melt, PSA or other self-curing adhesive can be used. In this way the area that is required for a seal that is primarily between the substrates is eliminated and a bezel that had been designed to cover that area can be made narrower or eliminated.

Figure 26:
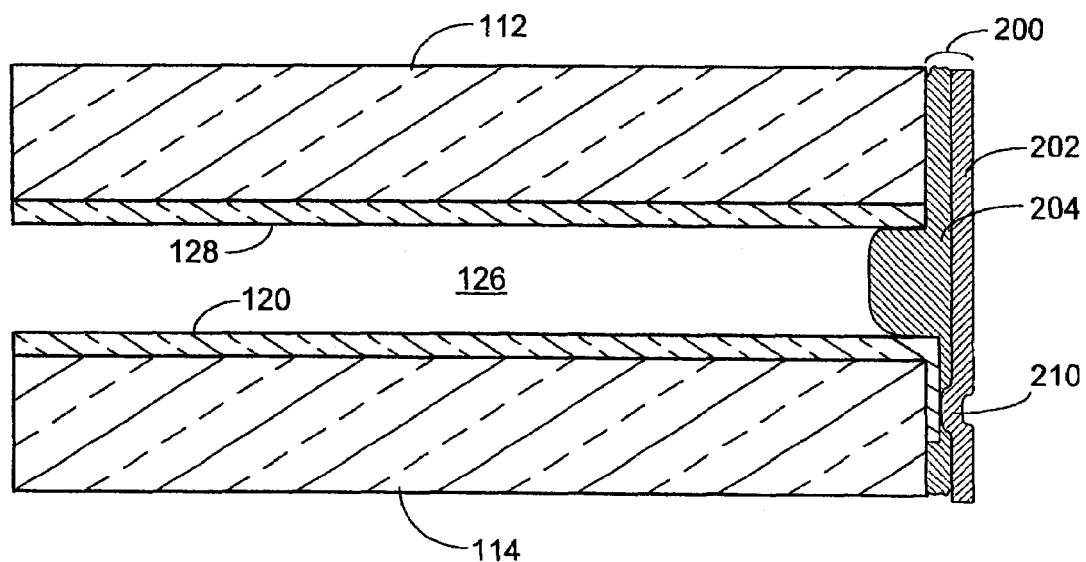
FIG. 26 is an enlarged cross-sectional view of an electro-optic mirror element incorporating an edge seal in accordance with a twenty-second embodiment of the present invention.
Figure 27:
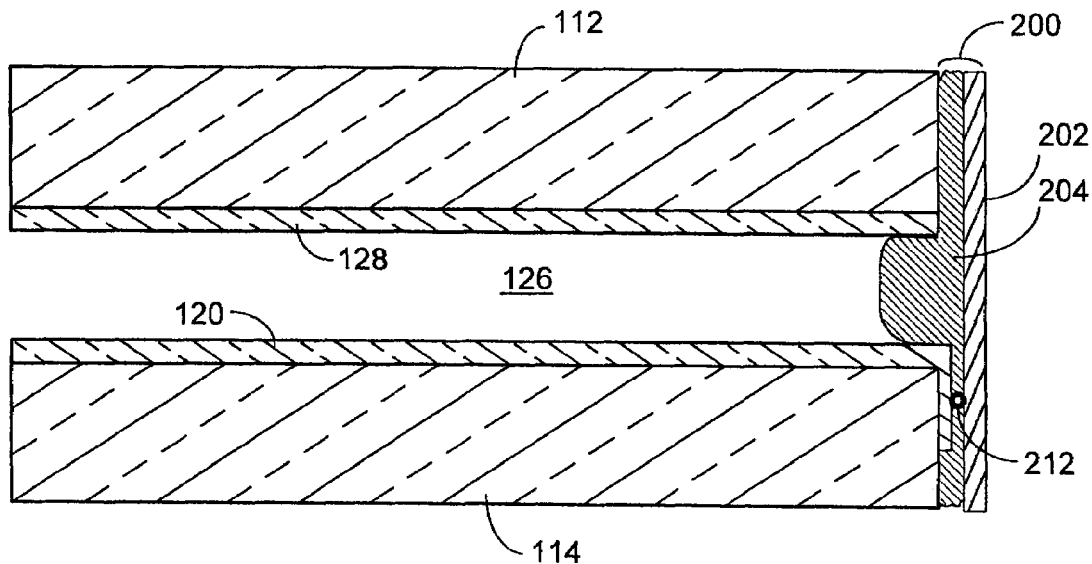
FIG. 27 is an enlarged cross-sectional view of an electro-optic mirror element incorporating an edge seal in accordance with a twenty-third embodiment of the present invention.
Figure 28:
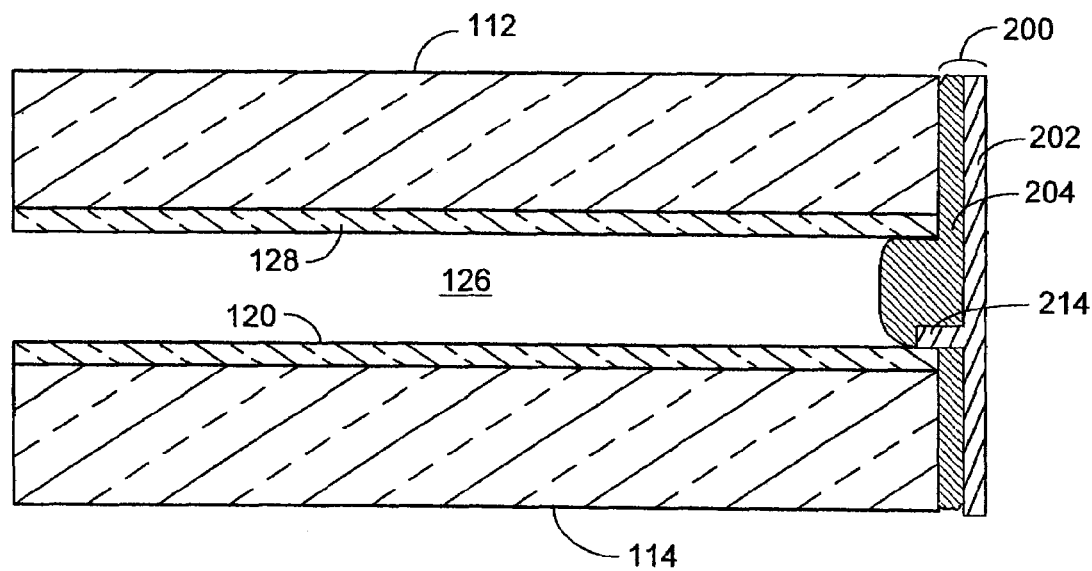
FIG. 28 is an enlarged cross-sectional view of an electro-optic mirror element incorporating an edge seal in accordance with a twenty-fourth embodiment of the present invention.

If the low gas permeability member adhered to the side of the substrates has areas that are electrically conductive this member could also serve as an electrical bus to make contact to the conductive electrodes of the electrochromic device. Electrical isolation of the electrodes could be maintained by creating gaps in the electrical continuity of the edge seal member. For example, if a metal foil was used, small slits or gaps 206 (FIG. 25) could be created in the foil such as one to be used as a fill hole and another opposite the fill hole to electrically isolate top and bottom electrode buses. Electrical continuity between the conductive edge sealing member and the electrode could be established in any number of ways. The conductive electrode coating(s) 120 and/or 128 could wrap around the side of the substrate(s) (FIGS. 26 and 27) or an electrically conductive coating or adhesive 208 (FIG. 29A-32) could be applied in areas that electrical connection to the edge bus is desired. The conductive sealing member 202 could have a dimple or crease 210 (FIG. 26) or include an inward protruding extension 214 (FIG. 28) to make contact through the adhesive bonding of the sealing member to the side of the substrate to make contact to the electrode coating or edge coating 120,128. Conductive particles in the adhesive or a conductive adhesive 208 could be used to make electrical contact between the conductive edge sealing member and the electrode coating or edge coating. A wire (212 in FIG. 27), metal clip (216 in FIG. 33) or other conductor could then be used to make contact between the electrically conductive edge seal 202 and the electrochromic device drive electronics. An electrochromic device made in this manor would require little or no bezel to cover the seal and contact area. A more detailed discussion of FIGS. 29A-33, is provided below.

Figure 29A:
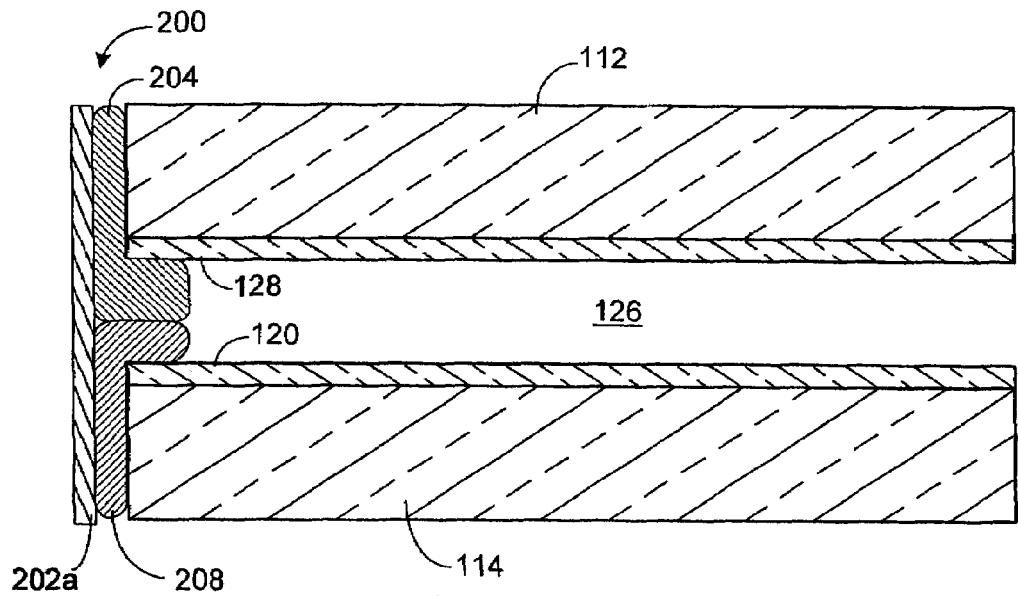
FIG. 29A is a first enlarged cross-sectional view of an electro-optic mirror element incorporating an edge seal in accordance with a twenty-fifth embodiment of the present invention.
Figure 29B:
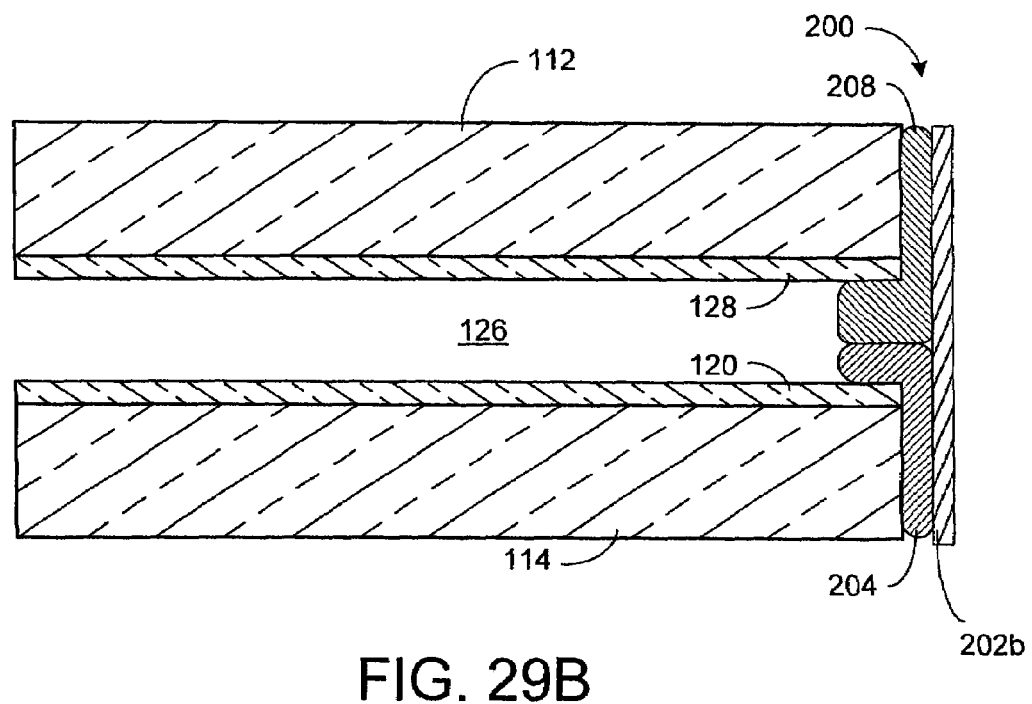
FIG. 29B is a second enlarged cross-sectional view of an electro-optic mirror element incorporating an edge seal in accordance with the twenty-fifth embodiment of the present invention.

As shown in FIGS. 29A and 29B, thin seal member 202 may be secured to the peripheral edges of elements 112 and 114 using both an electrically conductive material 208 and a nonconductive material 204. As depicted in FIG. 29A, the conductive material 208 provides an electrical connection from conductive layer 128 to a first portion 202a (see FIG. 25) of seal member 202. As depicted in FIG. 29B, the conductive material 208 provides an electrical connection from conductive layer 120 to a second portion 202b of seal member 202. As mentioned above, fill ports, gaps or slits in the thin seal member and conductive material 208 may be used to electrically isolate portions 202a and 202b of thin seal member 202.

Figure 30:
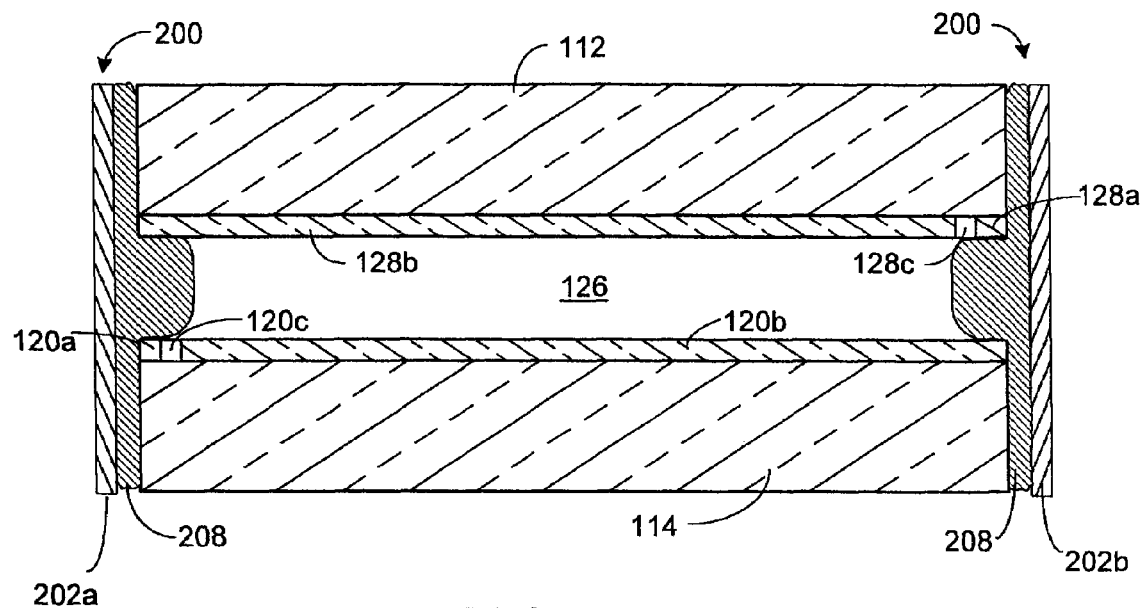
FIG. 30 is an enlarged cross-sectional view of an electro-optic mirror element incorporating an edge seal in accordance with a twenty-sixth embodiment of the present invention.

In the embodiment shown in FIG. 30, conductive layers 128 and 120 are configured and oriented as shown in FIG. 8C, such that the conductive material 208 provides an electrical connection from conductive layer 128 to a first portion 202a (see FIG. 25) of seal member 202, and the conductive material 208 also provides an electrical connection from conductive layer 120 to a second portion 202b of seal member 202. As mentioned above, fill ports, gaps or slits in the thin seal member and conductive material 208 may be used to electrically isolate portions 202a and 202b of thin seal member 202.

Figure 31:
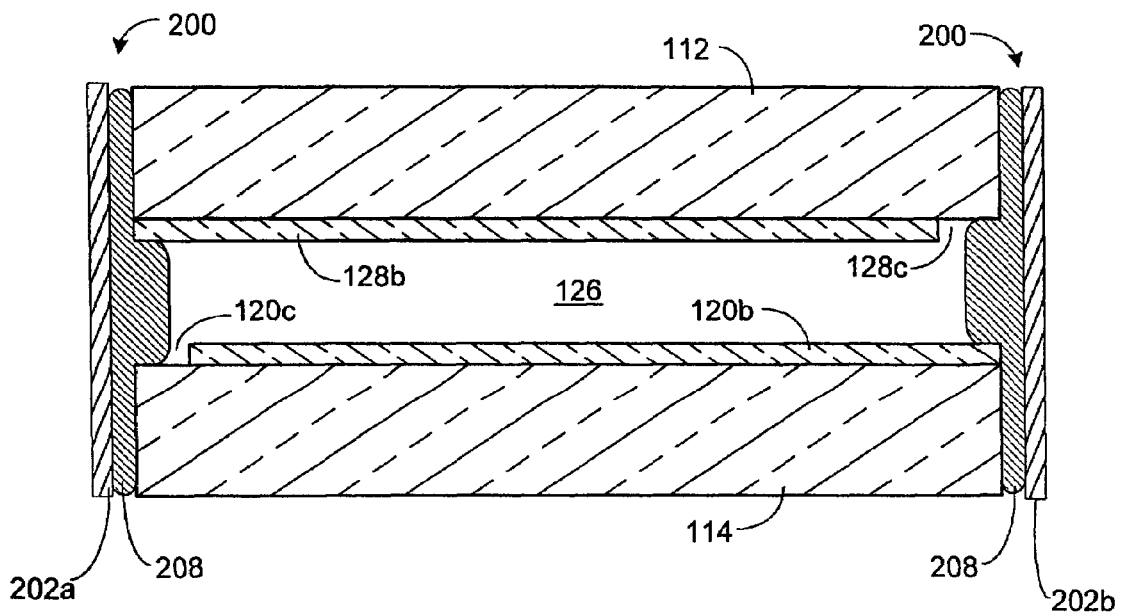
FIG. 31 is an enlarged cross-sectional view of an electro-optic mirror element incorporating an edge seal in accordance with a twenty-seventh embodiment of the present invention.

FIG. 31 shows an embodiment similar to FIG. 30 with the exception that regions 128a and 120a of conductive layers 120 and 128 are eliminated.

Figure 32:
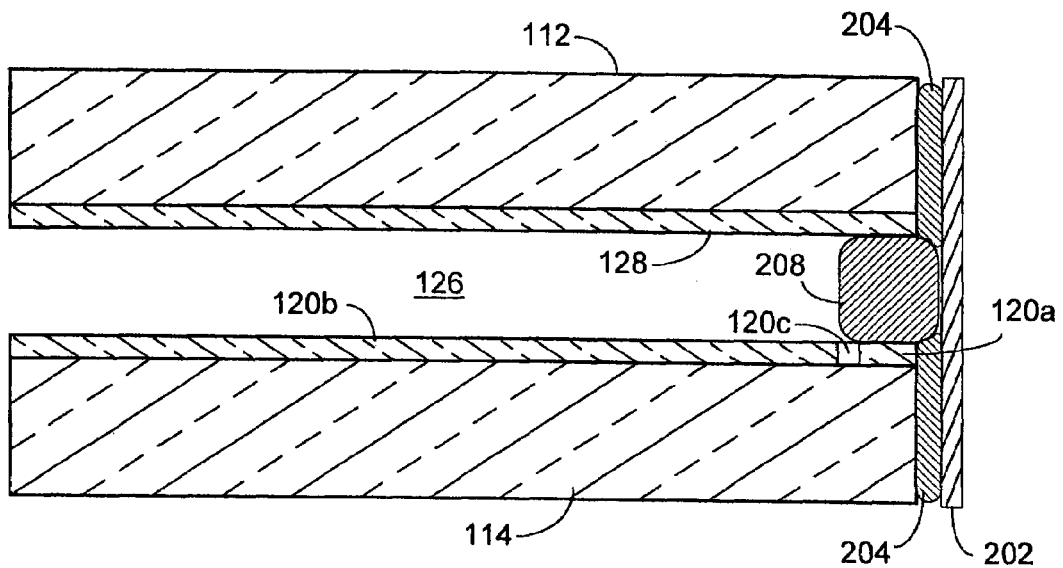
FIG. 32 is an enlarged cross-sectional view of an electro-optic mirror element incorporating an edge seal in accordance with a twenty-eighth embodiment of the present invention.

FIG. 32 shows an embodiment wherein only the center portion of the adhesive material disposed between layers 120 and 128 is electrically conductive, while nonconductive is used to adhere seal member 202 to the peripheral edges of elements 112 and 114. This provides the advantage that electrically conductive material 208 may not need to be as effective as an adhesive with respect to thin member 202.

Figure 33:
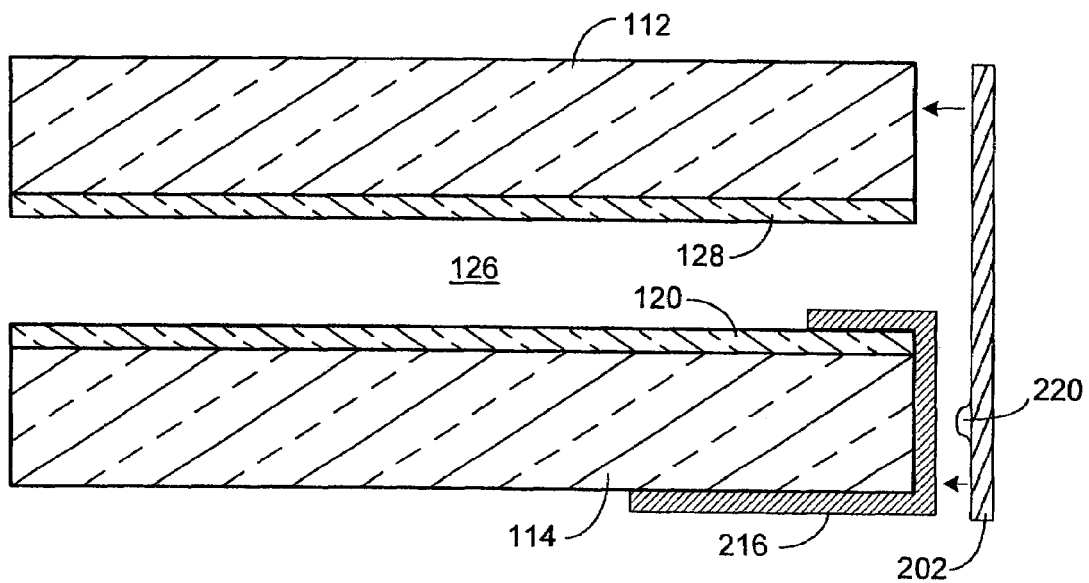
FIG. 33 is an enlarged cross-sectional view of an electro-optic mirror element incorporating an edge seal in accordance with a twenty-ninth embodiment of the present invention.

FIG. 33 shows an embodiment wherein a clip 216 (similar to clip 182 in FIGS. 21B and 21C) is used in combination with thin seal member 202, which may be a metal foil or the like.

As illustrated, a solder bump 220 may be provided for soldering thin foil 202 to clip 216.

Methods for connecting electrodes of an electrochromic medium to a heater circuit or a flexible circuit board are disclosed in commonly assigned U.S. patent application Ser. No. 10/105,574 entitled "REARVIEW MIRROR ASSEMBLY CONSTRUCTION," filed on Mar. 25, 2002, the entire disclosure of which is incorporated herein by reference. Specifically, part of the flexible circuit board on which the heater circuit is provided may extend beyond the edges of element 114 and wrap upwardly so as to make contact with conductive material on the edge of the electrochromic device.

Another option for providing electrical contact would be to provide a conductive layer or other material on the inner surface of the bezel 144 in which pressure exerted by the bezel would create the contact force between the connector and either the electrode layers themselves or the conductive portion 152 of the seal.

As apparent from the foregoing embodiments, portions of the seal may be configured to function as an electrical bus. The seal may be electrically conductive either across a portion of its width, a portion of its height, or a portion of its length. A seal may be formed of a conductive ink or epoxy and may be filled with metal flakes, fibers, particles, or other conductive materials as described above.

It should be noted that the zero offset mirror with either the majority of the seal between the substrates or on the edge of the substrates presents a very sleek profile as compared to a typical electrochromic mirror with an offset and may require no substantial bezel at all. For example, with a black or tinted seal between the substrates an aesthetically pleasing mirror can be made by just rolling black or tinted paint over the edges of the mirror. The bezel would then consist of just a thin layer coating of paint or other material on the perimeter of the mirror that would look like a bezel. Likewise, this thin coating can be applied to wrap over the edge and cover a portion, or all, of the region between the substrate seal. This process would also apply to mirrors where the majority of the seal is on the edge of the glass. A thin coating of paint or other material could be applied to the edge of the mirror to present an edge that is aesthetically pleasing and uniform in appearance. Further, by providing a wider and more uniform seal, the need to obscure the seal may be eliminated.

As will be apparent to those skilled in the art, each of the above embodiments provides the advantage that the vertical positional offset between the front and rear elements 112 and 114 may be reduced or eliminated thereby reducing any corresponding portion of the width of the bezel (if provided). Other aspects of the invention can otherwise be used to obscure the view of the seal or provide unique bezels. It will be appreciated, however, that the various aspects may be used separately regardless of implementation of any of the other aspects, or may be used in various combinations.

Figure 36:
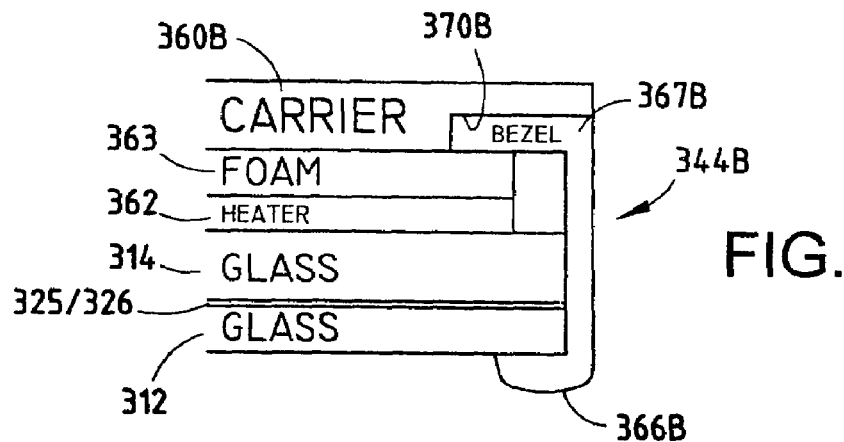

As noted above, FIGS. 34-42 are enlarged fragmentary cross sectional views of the edge of eleven additional mirror constructions, each having a bezel aesthetically covering an outboard edge of an electrochromic mirror element, the bezels in FIG. 34-36B being bonded to an edge of a carrier of the mirror subassembly, and the bezels in FIGS. 37-42 being mechanically interlockingly engaged (and also potentially bonded) with an edge of a carrier in FIGS. 37-42.

In the FIGS. 34-49, similar and identical components are referred to using the same numbers, but with the addition of a letter (e.g. "A", "B", etc.). This is done to reduce redundant discussion.

More specifically, in FIGS. 34-42, the electrochromic mirror subassembly 310 includes front and rear glass mirror elements 312 and 314 defining a cavity 325 therebetween filled with electrochromic material 326. Electrodes, clips, a seal, a reflective layer, and other structures are included as described above and as shown in FIGS. 2-33. The illustrated elements 312 and 314 have edges that preferably have a "zero offset" (i.e. the edges are on average about 1 mm or less from perfect alignment, or more preferably are about 0.5-mm or less from perfect alignment, or most preferably are about 0.2 mm or less from perfect alignment). It is noted that illustrated mirrors have a zero offset that extends completely around their periphery, however, it is conceivable that some bezels could function where the zero offset extends along only part of the edges of the front and rear element assemblies.

The mirror assembly 308 (FIG. 34) includes a carrier 360 with a substantially flat front surface 361, and further includes a substantially flat thin heater element 362 and double-sticky-sided foam tape 363 that adheringly bonds the electrochromic mirror subassembly 310 to the front surface 361 in a laminar well-supported arrangement. The front surface 361 of the carrier 360 is made to be as flat as possible so that the front and rear elements 312 and 314 do not undergo localized deformation that would unacceptably distort reflected images. Depending on the flatness of the front surface 361, the front and rear elements 312 and 314 are made thicker or thinner. It is contemplated that the carrier 360 may be a molded plastic component, or may be a metal or other material. If the reader desires additional information on such systems, the reader's attention is directed to U.S. Pat. No. 6,195,194, issued Feb. 27, 2001, entitled LIGHT-WEIGHT ELECTROCHROMIC MIRROR, and also patent application Ser. No. 10/405,526, filed Apr. 2, 2003, entitled MIRROR HAVING STRUCTURAL CENTER PIECE AND NON-STRUCTURAL HOUSING (Gentex P432), the entire contents of both of which are incorporated herein in their entirety.

Figure 34:
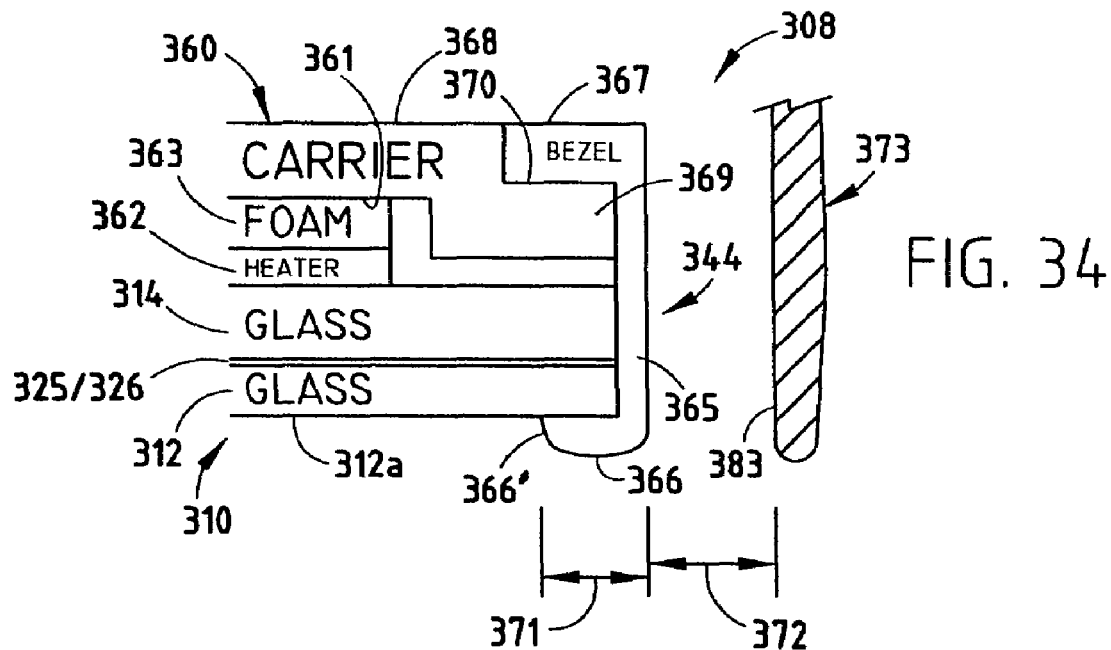
FIGS. 34-42 are enlarged fragmentary cross-sectional views of the edge of eleven additional mirror constructions, each having a bezel aesthetically covering an edge of an electro-optic mirror element, the bezel being bonded to an edge of a carrier of the electro-optic mirror element in FIGS. 34-35A, 36, and mechanically interlockingly engaging an edge of a carrier in FIGS. 37-42.
Figure 35:
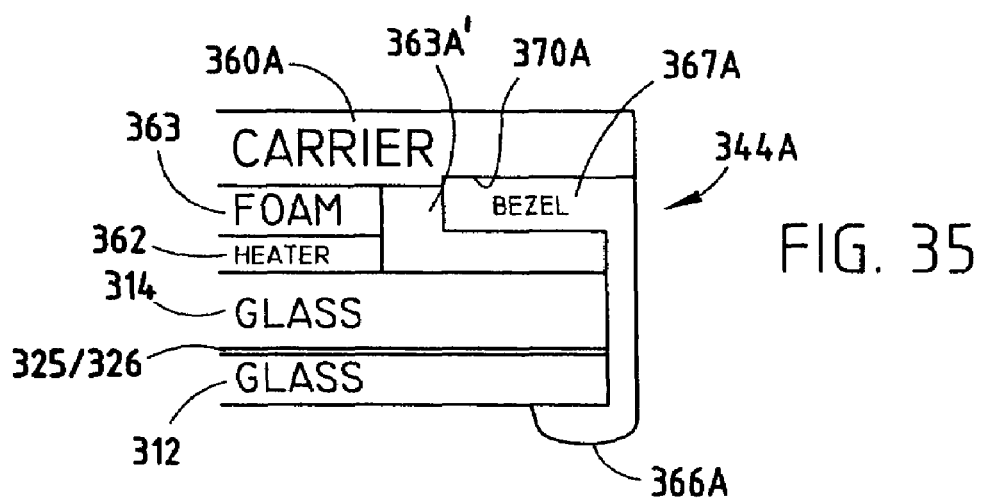

A bezel 344 (FIG. 34) is attached to the mirror assembly 308. The bezel 344 has a C-shaped cross section, and forms a continuous loop that extends around a perimeter of the mirror subassembly 310 in a fashion similar to the three bezels 144 shown in FIG. 2. The bezel 344 (FIG. 34) includes a forwardly-extending leg 365, a front lip 366 that extends onto an outer marginal portion of the front surface 312a of the front element 312, and a rear lip 367 that extends onto an outer marginal portion of the rear surface 368 of the carrier 360. As illustrated in FIG. 34, an edge flange 369 on the carrier 360 forms a rear-facing recess 370 that receives the rear lip 367. The inner surface of the leg 365 closely engages the edges of the front and rear elements 312 and 314, and the inner surface of the lips 366 and 367 closely engage the front surface 312a of front element 312 and the rear surface 368 of the carrier 360, respectively. In a preferred embodiment, the bezel 344 is insert molded onto the carrier 360, with the rear lip 367 being bonded to the rear surface 368 of the carrier 360 as part of the molding process. Alternatively, the rear lip 367 can be adhered or bonded as a secondary assembly process. It is contemplated that the front lip 366 can also be bonded to the front surface 312a of the front element 312. The leg 365 could also be bonded to an edge of the front and rear elements 312 and 314, although this is not a required or condition. Alternatively, it is contemplated that the front lip 366 can be formed with an "over-bent" condition so that the innermost tip 366' of the front lip 366 resiliently engages the front surface 312a with a bias, and is not held away by engagement of an outboard portion of the front lip 366. By this arrangement, the bezel 344 is an integral part of the mirror assembly 308, and both helps retain the assembly together, and also seals an outer edge of the electrochromic mirror subassembly 310.

The bezel 344 has an exceptionally thin profile dimension 371. This is a desirable condition which original equipment manufacturers are looking for, in order to allow a smaller dimension 372 to the inner surface 383 of the outside rearview mirror housing 373. This is an important characteristic to original equipment manufacturers of vehicles, since larger mirror subassemblies 310 allow greater fields of vision in a rearward direction, and smaller exterior mirror housings 373 allow greater field of vision in a forward direction (i.e. past the mirror toward a front of the vehicle). It is contemplated that the material of bezel 344 can be elastomer or a more rigid thermoplastic or metal material, as described above in regard to bezel 144a (FIG. 19). It is contemplated that the front lip 366 will be about 2 mm wide or less, and will cover a continuous perimeter strip on the front surface 312a that is about 2 mm or less wide. However, it is contemplated that the lip 366 can cover a strip on the front surface that is as low as about 1 mm or less wide; or can be made to extend onto the front surface 312a only in certain areas (such as top and bottom edges and not onto the right and left sides of the face surface 312a); or can be made to not extend onto the front surface 312a at all. Where the bezel does not cover any of the elements 312 and 314, the entire front surface of the front element 312 can be used (i.e. 100% of the front surface can be used for showing a reflected image). This is believed to be novel and non-obvious for modern mirrors with electronic options, especially electrochromic mirrors (See FIGS. 3, 11, 13, 15-18, 23, 24, 26-28, 29B-33, and 49).

Bezel 344A (FIG. 35) is similar to the bezel 344 (FIG. 34), except that the recess 370A is formed on a front surface of the carrier 360A, and the rear lip 367A is positioned in and bonded to the front surface of the carrier 360A. As a result, the rear lip 367A is positioned in a space 363A' located between the edge of the carrier 360A and the edge of the rear element 314. The rear lip 367A terminates outboard of an outer edge of the heater 362 and the foam tape 363.

Figure 35A:
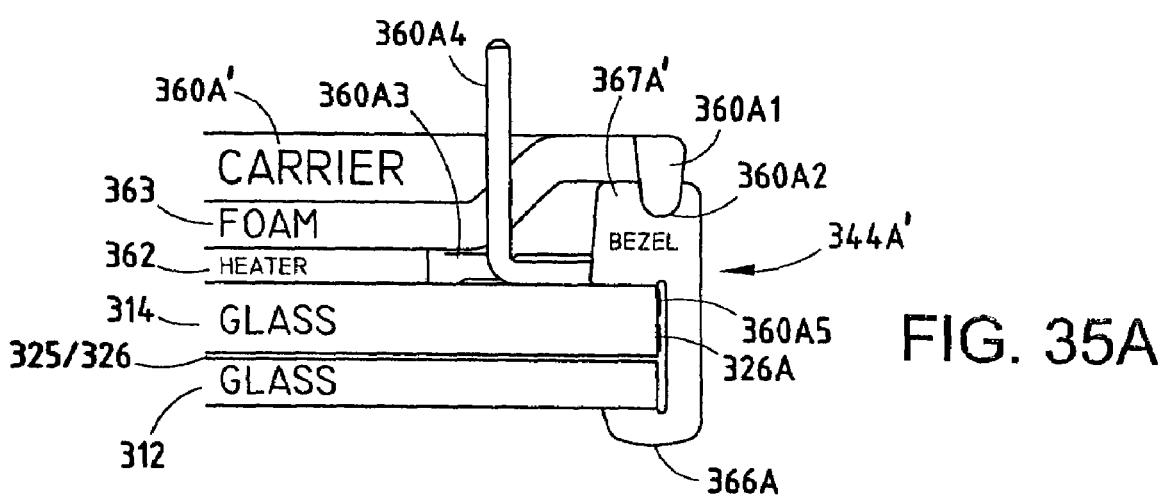
Figure 37:
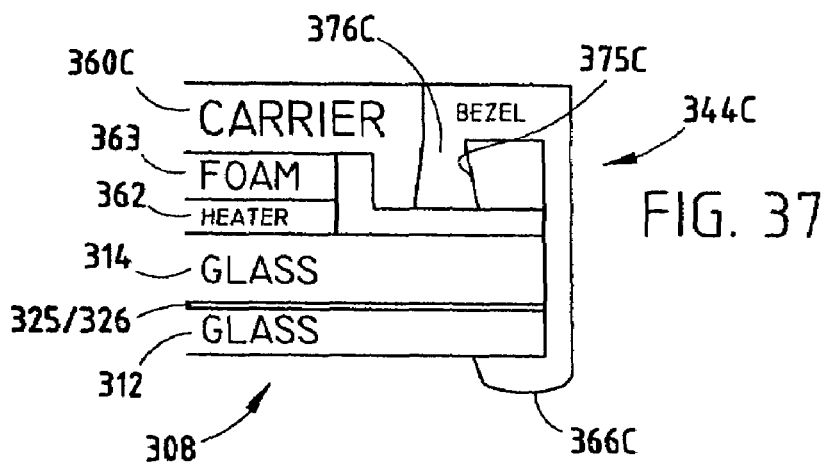
Figure 38:
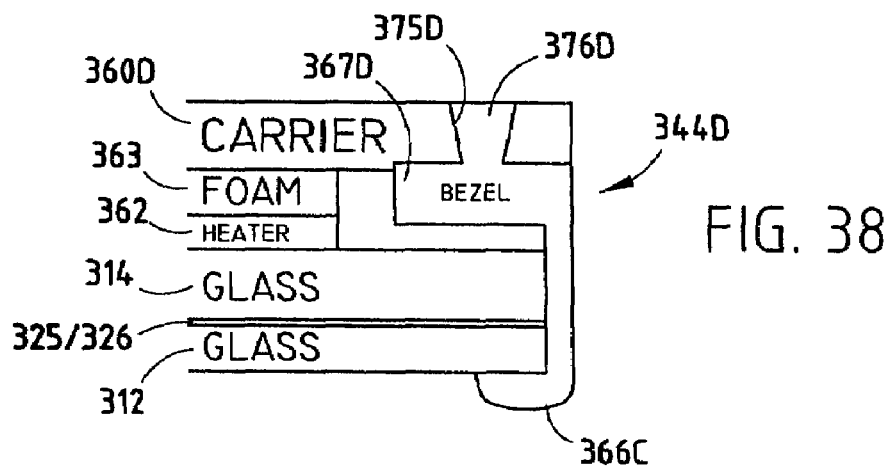
Figure 39:
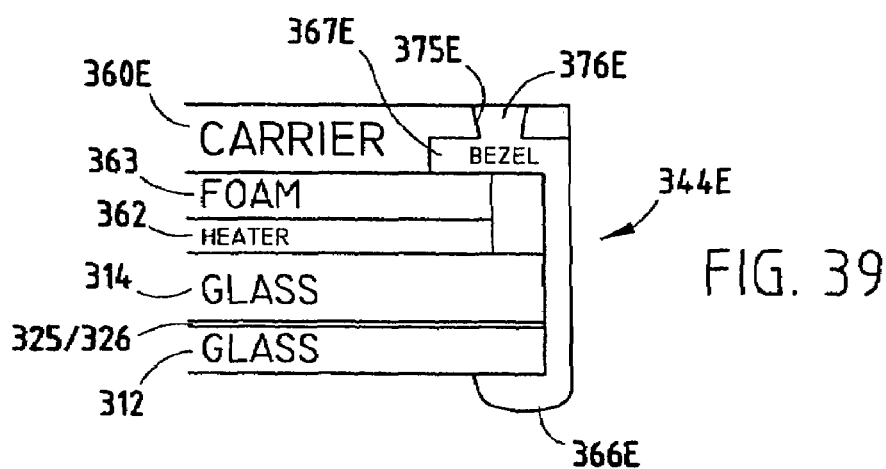
Figure 40:
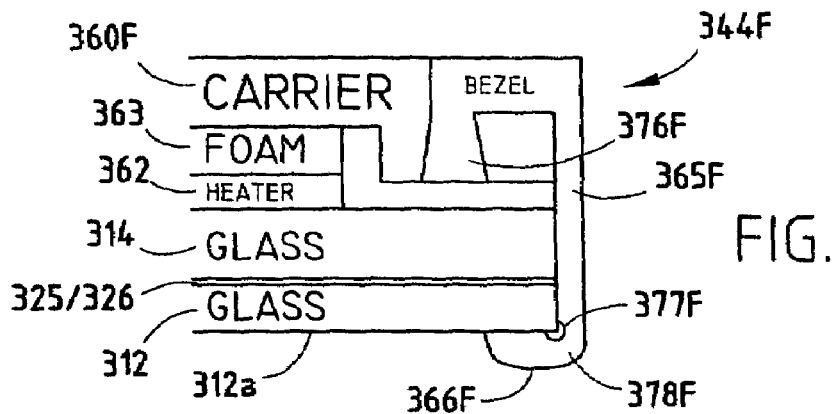
Figure 41:
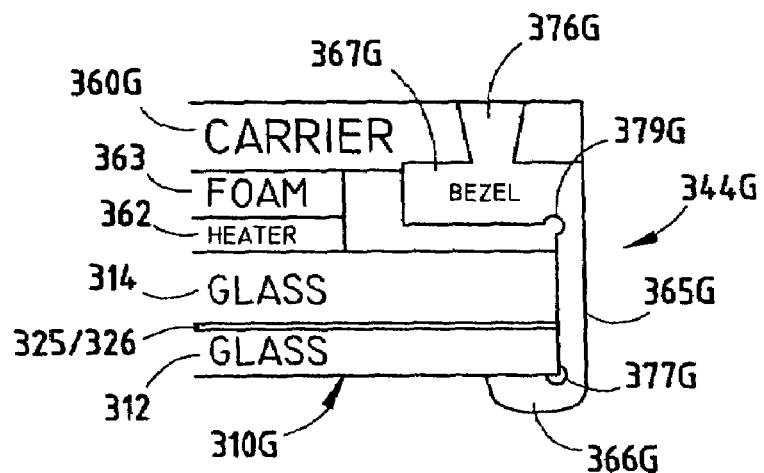
Figure 42:
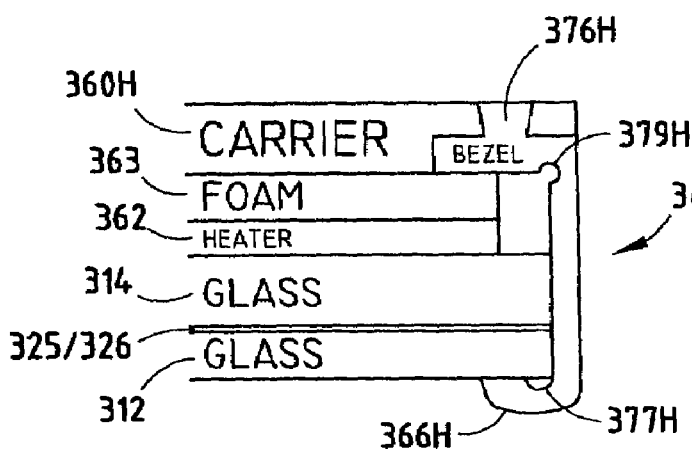
Figure 43:
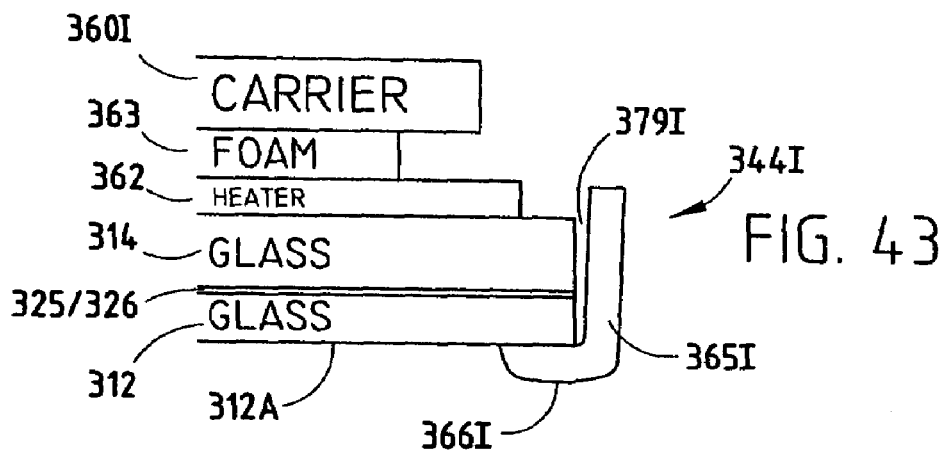
FIGS. 43-46 are enlarged fragmentary cross-sectional views of the edge of six additional mirror constructions, each having a bezel aesthetically covering a front of an edge of an electro-optic mirror element, the bezel in FIGS. 43-44 also covering a side of the edge, the bezel in FIGS. 45-46 only partially covering a side of the edge.
Figure 44:
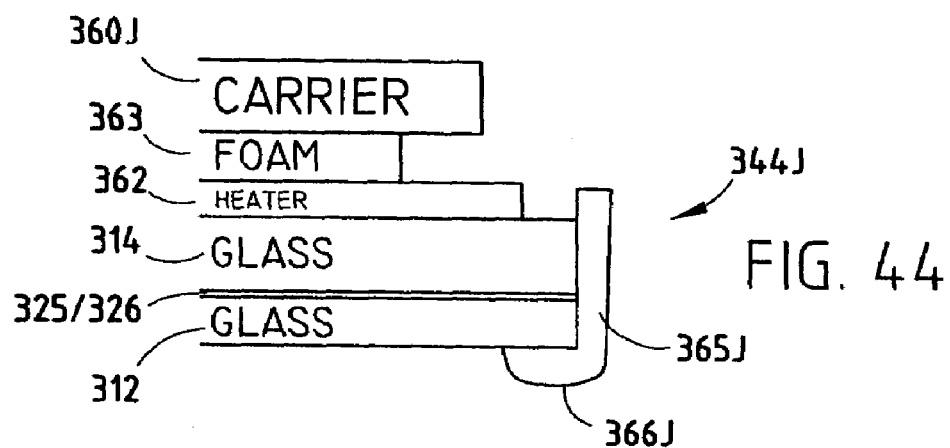
Figure 45:
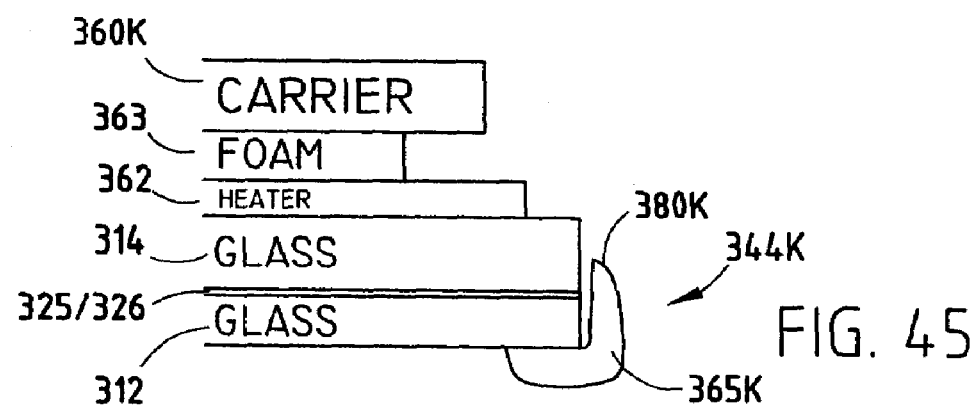

Bezel 344A' (FIG. 35A) is similar to bezel 344A, except in bezel 344A', the carrier 360A' has a forwardly extending lip 360A1 that engages a mating recess 360A2 in a rear of the bezel's rear lip 367A'. Also, the carrier 360A' is modified to include an aperture 360A3 permitting wire 360A4 to pass through and connect to the electrical conductor or clip 360A5 for operating the electrochromic material 326A.

Bezel 344B (FIG. 36) is similar to the bezel 344A (FIG. 35), with the recess 370B being formed on a front surface of the carrier 360B. However, the front surface of the rear lip 367B of bezel 344B is coplanar with the front surface of the carrier 360B, and the outer edge of the foam tape 363 (and also the heater 362) extends onto the rear lip 367B.

Bezel 344C (FIG. 37) is similar to the bezel 344 (FIG. 34) except that the carrier 360C includes a trapezoidal-shaped keyhole 375C, and the bezel 344C includes a key 376C that engages the keyhole 375C to positively mechanically retain the bezel 344C to the mirror assembly 308. It is contemplated that the key 376C is molded as part of the insert molding process of molding the bezel 344C onto the mirror assembly 308. However, the keyed arrangement can also be made by heat staking, or by sonic or mechanical methods of forming a protrusion into the shape of a key or rivet-like connection.

Bezel 344D (FIG. 38) is similar to the bezel 344C (FIG. 37), except that the keyhole 375D faces an opposite direction (i.e. a large end opens rearwardly), and the key 376D extends into the keyhole 375D from a front location.

Bezel 344E (FIG. 39) is similar to the bezel 344D, with the key 376E extending rearwardly. In bezel 344E, the tape 363 extends onto the rear lip 367E. However, the key 376E is preferably located at or outboard of an outboard edge of the foam tape 363, to minimize a possibility of the key 376E disrupting the surface that the tape 363 is bonded to; however, this is not required.

Bezel 344F (FIG. 40) is similar to the bezel 344C (FIG. 37), except that bezel 344F (FIG. 40) includes a large radius 377F on an inside corner as defined by the joint of leg 365F and front lip 366F. The larger radius 377F forms a cavity that better assures that the inside corner does not engage an edge of the front element 312 in a manner causing the front lip 366F to stand away from the front surface 312a. The radius 377F also causes a thinned section on a front portion 378F of leg 365F that both acts as a resilient hinge point and prevents bending in other undesirable areas along leg 365F.

Bezel 344G (FIG. 41) is similar to bezel 344F (FIG. 40), except that bezel 344G includes a second large radius 379G at the corner formed by the leg 365G and the rear lip 367G. This allows the leg 365G (and front lip 366G) to adjust to any undulations along the edge of the mirror assembly 308G, such as may occur along a clip positioned on the edge of the mirror subassembly 310G.

Bezel 344H (FIG. 42) is similar to the bezel 344G (FIG. 41), except that the front-located radius 377H is made larger than front radius 377G. Further, the radius 377H is also shifted so that, instead of being at the corner, the radius 377H is located on the underside of the front lip 366H.

As noted above, the FIGS. 43-46 are enlarged fragmentary cross-sectional views of the edge of four additional mirror constructions, each having a bezel aesthetically covering a front edge of an electrochromic mirror element, the bezels in FIGS. 43-44 also covering an entire side of the edge, but the bezels in FIGS. 45-46 only partially covering a side of the edge.

More specifically, the bezel 344I (FIG. 43) is L-shaped and includes a leg 365I and front lip 366I, but does not include a rear lip (367). The leg 365I is spaced slightly away from the edge of the front and rear elements 312 and 314, creating a gap 379I. Preferably, the front lip 366I is insert molded onto and bonded to the front surface 312a. The gap 379I prevents any irregularity along the edge of the front and rear elements 312 and 314 from deforming the leg 365I of the bezel 344I in a manner that reads through onto the front lip 366I. Also, the gap 379I allows the leg 365I to flex and move when the elements 312/314 and the bezel 344I undergo different thermal expansions/contractions. Bezel 344J (FIG. 44) is similar to bezel 344I (FIG. 43), except that bezel 344J (FIG. 44) does not include any gap (379I) between leg 365J and the edges of the front and rear elements 312 and 314. If desired, leg 365J is bonded to the side edges of the elements 312 and 314.

Bezel 344K (FIG. 45) is similar to bezel 344I (FIG. 43), except that the leg 365K is shortened, such that it extends only slightly past the cavity 325. Further, the end 380K of the leg 365K is tapered toward the rear element 314. The bezel 344L (FIG. 46) is similar to bezel 344J (FIG. 44), but bezel 344L (FIG. 46) includes an end 380L that terminates short of the cavity 325, and that is relatively blunt rather than being tapered. Specifically, the end 380L terminates on an edge of the front element 312. The end 380L can be bonded to a side edge of the element 312 as part of an insert molding operation, for example.

Figure 47:
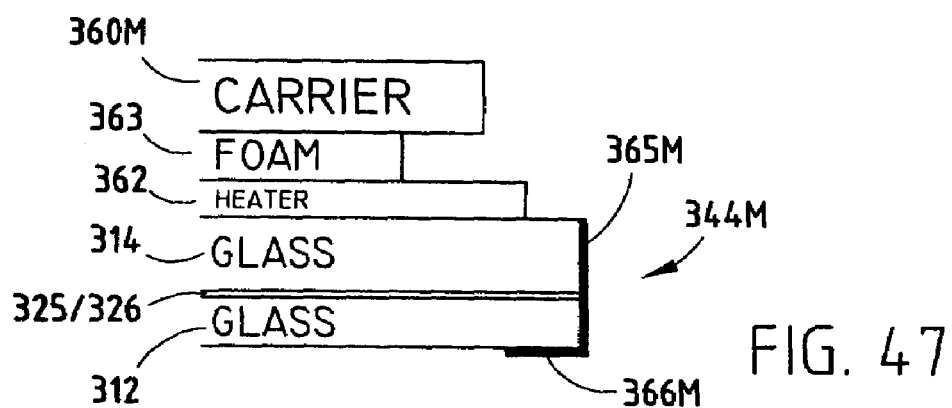
FIGS. 47-49 are enlarged fragmentary cross-sectional views of the edge of three additional mirror constructions, each having an edge of an electro-optic mirror element coated by a strip of material, FIG. 47 showing the strip extending from the front surface completely across a side, FIG. 48 showing the strip extending from the front surface partially onto a side, FIG. 49 showing the strip limited to the second surface of the electro-optic mirror element.
Figure 48:
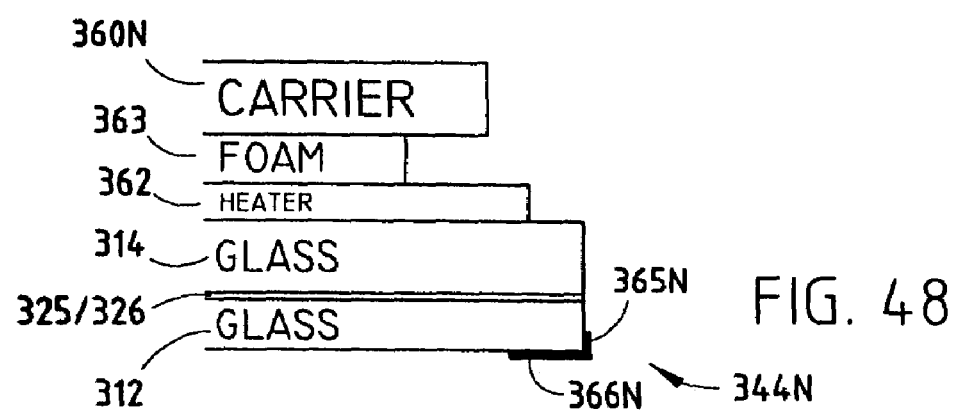
Figure 49:
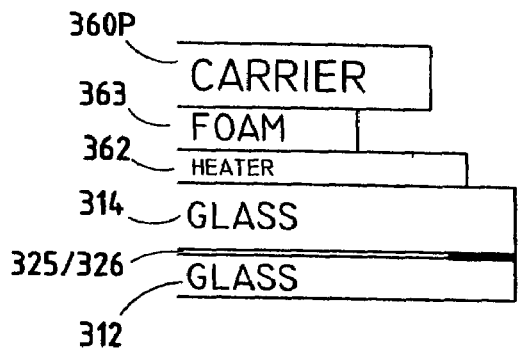

FIGS. 47-49 are enlarged fragmentary cross-sectional views of the edge of three additional mirror constructions, each having an edge of an electrochromic mirror element coated by a strip of material. These arrangements are described as bezels since they provide a similar appearance, including a thin profile around a perimeter of the mirror subassembly 310.

Bezel 344M (FIG. 47) is similar to bezel 344J, in that it includes an L-shaped strip of material with a front lip 366M extending on the front surface and a leg 365M extending across side edges of the front and rear elements 312 and 314. The material of bezel 344M and examples of the process of applying the bezel 344M are described above in regard to FIGS. 15-17B. (For example, see coating 176, FIG. 17A, and see non-conductive material 162, FIG. 13., and see elastomeric material 144a, FIG. 19).

Bezel 344N (FIG. 48) is similar to bezel 344M (and bezel 344L) in that the bezel 344N includes a front lip 366N and leg 365N. However, the leg 365N is shortened such that it extends short of the cavity 325.

Bezel 344P (FIG. 49) is similar to the bezels 344M and 344N, in that it includes a painted strip of material located along a marginal edge of the front element 312. However, bezel 344P is applied to the second surface of the front element 312 (i.e. in the cavity 325) and does not extend onto side edges of the front or rear elements 312 and 314. Visually, the appearance is not unlike the bezel 344M (FIG. 47) and bezel 344N (FIG. 48). The material of bezel 344P can be opaque, translucent, light-absorbing, or reflective, and dark or light color.

Figure 50:
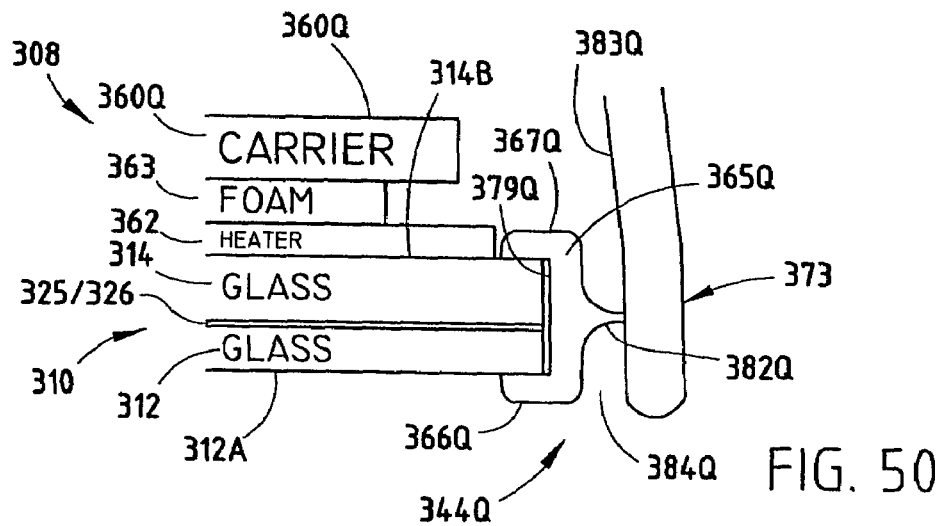
FIGS. 50-51 are enlarged fragmentary cross-sectional views of a bezel having a C-shaped cross section that covers a side edge of the electro-optic mirror element and that wraps onto the first and fourth surfaces of the electro-optic mirror element, but also that includes a resiliently flexible fin that extends laterally away from the electro-optic mirror element into wiping contact with a mirror housing.
Figure 51:
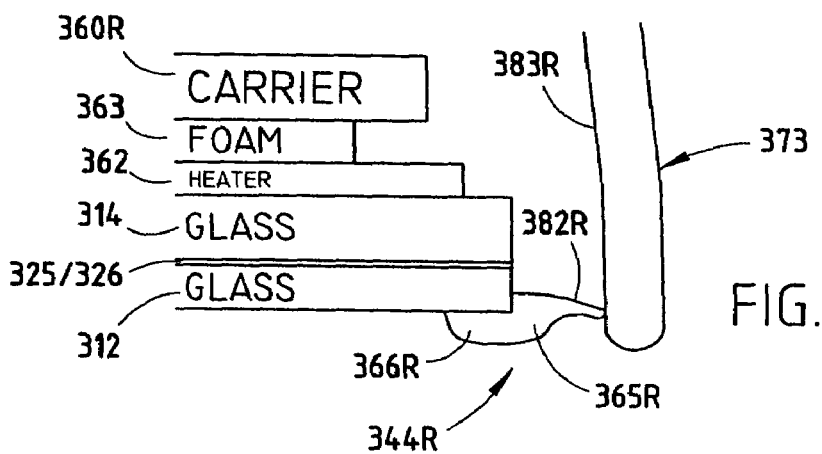

FIGS. 50-51 are enlarged fragmentary cross-sectional views of bezels having a C-shaped cross section that covers a side edge of the electrochromic mirror element and that wraps onto the first and fourth surfaces of the electrochromic mirror element subassembly. However, the bezels further include a resiliently flexible fin that extends laterally away from the electrochromic mirror element into wiping contact with a mirror housing.

More specifically, the bezel 344Q (FIG. 50) is C-shaped, and is not unlike the bezel 144 (FIG. 2) or bezel 144a (FIG. 19) or bezel 344 (FIG. 34). The bezel 344Q (FIG. 50) includes a leg 365Q creating a gap 379Q to an edge of the front and rear elements 312 and 314, and further includes a front lip 366Q that extends onto the front surface 312a of the front element 321, and a rear lip 367Q that extends onto a rear surface 314b of the rear element 314. A flexible resilient fin 382Q extends in an outboard direction from a midpoint on the leg 365Q. The illustrated fin 382Q becomes thinner and thinner as it extends to its tip, although it is contemplated that the fin can have different shapes. The mirror housing 373 includes an inner surface 383Q that is engaged by the fin 382Q. It is preferable that the fin 382Q only lightly engages the inner surface 383Q so that minimal frictional drag is created as the mirror assembly 308 is angularly adjusted within the mirror housing 373. Thus, the power pack that is connected to the carrier 360Q and that angularly adjusts the mirror assembly maintains its low energy requirement for adjustment. It is noted that the fin 382Q can be designed to allow a small gap to occur between the fin 382Q and the inner surface 383Q, especially at extreme angular positions of the mirror assembly if desired. The fin 382Q allows the vertical and horizontal dimensions of the mirror subassembly 310 to be maximized relative to the opening 384Q defined by the housing 373. This is an important characteristic to original equipment manufacturers of vehicles, since larger mirror subassemblies 310 allow greater fields of vision in a rearward direction, and smaller exterior mirror housings 373 allow greater field of vision in a forward direction.

Figure 46:
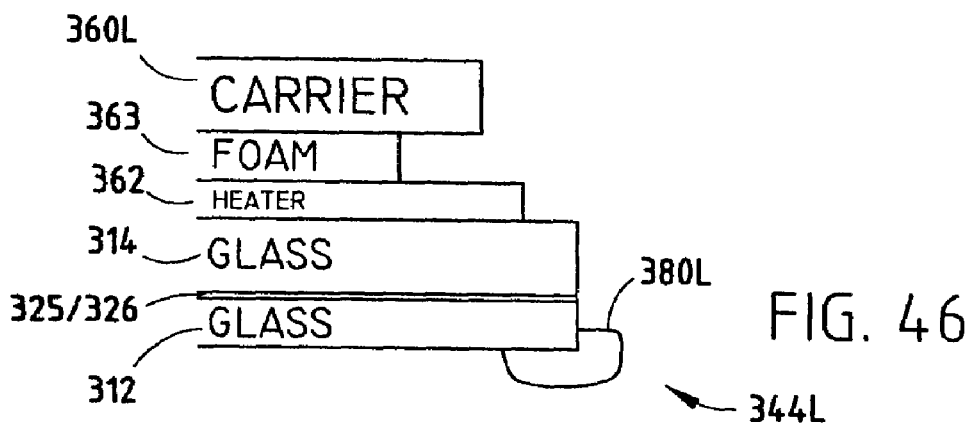

Bezel 344R (FIG. 51) is similar to bezel 344Q, except bezel 344R (FIG. 51) includes a foreshortened leg 365R and a front lip 366R similar to the bezel 344L (FIG. 46). A resilient fin 382R extends laterally from the leg 365R in an outboard direction, into light sliding contact with the inner surface 383R of the housing 373.

It is contemplated that the bezels 344-344R can be extruded onto or molded onto or adhering applied to the front surface 312a of a front element 312; and/or extruded or molded or applied onto the front and side surfaces of the mirror subassembly 310 (which includes elements 312 and 314); and/or extruded/molded/applied onto the mirror subassembly 310 (which includes elements 312, 314, carrier 360, heater 362, and foam tape 363); and/or extruded/molded/applied to the carrier 360; and/or extruded/molded/applied to the side edges of one or both of the elements 312, 314. For example, technology is available to extrude polymer directly onto a window glass. See Osanami U.S. Pat. No. 5,158,638, issued Oct. 27, 1992, entitled METHOD OF MAKING WINDOW GLASS WITH A GASKET, the entire contents of which are incorporated herein by reference for the purpose of teaching such a method of direct application/extruding onto a glass element.

Figure 52:
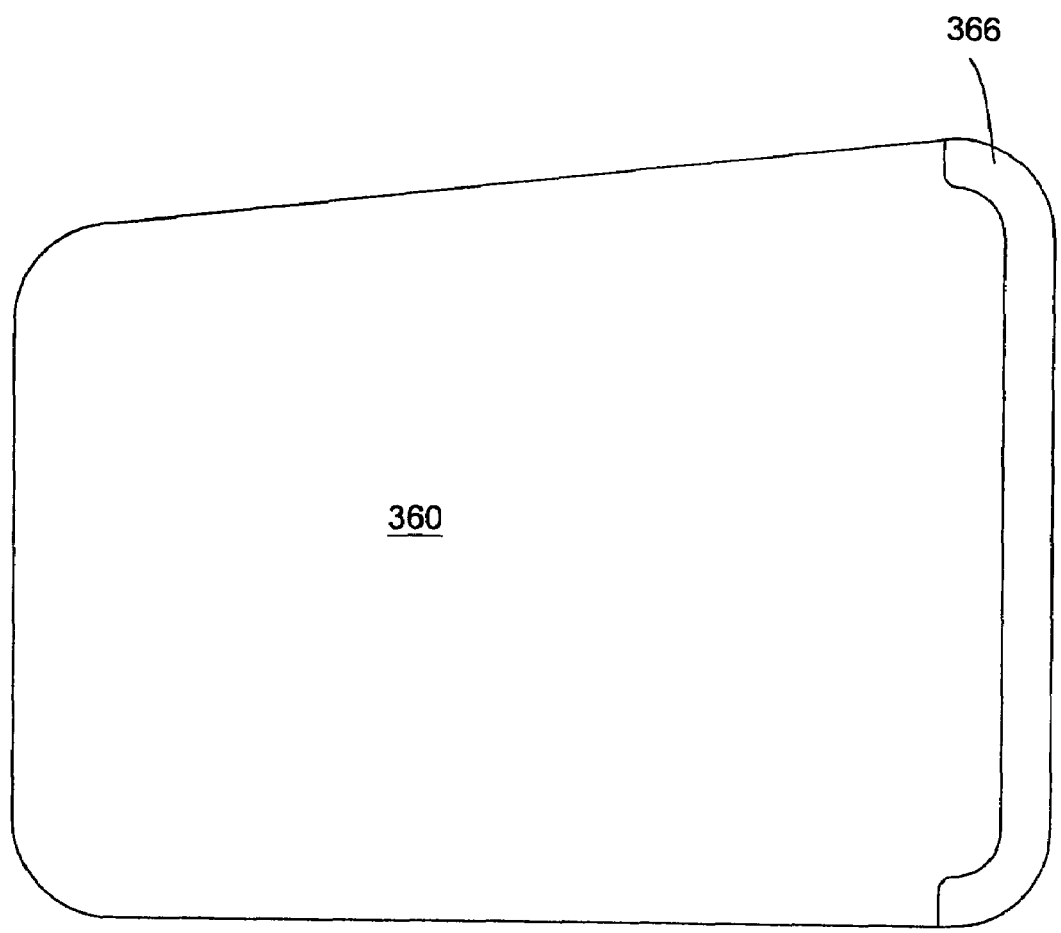
FIG. 52 depicts a plan view of a carrier plate with an integral inboard carrier.
Figure 53:
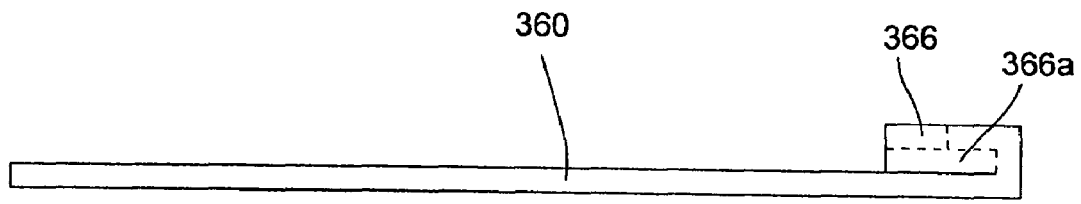
FIG. 53 depicts a profile view of the carrier plate with an integral inboard carrier of FIG. 52.

Turning now to FIGS. 52 and 53, a carrier 360 with an integral bezel 366 on only the "inboard edge" is depicted. This carrier with integral bezel is preferred for use with elements as described with regard to FIGS. 4A, 4B and 4C. A related assembly method is to provide a double sided adhesive layer, such as a tape or foam, and adhere an element to the carrier with integral bezel such that the related contacts to the associated electrically conductive layers are disposed within the bezel receptacle 366a. Most preferably, the bezel is positioned on an edge of the element to be located closest to the associated vehicle (i.e. the inboard edge).

It is contemplated that the present inventive concepts can be used in combination with mirrors (interior and/or exterior) having many different options to create synergistic and non-obvious combinations that provide surprising and unexpected benefits not previously possible. For example, turning now to FIG. 54, an interior mirror assembly 502 includes a bezel 555 (similar to any of bezels 144, and/or 344-344R) and a case 556. The bezel and the case combine to define a mirror housing for incorporation of features in addition to a reflective element and information displays. Commonly assigned U.S. Pat. Nos. 6,102,546; D 410,607; 6,407,468; 6,420,800; and 6,471,362, the disclosures of which are incorporated in their entireties herein by reference, describe various bezels, cases, and associated button constructions for use with the present invention.

Figure 54:
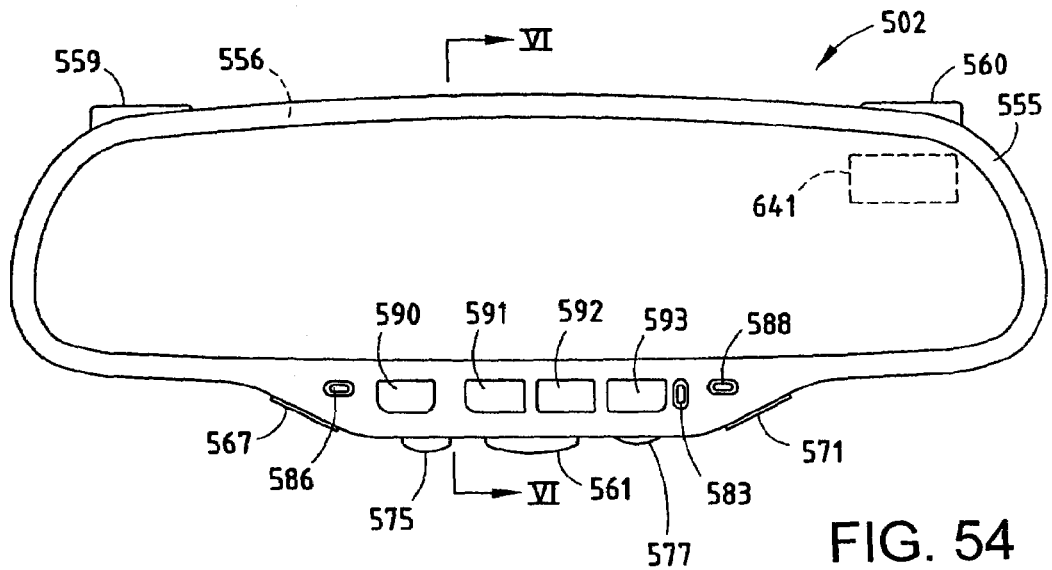
FIG. 54 depicts a front view of an interior rearview mirror assembly.
Figure 55:
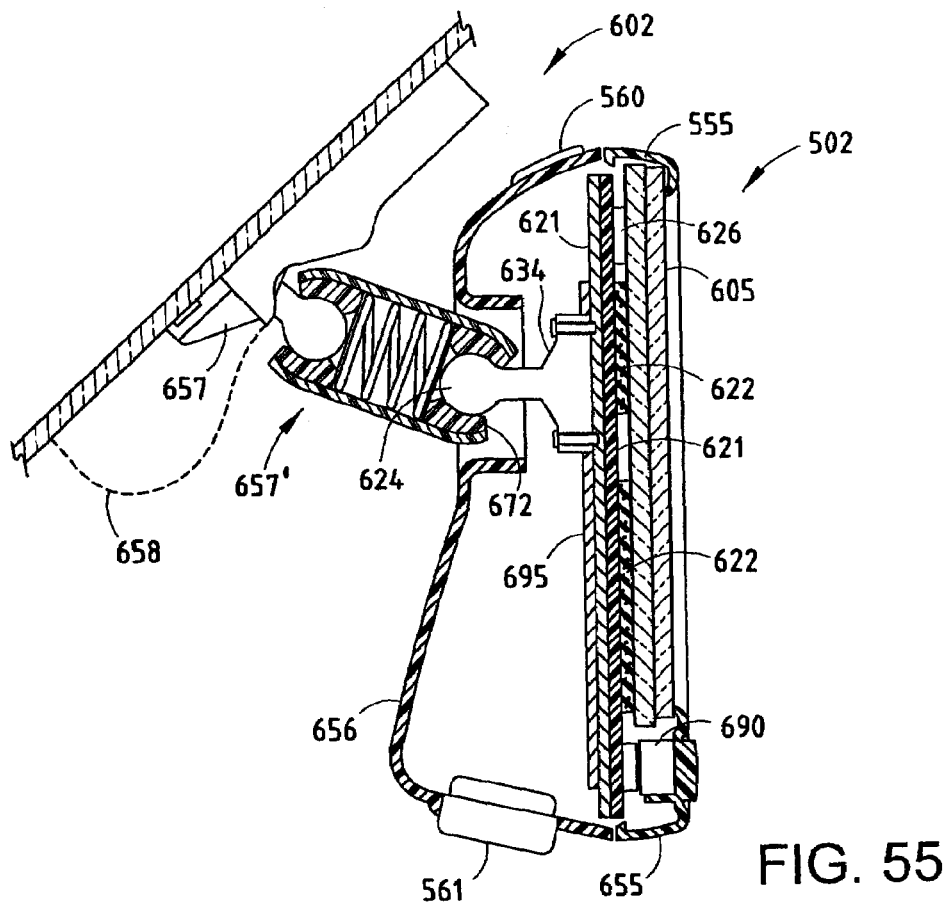
FIG. 55 depicts a sectional view of an interior rearview mirror assembly.
Figure 56:
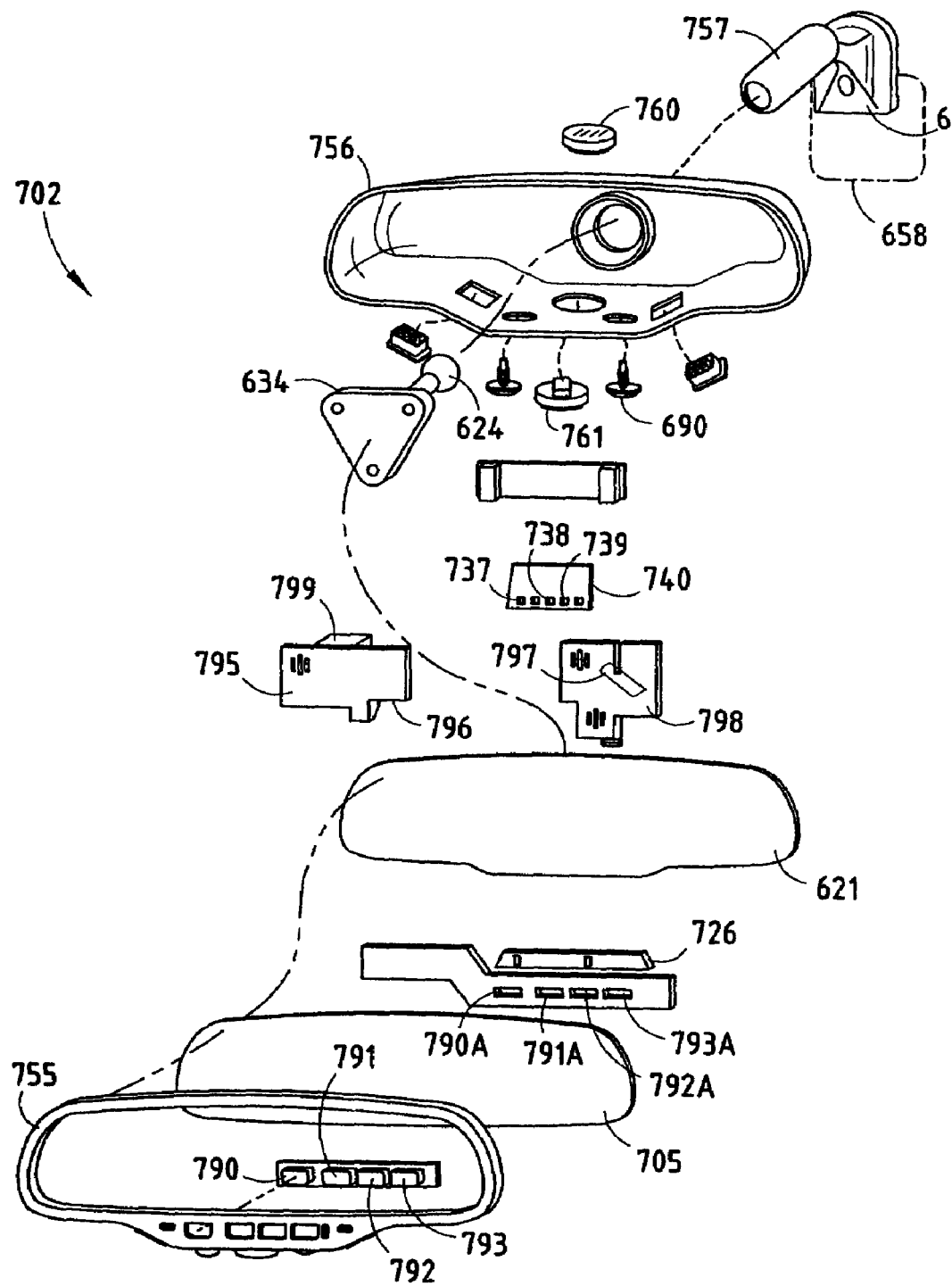
FIG. 56 depicts an exploded view of an interior rearview mirror assembly.
Figure 57:
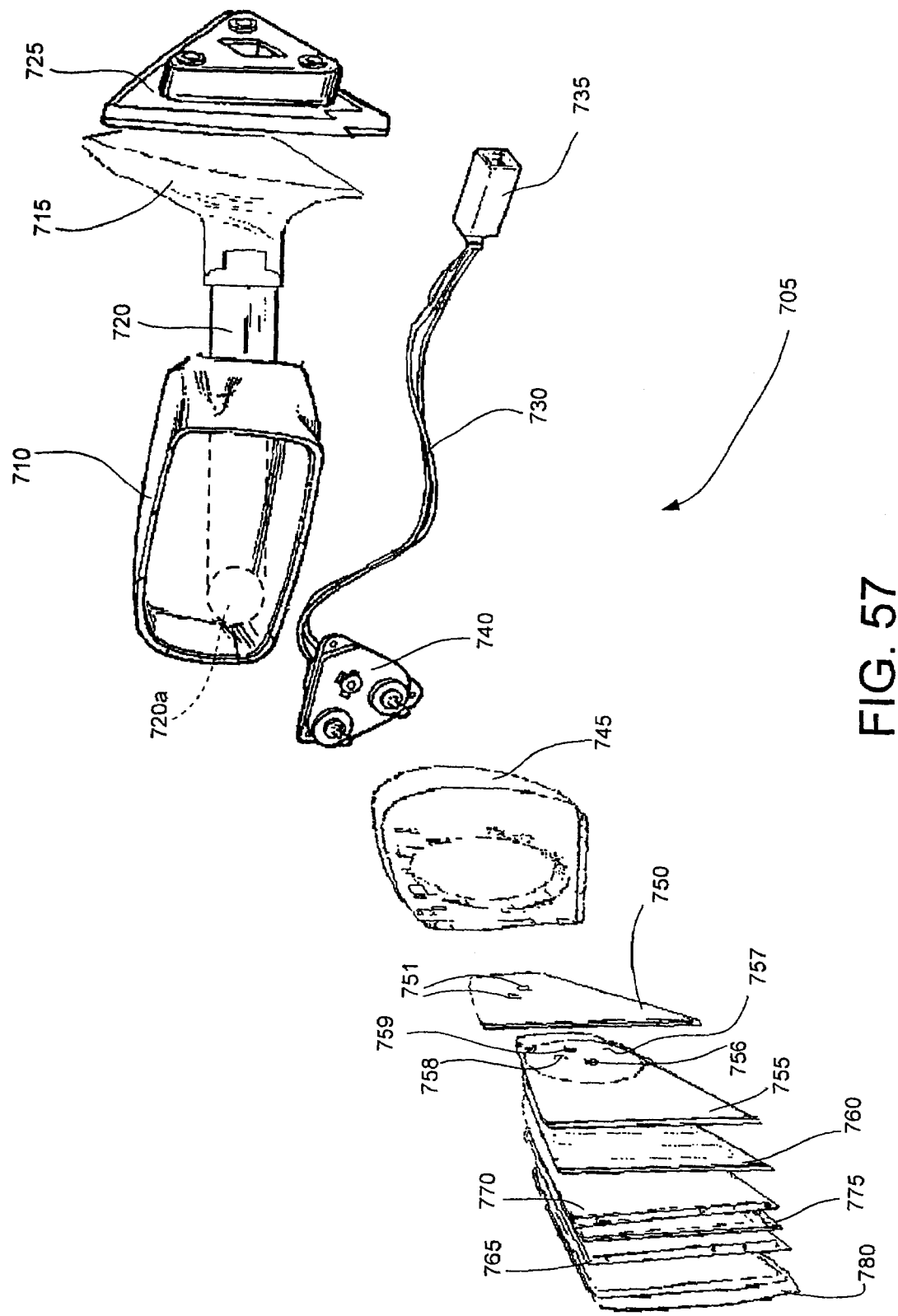
FIG. 57 depicts an exploded view of an exterior rearview mirror assembly.

As depicted in FIG. 54, the mirror assembly may include top and/or bottom microphones 559. Examples of microphones for use with the present invention are described in commonly assigned U.S. patent application Ser. Nos. 09/144, 176 and 10/076,158, the disclosures of which are incorporated in their entireties herein by reference. As depicted in FIGS. 54-56, the microphone 561 or microphones 560 may be mounted on the top of the mirror assembly, on the bottom of the mirror assembly, on the backside of the mirror case, or anywhere within the mirror case or bezel. Preferably, two microphones are incorporated, one near each end, into the mirror assembly on the backside of the mirror case within recessed portion as shown in FIGS. 54-56. These systems may be integrated, at least in part, in a common control with information displays and/or may share components with the information displays. In addition, the status of these systems and/or the devices controlled thereby may be displayed on the associated information displays.

With further reference to FIG. 54, mirror assembly 502 includes first and second illumination assemblies 567, 571. Various illumination assemblies and illuminators for use with the present invention are described in commonly assigned U.S. Pat. Nos. 5,803,579 and 6,335,548, as well as commonly assigned U.S. patent application Ser. No. 09/835,278, the disclosures of which are incorporated in their entireties herein by reference. As further depicted in FIG. 56, each illumination assembly preferably comprises a reflector, a lens, and an illuminator (not shown). Most preferably there are two illumination assemblies with one generally positioned to illuminate a front passenger seat area and the second generally positioned to illuminate a driver seat area. There may be only one or may be additional illuminator assemblies such as one to illuminate a center console area, overhead console area, or an area between the front seats.

With further reference to FIG. 54, mirror assembly 502 includes first and second switches 575, 577. Suitable switches for use with the present invention are described in detail in commonly assigned U.S. Pat. Nos. 6,407,468, 6,420,800, and 6,471,362, as well as commonly assigned U.S. patent application Ser. No. 09/900,500, the disclosures of which are incorporated in their entireties herein by reference. These switches may be incorporated to control the illumination assemblies, the displays, the mirror reflectivity, a voice-activated system, a compass system, a telephone system, a highway toll booth interface, a telemetry system, a headlight controller, a rain sensor, etc. Any other display or system described herein or within the reference incorporated by reference may be incorporated in any location within the associated vehicle and may be controlled using the switches.

With further reference to FIG. 54, mirror assembly 502 includes indicators 583. Various indicators for use with the present invention are described in commonly assigned 5,803,579 and U.S. Pat. Nos. 6,335,548, as well as commonly assigned U.S. Pat. No. 6,521,916, the disclosures of which are incorporated in their entireties herein by reference. These indicators may indicate the status of the displays, the mirror reflectivity, a voice-activated system, a compass system, a telephone system, a highway toll booth interface, a telemetry system, a headlight controller, a rain sensor, etc. Any other display or system described herein or within the references incorporated by reference may be incorporated in any location within the associated vehicle and may have a status depicted by the indicators.

With further reference to FIG. 54, mirror assembly 502 includes first and second light sensors 586 and 588. Preferred light sensors for use within the present invention are described in detail in commonly assigned U.S. Pat. Nos. 5,923,027 and 6,313,457, the disclosures of which are incorporated in their entireties herein by reference. The glare sensor and/or ambient sensor automatically control the reflectivity of a self-dimming reflective element as well as the intensity of information displays and/or backlighting. The glare sensor is used to sense headlights of trailing vehicles and the ambient sensor is used to detect the ambient lighting conditions that the system is operating within. In another embodiment, a sky sensor may be positioned to detect light levels generally above and in front of an associated vehicle, the sky sensor may be used to automatically control the reflectivity of a self-dimming element, the exterior lights of a controlled vehicle and/or the intensity of information displays.

With further reference to FIG. 54, mirror assembly 502 includes first, second, third, and fourth operator interfaces 590, 591, 592, and 593 located in mirror bezel 555. Each operator interface is shown to comprise a backlit information display "A", "AB", "A1" and "12". It should be understood that these operator interfaces can be incorporated anywhere in the associated vehicle, for example, in the mirror case, accessory module, instrument panel, overhead console, dashboard, seats, center console, etc. Suitable switch construction is described in detail in commonly assigned U.S. Pat. Nos. 6,407,468, 6,420,800, and 6,471,362 as well as commonly assigned U.S. patent application Ser. No. 09/900,500, the disclosures of which are incorporated in their entireties herein by reference. These operator interfaces may control the illumination assemblies, the displays, the mirror reflectivity, a voice-activated system, a compass system, a telephone system, a highway toll booth interface, a telemetry system, a headlight controller, a rain sensor, etc. Any other display or system described herein or within the references incorporated by reference may be incorporated in any location within the associated vehicle and may be controlled using an operator interface or interfaces. For example, a user may program a display or displays to depict predetermined information or may program a display or displays to scroll through a series of information, or may enter set points associated with certain operating equipment with associated sensor inputs to display certain information upon the occurrence of a given event. In one embodiment, for example, a given display may be in a non-illuminated state until the engine temperature is above a threshold. The display then automatically is set to display the engine temperature. Another example is that proximity sensors located on the rear of a vehicle may be connected to a controller and combined with a display in a rearview mirror to indicate to a driver the distance to an object; the display may be configured as a bar that has a length proportional to the given distance.

Although specific locations and numbers of these additional features are depicted in FIG. 52, it should be understood that fewer or more individual devices may be incorporated in any location within the associated vehicle and as described within the references incorporated herein.

Turning now to FIG. 55, there is shown a section view of a mirror assembly 602, with a reflective electrochromic mirror subassembly 605 to an internal plate frame 621 with double-sided adhesive foam tape 622. Attachment component 634 is screwed to (or integrally formed from) plate frame 621 and defines a ball section 624 that engages a crown section 672 in the two-ball mount 657 with tube assembly 657'. The depicted sections of FIG. 55 are taken along cut line VI-VI of FIG. 54. FIG. 55 shows a preferred positional relationship of information displays 626 and/or backlighting (not specifically shown located at a bottom of the mirror subassembly 625) with respect to reflective element 605 within a housing defined by case 656 and bezel 655. Bezel 655 can also be adapted to be like any of bezels 144 and 344-344R. Mirror assembly 602 is also shown to comprise a microphone 659; first operator interface 690; along with circuit board 695; mirror mount 657 and accessory module 658. The mirror mount 657 and/or an accessory module 658 may comprise compass sensors, a camera, a headlight control, an additional microprocessor, a rain sensor, additional information displays, additional operator interfaces, etc.

Turning now to FIG. 56, there is shown an exploded view of a mirror assembly 702. FIG. 56 provides additional detail with regard to one preferred positional relationship of individual components, as well as providing additional structural detail of a mirror assembly. Mirror assembly 702 comprises a reflective element 705 within a bezel 755 and a mirror case 756. Bezel 755 can be adapted to be like any of bezels 144 and 344-344R previously described. A mirror mount 757 is included for mounting the mirror assembly within a vehicle. It is noted that a person skilled in the art of vehicle mirror design can re-design the bezel 755, mirror case 756, and tube mount 757 to be replaced with the bezel 344 (-344R), mirror housing 373, and carrier 360 previously described in this application. It should be understood that a host of accessories may be incorporated into the mount 757 and/or onto the plate frame carrier 621 in addition to a power pack adjuster, such as a rain sensor, a camera, a headlight control, an additional microprocessor, additional information displays, compass sensors, etc. These systems may be integrated, at least in part, in a common control with information displays and/or may share components with the information displays. In addition, the status of these systems and/or the devices controlled thereby may be displayed on the associated information displays.

Mirror assembly 702 is shown in FIG. 56 to further comprise third information display 726 with third information display backlighting 737, 738, 739; first and second microphones 760, 761; and includes other known options such as a first reflector with a first lens; a second reflector with a second lens; a glare sensor; an ambient light sensor; first, second, third, and fourth operator interfaces 790, 791, 792, 793 with first, second, third, and fourth operator interface backlighting 790a, 791a, 792a, 793a; a circuit board 795 having a compass sensor module 799; and a daughter board 798 with an input/output bus interface 797.

Preferably, the illumination assemblies with associated light source are constructed in accordance with the teachings of commonly assigned U.S. Pat. Nos. 5,803,579 and 6,335,548, as well as U.S. Pat. No. 6,521,916, the disclosures of which are incorporated in their entireties herein by reference.

Preferably, the glare light sensor and the ambient light sensor are active light sensors as described in commonly assigned U.S. Pat. Nos. 6,359,274 and 6,402,328, the disclosures of which are incorporated in their entireties herein by reference. The electrical output signal from either or both of the sensors may be used as inputs to a controller on the circuit board 740 or 795 to control the reflectivity of reflective element 705 and/or the intensity of third information display backlighting. The details of various control circuits for use herewith are described in commonly assigned U.S. Pat. Nos. 5,956,012; 6,084,700; 6,222,177; 6,224,716; 6,247,819; 6,249,369; 6,392,783; and 6,402,328, the disclosures of which are incorporated in their entireties herein by reference. These systems may be integrated, at least in part, in a common control with information displays and/or may share components with the information displays. In addition, the status of these systems and/or the devices controlled thereby may be displayed on the associated information displays.

Although the compass sensor module 799 is shown to be mounted circuit board 795 in FIG. 56, it should be understood that the sensor module may be located within mount 757, an accessory module 758 positioned proximate mirror assembly 702 or at any location within an associated vehicle such as under a dashboard, in an overhead console, a center console, a trunk, an engine compartment, etc. Commonly assigned U.S. Pat. Nos. 6,023,229 and 6,140,933, as well as commonly assigned U.S. patent application Ser. Nos. 10/210,910 and 60/360,723, the disclosures of which are incorporated in their entireties herein by reference, described in detail various compass systems for use with the present invention. These systems may be integrated, at least in part, in a common control with information displays and/or may share components with the information displays. In addition, the status of these systems and/or the devices controlled thereby may be displayed on the associated information displays.

Daughter board 798 is in operational communication with circuit board 795. Circuit board 795 may comprise a controller 796, such as a microprocessor, and daughter board 798 may comprise an information display. The microprocessor may, for example, receive signal(s) from the compass sensor module 799 and process the signal(s) and transmit signal(s) to the daughter board to control a display to indicate the corresponding vehicle heading. As described herein and within the references incorporated by reference herein, the controller may receive signal(s) from light sensor(s), rains sensor(s) (not shown), automatic vehicle exterior light controller(s) (not shown), microphone(s), global positioning systems (not shown), telecommunication systems (not shown), operator interface(s), and a host of other devices, and control the information display(s) to provide appropriate visual indications.

Controller 796 (or controllers) may, at least in part, control the mirror reflectivity, exterior lights, rain sensor, compass, information displays, windshield wipers, heater, defroster, defogger, air conditioning, telemetry systems, voice recognition systems such as digital signal processor-based voice-actuation systems, and vehicle speed. The controller 796 (or controllers) may receive signals from switches and/or sensors associated with any of the devices described herein and in the references incorporated by reference herein to automatically manipulate any other device described herein or described in the references included by reference. The controller 796 may be, at least in part, located outside the mirror assembly or may comprise a second controller elsewhere in the vehicle or additional controllers throughout the vehicle. The individual processors may be configured to communicate serially, in parallel, via Bluetooth protocol, via wireless communication, over the vehicle bus, over a CAN bus or any other suitable communication.

Exterior light control systems as described in commonly assigned U.S. Pat. Nos. 5,990,469; 6,008,486; 6,130,421; 6,130,448; 6,255,639; 6,049,171; 5,837,994; 6,403,942; 6,281,632; 6,291,812; 6,469,739; 6,465,963; 6,587,573; 6,429,594; 6,379,013 and U.S. patent application Ser. Nos. 09/538,389; 09/678,856; 09/847,197; 60/404,879; Ser. Nos. 10/235,476; and 10/208,142, the disclosures of which are incorporated in their entireties herein by reference, may be incorporated in accordance with the present invention. These systems may be integrated, at least in part, in a common control with information displays and/or may share components with the information displays. In addition, the status of these systems and/or the devices controlled thereby may be displayed on the associated information displays.

Moisture sensors and windshield fog detector systems are described in commonly assigned U.S. Pat. Nos. 5,923,027 and 6,313,457, the disclosures of which are incorporated in their entireties herein by reference. These systems may be integrated, at least in part, in a common control with information displays and/or may share components with the information displays. In addition, the status of these systems and/or the devices controlled thereby may be displayed on the associated information displays.

Commonly assigned U.S. Pat. No. 6,262,831, the disclosure of which is incorporated herein by reference in its entirety, describes power supplies for use with the present invention. These systems may be integrated, at least in part, in a common control with information displays and/or may share components with the information displays. In addition, the status of these systems and/or the devices controlled thereby may be displayed on the associated information displays.

It is contemplated that the present invention would be useful in inside or outside rearview mirrors having electro-optic mirror elements, convex mirror elements, aspheric mirror elements, planar mirror elements, non-planar mirror elements, hydrophilic mirror elements, hydrophobic mirror elements, and mirror elements having third surface and fourth surface reflectors. It is further contemplated that the present invention will be useful on mirrors that are transflective or that have a third or fourth surface mirror element with patterns of lines thereon to optimize the effect of visible light (sometimes called "jail bars"). Further, the present invention is useful with mirrors having first surface or fourth surface heaters, anti-scratch layers, circuit boards including flexible circuit boards, and circuit board and heater combinations, such as heaters having embedded or integrated non-heater functions such as signal ellipses and signal diffusants, locating holes or windows for light pass-through. The present invention is also useful with potted, snap-attached, or elastomeric bezels and useful with carriers having an ultra-flat front surface. Also, additional options can be integrated into the mirrors including signal lighting, key lights, radar distance detectors, puddle lights, information displays, light sensors and indicator and warning lighting, retainers with living hinges, and integrated housings for receiving and supporting said components. Still further, it is conceived that the present mirror can include manually folding or power folding mirrors, extendable mirrors, and mirrors with a wide field of view, and with information on the mirror such as "object in mirror is closer than may appear" or other indicia, such as "heated" or "auto-dim". Still further, the present invention is useful with a blue glass mirror or "blue chemical" darkening mirror. Still further, efficiencies can be had by incorporating the present concepts with mirrors having an electrochromic mirror subassembly with front and rear glass mirror elements with edges having a "zero offset" (i.e. less than an average of about 1 mm, or more preferably, less than about 0.5 mm difference between perfect alignment of edges of the mirror elements), an edge seal, including clear reflective or opaque edge seals, and/or second surface chrome or a chrome bezel.

Although the present invention has been generally described as being used in connection with electrochromic devices, such as mirrors and architectural windows, those skilled in the art will understand that various aspects of the present invention may be employed in the construction of other electro-optic devices.

Turning now to FIG. 7, there is shown an exploded view of an exterior rearview mirror assembly 705 having a housing 710 connected to an attachment member 715 via a telescoping extension 720. In at least one embodiment, the telescoping extension 720 comprises a single arm having a linear actuator for extending and retracting the telescoping extension from within the associated vehicle. The telescoping extension 720 may comprise a rack and pinion type linear actuator, an electrical solenoid type linear actuator, a pneumatic piston or a hydraulic actuator. The housing 710 may be configured such that the housing axially pivots about the telescoping extension. Additionally, the telescoping extension may be configured such that the housing may be folded inward toward the associated vehicle and outward away from the associated vehicle. The attachment member 715 is configured to be received by a vehicle mount 725. The vehicle mount may be fixed to a door panel, an A-pillar, a front fender, a window assembly, or any other position where a driver can view the scene generally rearward of the associated vehicle. It should be understood that the telescoping extension may comprise two or more arms and that the housing may be configured to pivot and fold irrespective of the number of arms employed. It should also be understood that the housing may be connected to a non-telescoping extension at a location shown as reference number 720a such that the housing pivots about the connection 720a such that the mirror may be positioned closer or farther from the vehicle as desired. This feature may be accompanied by a power positioning mechanism such that actuation may be performed inside the vehicle. It should be understood that the mirror housing, extension and attachment member may be configured such that the telescoping, pivoting, and folding requires a manual operation.

A wiring harness 730 with a connector 735 is provided to interface the exterior mirror with associated apparatus located inside the associated vehicle. The wiring harness may be configured to provide extension, folding and pivoting of the housing and may also be configured to provide reflective element control, electrical power, turn signal actuation, mirror heater control, mirror element positioning, light sensor interface, exterior mirror circuit board interface, transceiver interface, information display interface, antenna interface, light source power and control, emergency flasher interface, and all other electrical features as described herein. It should be understood that operator interfaces are provided within the vehicle for each of these features where appropriate.

A mirror element positioner 740 is provided for aligning the associated reflective element within the housing from the interior of the associated vehicle. It should be understood that a corresponding operator interface is provided within the vehicle for positioning of the reflective element.

The positioner 740 is mechanically connected to a carrier for providing a secure structure for supporting and moving of the associated reflective element. Examples of suitable carriers are described in U.S. Pat. Nos. 6,195,194 and 6,239,899, the disclosures of which are incorporated herein in their entireties by reference.

In at least one embodiment, a double-sided adhesive foam 750 is employed to attach the reflective element to the carrier. In certain instances, apertures 751 may be provided in the double-sided adhesive foam for accommodating positioning of various components.

In at least one embodiment, an electrical circuit board 755 is provided in the rearview mirror assembly. The electrical circuit board may comprise a light source such as a turn signal light, a keyhole illuminator, or an outside door area illuminator, as taught in U.S. Pat. No. 6,441,943, the entire disclosure of which is incorporated in its entirety herein by reference, an information display, an antenna, a transceiver, a reflective element control, an outside mirror communication system, a remote keyless entry system, proximity sensors, and interfaces for other apparatus described herein. U.S. Pat. Nos. 6,244,716, 6,523,976, 6,521,916, 6,441,943, 6,335,548, 6,132,072, 5,803,579, 6,229,435, 6,504,142, 6,402,328, 6,379,013, and 6,359,274 disclose various electrical components and electrical circuit boards that may be employed in one or more embodiments, the disclosures of each of these U.S. Patents are incorporated herein in their entireties by reference.

In at least one embodiment, a rearview mirror assembly is provided with a heater 760 for improving the operation of the device and for melting frozen precipitation that may be present. Examples of various heaters are disclosed in U.S. Pat. Nos. 5,151,824, 6,244,716, 6,426,485, 6,441,943 and 6,356,376, the disclosures of each of these Patents are incorporated in their entireties herein by reference.

In at least one embodiment, the reflective element has a variable reflectance feature. The variable reflectance reflective element may comprise a first substrate 765 and a second substrate 770 secured in a spaced apart relationship by a seal 775 to define a chamber therebetween. The reflective element may be configured to define a convex element, an aspheric element, a planar element, a non-planar element, a wide field of view element, or a combination of these various configurations in different areas to define a complex mirror element shape. The first surface of the first substrate may comprise a hydrophilic or hydrophobic coating to improve the operation. The reflective element may comprise transflective properties such that a light source or information display may be positioned behind the element and project light rays therethrough. The reflective element may comprise an anti-scratch layer, or layers, on the exposed surfaces of the first and, or, second substrates. The reflective element may comprise area(s) that are devoid of reflective material, such as etched in bars or words, to define information display area(s). Examples of various reflective elements are described in U.S. Pat. Nos. 5,682,267, 5,689,370, 6,064,509, 6,062,920, 6,268,950, 6,195,194, 5,940,201, 6,246,507, 6,057,956, 6,512,624, 6356,376, 6,166,848, 6,111,684, 6,193,378, 6,239,898, 6,441,943, 6,037,471, 6,020,987, 5,825,527 6,111,684 and 5,998,617, the disclosures of each of these patents are incorporated in their entireties herein by reference.

Preferably, the chamber contains an electrochromic medium. Electrochromic medium is preferably capable of selectively attenuating light traveling therethrough and preferably has at least one solution-phase electrochromic material and preferably at least one additional electroactive material that may be solution-phase, surface-confined, or one that plates out onto a surface. However, the presently preferred media are solution-phase redox electrochromics, such as those disclosed in commonly assigned U.S. Pat. Nos. 4,902,108, 5,128,799, 5,278,693, 5,280,380, 5,282,077, 5,294,376, 5,336,448, 5,808,778 and 6,020,987; the entire disclosures of which are incorporated herein in their entireties by reference. If a solution-phase electrochromic medium is utilized, it may be inserted into the chamber through a sealable fill port through well-known techniques, such as vacuum backfilling and the like.

Electrochromic medium preferably includes electrochromic anodic and cathodic materials that can be grouped into the following categories:

(i) Single layer—the electrochromic medium is a single layer of material which may include small inhomogeneous regions and includes solution-phase devices where a material is contained in solution in the ionically conducting electrolyte and remains in solution in the electrolyte when electrochemically oxidized or reduced. U.S. Pat. No. 6,193,912 entitled "NEAR INFRARED-ABSORBING ELECTROCHROMIC COMPOUNDS AND DEVICES COMPRISING SAME"; U.S. Pat. No. 6,188,505 entitled "COLOR STABILIZED ELECTROCHROMIC DEVICES"; U.S. Pat. No. 6,262,832 entitled "ANODIC ELECTROCHROMIC MATERIAL HAVING A SOLUBILIZING MOIETY"; U.S. Pat. No. 6,137,620 entitled "ELECTROCHROMIC MEDIA WITH CONCENTRATION ENHANCED STABILITY PROCESS FOR PREPARATION THEREOF AND USE IN ELECTROCHROMIC DEVICE"; U.S. Pat. No. 6,195,192 entitled "ELECTROCHROMIC MATERIALS WITH ENHANCED ULTRAVIOLET STABILITY"; U.S. Pat. No. 6,392,783 entitled "SUBSTITUTED METALLOCENES FOR USE AS AN ANODIC ELECTROCHROMIC MATERIAL AND ELECTROCHROMIC MEDIA AND DEVICES COMPRISING SAME"; and U.S. Pat. No. 6,249,369 entitled "COUPLED ELECTROCHROMIC COMPOUNDS WITH PHOTOSTABLE DICATION OXIDATION STATES" disclose anodic and cathodic materials that may be used in a single layer electrochromic medium, the entire disclosures of which are incorporated herein by reference. Solution-phase electroactive materials may be contained in the continuous solution phase of a cross-linked polymer matrix in accordance with the teachings of U.S. Pat. No. 5,928,572, entitled "IMPROVED ELECTROCHROMIC LAYER AND DEVICES COMPRISING SAME" or International Patent Application No. PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES," the entire disclosures of which are incorporated herein by reference.

At least three electroactive materials, at least two of which are electrochromic, can be combined to give a pre-selected color as described in U.S. Pat. No. 6,020,987 entitled "ELECTROCHROMIC MEDIUM CAPABLE OF PRODUCING A PRE-SELECTED COLOR," the entire disclosure of which is incorporated herein by reference. This ability to select the color of the electrochromic medium is particularly advantageous when designing information displays with associated elements.

The anodic and cathodic materials can be combined or linked by a bridging unit as described in International Application No. PCT/WO97/EP498 entitled "ELECTROCHROMIC SYSTEM," the entire disclosure of which is incorporated herein by reference. It is also possible to link anodic materials or cathodic materials by similar methods. The concepts described in these applications can further be combined to yield a variety of electrochromic materials that are linked.

Additionally, a single layer medium includes the medium where the anodic and cathodic materials can be incorporated into the polymer matrix as described in International Application No. PCT/WO98/EP3862 entitled "ELECTROCHROMIC POLYMER SYSTEM," U.S. Pat. No. 6,002,511, or International Patent Application No. PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES," the entire disclosures of which are incorporated herein by reference.

Also included is a medium where one or more materials in the medium undergoes a change in phase during the operation of the device, for example, a deposition system where a material contained in solution in the ionically conducting electrolyte which forms a layer, or partial layer on the electronically conducting electrode when electrochemically oxidized or reduced.

(ii) Multilayer—the medium is made up in layers and includes at least one material attached directly to an electronically conducting electrode or confined in close proximity thereto which remains attached or confined when electrochemically oxidized or reduced. Examples of this type of electrochromic medium are the metal oxide films, such as tungsten oxide, iridium oxide, nickel oxide, and vanadium oxide. A medium, which contains one or more organic electrochromic layers, such as polythiophene, polyaniline, or polypyrrole attached to the electrode, would also be considered a multilayer medium.

In addition, the electrochromic medium may also contain other materials, such as light absorbers, light stabilizers, thermal stabilizers, antioxidants, thickeners, or viscosity modifiers.

It may be desirable to incorporate a gel into the electrochromic device as disclosed in commonly assigned U.S. Pat. No. 5,940,201 entitled "AN ELECTROCHROMIC MIRROR WITH TWO THIN GLASS ELEMENTS AND A GELLED ELECTROCHROMIC MEDIUM," filed on Apr. 2, 1997. The entire disclosure of this U.S. patent is incorporated herein by reference.

In at least one embodiment, a rearview mirror assembly is provided with an electro-optic element having a substantially transparent seal. Examples of substantially transparent seals and methods of forming substantially transparent seals are provided in U.S. Pat. No. 5,790,298, the entire disclosure of which is included herein by reference.

In at least one embodiment, the rearview mirror assembly is provided with a bezel 780 for protecting the associated seal from damaging light rays and to provide an aesthetically pleasing appearance. Examples of various bezels are disclosed in U.S. Pat. Nos. 5,448,397, 6,102,546, 6,195,194, 5,923,457, 6,238,898, 6,170,956 and 6,471,362, the disclosures of which are incorporated herein in their entireties by reference.

While the invention has been described in detail herein in accordance with certain preferred embodiments thereof, many modifications and changes therein may be effected by those skilled in the art without departing from the spirit of the invention. Accordingly, it is our intent to be limited only by the scope of the appending claims and not by way of the details and instrumentalities describing the embodiments shown herein. It should be understood that many of the features described with regard to a given figure, or figures, may be incorporated with other features to arrive at embodiments that encompass many combinations.

The invention claimed is:

1. A mirror element, comprising:
a first substantially transparent substrate comprising a substantially transparent conductor on a second surface thereof, wherein said substantially transparent conductor comprises a sheet resistance of between approximately 1.0 $\Omega/\square$ and approximately 10 $\Omega/\square$, and wherein light reflected by any two points on the mirror element is characterized by a difference in color of less than 5 C* units.

2. A mirror element as in claim 1 wherein said substantially transparent conductor comprises a sheet resistance of less than 8 $\Omega/\square$.

3. A mirror element as in claim 1 wherein said substantially transparent conductor comprises a sheet resistance of between approximately 2.0 $\Omega/\square$ and approximately 4 $\Omega/\square$.

4. A mirror element as in claim 1 wherein said first substantially transparent substrate has a thickness of less than 2.0 mm.

5. A mirror element as in claim 1 wherein said second substrate has a thickness of less than 2.0 mm.

6. A mirror element as in claim 1 wherein said substantially transparent conductor comprises at least one layer selected from the group consisting of zinc oxide, doped-zinc oxide, IMI, and ITO.

7. A mirror element as in claim 1 wherein said substantially transparent conductor is placed on said second surface of said first substantially transparent substrate by either sputtering, evaporation, chemical vapor deposition or plating.

8. A mirror element as in claim 1 further comprising a second substrate comprising an at least partially reflective conductor, wherein said at least partially reflective conductor comprises a sheet resistance of between approximately 0.05 $\Omega/\square$ and approximately 0.5 $\Omega/\square$.

9. A mirror element as in claim 8 wherein said at least partially reflective conductor comprises a sheet resistance of approximately 0.1 $\Omega/\square$.

10. A mirror element as in claim 8 wherein said at least partially reflective conductor comprises at least one layer selected from the group consisting of silver and silver-gold.

11. A mirror element as in claim 8 wherein said at least partially reflective conductor is placed on at least one surface of said second substantially transparent substrate by either sputtering, evaporation, chemical vapor deposition or plating.

12. A mirror element, comprising:
a first substantially transparent substrate comprising a substantially transparent conductor on a second surface thereof and further comprising a first perimeter length; and
a second substrate comprising a second perimeter length and further comprising an electrical conductor comprising a sheet resistance of between approximately 0.05 $\Omega/\square$ and approximately 8.0 $\Omega/\square$, wherein said first perimeter length is larger than said second perimeter length.

13. A mirror element as in claim 12 further comprising a Z clip connector in contact with said substantially transparent conductor.

14. A mirror element as in claim 12 further comprising a J clip connector in contact with said electrical conductor of said second substrate.

15. A mirror element as in claim 12 further comprising a C clip connector in contact with said electrical conductor of said second substrate.

16. A mirror element as in claim 12 further comprising a substantially transparent seal disposed between said first substantially transparent substrate and said second substrate to define a chamber therebetween.

17. A mirror element as in claim 16 further comprising a spectral filter material disposed proximate a perimeter portion of said first substantially transparent substrate such that selected light rays are prevented from impinging upon said seal.

* * * * *